(12) United States Patent
Sandy et al.

(10) Patent No.: US 11,980,182 B2
(45) Date of Patent: May 14, 2024

(54) CRYOGENIC STORAGE UNIT

(71) Applicant: Abeyatech, LLC, Springfield, MO (US)

(72) Inventors: Dale Sandy, Nixa, MO (US); Sean Cantrell, Duluth, GA (US); Jonathan Greene, Canton, GA (US); Gilmer Edwards, Canton, GA (US)

(73) Assignee: Azenta Life Sciences, Inc., Chelmsford, MA (US)

( * ) Notice: Subject to any disclaimer, the term of this patent is extended or adjusted under 35 U.S.C. 154(b) by 785 days.

(21) Appl. No.: 17/049,497

(22) PCT Filed: May 15, 2019

(86) PCT No.: PCT/US2019/032433
§ 371 (c)(1),
(2) Date: Oct. 21, 2020

(87) PCT Pub. No.: WO2019/226437
PCT Pub. Date: Nov. 28, 2019

(65) Prior Publication Data
US 2021/0244018 A1    Aug. 12, 2021

Related U.S. Application Data

(60) Provisional application No. 62/795,340, filed on Jan. 22, 2019, provisional application No. 62/673,995, (Continued)

(51) Int. Cl.
*A01N 1/02* (2006.01)
*F25D 3/10* (2006.01)
(Continued)

(52) U.S. Cl.
CPC ......... *A01N 1/0257* (2013.01); *A01N 1/0252* (2013.01); *F25D 3/105* (2013.01);
(Continued)

(58) Field of Classification Search
CPC ..... A01N 1/0257; F25D 3/105; F25D 29/001; F25D 19/006; F25D 23/069; F25D 2323/06
See application file for complete search history.

(56) References Cited

U.S. PATENT DOCUMENTS 3,916,640 A   11/1975  Rasovich
2006/0101832 A1   5/2006  Wurzinger et al.
(Continued)

FOREIGN PATENT DOCUMENTS

CN   205190977 U   4/2016
EP   1617157 A2   1/2006
(Continued)

*Primary Examiner* — Brian M King
(74) *Attorney, Agent, or Firm* — Sisson & Banyas, Attorneys at Law, LLC; Jeffrey J. Banyas

(57) ABSTRACT

It is described herein an improved cryogenic storage unit (100). The improved cryogenic storage unit (100) may include an apparatus (1000) for thermal regulation in a cryogenic freezer (100). The improved cryogenic storage unit (100) may also include a cable gland (2000). The improved cryogenic storage unit (100) may also include a bearing assembly (3000). The improved cryogenic storage unit (100) may also include a system (4000) for charging a cryogen to a cryogenic freezer (100). The improved cryogenic storage unit (100) may also include a venting system (5000). The improved cryogenic storage unit (100) may also include an alignment of a lid (5300) and a handle (6000).

17 Claims, 34 Drawing Sheets

Related U.S. Application Data filed on May 20, 2018, provisional application No. 62/673,994, filed on May 20, 2018.

(51) Int. Cl.
    *F25D 19/00*     (2006.01)
    *F25D 29/00*     (2006.01)

(52) U.S. Cl.
    CPC .... *F17C 2223/0161* (2013.01); *F25D 19/006* (2013.01); *F25D 29/001* (2013.01)

(56) References Cited

U.S. PATENT DOCUMENTS

| | | |
|---|---|---|
| 2015/0332829 A1 | 11/2015 | Stautner et al. |
| 2016/0288999 A1* | 10/2016 | Caveney ................. F25D 3/105 |
| 2016/0289000 A1* | 10/2016 | Caveney ............. A01N 1/0257 |

FOREIGN PATENT DOCUMENTS

| | | |
|---|---|---|
| EP | 2743614 A1 | 6/2014 |
| EP | 2947403 A1 | 11/2015 |
| EP | 3020276 A1 | 5/2016 |
| GB | 2450761 A | 1/2009 |
| WO | 2014/197515 A1 | 12/2014 |

\* cited by examiner

CRYOGENIC STORAGE UNIT

CROSS REFERENCES AND PRIORITIES

This application claims priority from U.S. Provisional Application No. 62/673,995 filed on 20 May 2018, U.S. Provisional Application No. 62/673,994 filed on 20 May 2018, U.S. Provisional Application No. 62/795,340 filed on 22 Jan. 2019, and International Application No. PCT/US2019/032433 filed on 15 May 2019 the teachings of each of which are incorporated by reference herein in their entirety.

BACKGROUND

Cryogenic freezers, also known as cryogenic storage units, are used in a wide variety of applications including medical research, blood banks, and fertility clinics for the storage of biological materials. Common cryogenic freezers consist of an inner tank housed within an outer tank with a vacuum space provided between the two tanks, also known as a dewar. A storage area is provided within the inner tank where the biological materials may be stored in a cryogenic environment. Cryogens, such as liquid nitrogen or liquid helium, are pumped into the inner tank of the cryogenic freezer.

The design and use of cryogenic freezers provides many challenges. For instance, temperature of the biological samples must be strictly controlled. This can be difficult to achieve particularly in larger cryogenic freezers, as the cryogens may cool the lower regions of the storage area more effectively than the upper regions of the storage area.

Another challenge faced in the design and use of cryogenic freezers is maintaining the vacuum space between the inner and outer tank while still allowing for hardware such as monitoring probes, charging systems, and the like to be installed in their required positions.

Yet another challenge faced in the design and use of cryogenic freezers relates to the user's ability to quickly and easily retrieve biological samples from within the storage area. Turntables have been installed within the storage area to allow a user to more easily access samples from different regions of the storage area. However, such turntables require a complicated system of bearings which are prone to failure in the low temperature cryogenic environment of the freezer. In addition, vapors resulting from boiling of the cryogens can obstruct the user's vision as they are attempting to place samples into the storage area or remove samples from the storage area.

Many solutions have been proposed for overcoming these common problems. However, it remained for the inventors to find the solutions described herein.

SUMMARY

Described herein is an apparatus for thermal regulation of a cryogenic freezer. The apparatus for thermal regulation of a cryogenic freezer may comprise a mount section and a plurality of fins. The mount section has an outer perimeter defining a first planar surface and a second planar surface opposite the first planar surface. The plurality of fins may extend from the second planar surface. Each fin of the plurality of fins has a first end which may be located adjacent to the second planar surface, a second end located opposite the first end, and a fin length dimension spanning from the first end to the second end. The apparatus for thermal regulation may be part of a cryogenic freezer.

In some embodiments, at least one fin of the plurality of fins may be directly attached to the first planar surface. In other embodiments, each fin of the plurality of fins may be directly attached to the first planar surface.

In some embodiments, the mount section may comprise a plurality of locator holes passing through the mount section from the first planar surface to the second planar surface and at least one fin of the plurality of fins may extend through one of the plurality of locator holes from the first planar surface to the second planar surface. In certain embodiments each fin of the plurality of fins may pass through a corresponding locator hole of the plurality of locator holes.

In some embodiments, the apparatus for thermal regulation of a cryogenic freezer may further comprise a plurality of dividers which may extend perpendicular from the first planar surface and having a first edge, a second edge opposite the first edge, a third edge spanning a distance between the first edge and the second edge, and a fourth edge opposite the third edge and spanning the distance between the first edge and the second edge. In certain embodiments the first edge of at least one divider of the plurality of dividers may be directly attached to the first planar surface. In other embodiments, the first edge of each divider of the plurality of dividers may be directly attached to the first planar surface.

In some embodiments, at least one fin of the plurality of fins may be located at a position on the second planar surface corresponding to a position on the first planar surface at which at least one divider of the plurality of dividers is located. In other embodiments, each fin of the plurality of fins may be located at a position on the second planar surface corresponding to a position on the first planar surface at which at least one divider of the plurality of dividers is located.

In some embodiments at least one fin of the plurality of fins may be integrally connected to the first edge of at least one divider of the plurality of dividers, the mount section may comprise a plurality of locator holes passing through the mount section from the first planar surface to the second planar surface, and the at least one fin of the plurality of fins may extend through one locator hole of the plurality of locator holes from the first planar surface to the second planar surface. In other embodiments, each fin of the plurality of fins may be integrally connected to the first edge of at least one divider of the plurality of dividers, the mount section may comprise a plurality of locator holes passing through the mount section from the first planar surface to the second planar surface, and each fin of the plurality of fins may extend through a corresponding locator hole of the plurality of locator holes from the first planar surface to the second planar surface.

In some embodiments each fin of the plurality of fins may have a substantially identical fin length dimension. In other embodiments each fin of the plurality of fins may have an identical fin length dimension. In some such embodiments the plurality of fins may comprise at least a first fin located proximate to the outer perimeter, a second fin located proximate to a mount section center point, and a plurality of intermediate fins located between the first fin and the second fin, wherein the fin length dimension of the first fin may be less than the fin length dimension of the second fin. In some such embodiments the fin length dimension of each fin of the plurality of intermediate fins may be greater than the fin length dimension of the first fin and less than the fin length dimension of the second fin. In some embodiments the fin length dimension of each individual fin of the plurality of intermediate fins may increase as the plurality of intermediate fins extends from the first fin to the second fin.

It is also described herein a cable gland comprising a rigid body, a gasket, an o-ring, a cylindrical stud, and a cable gland cap. The cable gland may be a part of a cryogenic freezer.

The rigid body may comprise a first body section and a second body section. The first body section may have a first body section circular perimeter defining a first body section first planar surface and a first body section second planar surface opposite the first body section first planar surface. The first body section may also have a first annular protrusion extending from the first body section second planar surface and having a first annular protrusion inside diameter and a first annular protrusion outside diameter. The first body section may also have at least one first body section slot originating from a first position of the first body section circular perimeter and passing from the first body section first planar surface through the first body section second planar surface.

The second body section may have a second body section circular perimeter defining a second body section first planar surface and a second body section second planar surface opposite the second body section second planar surface. The second body section may also have a second annular protrusion extending from the second body section first planar surface and having a second annular protrusion inside diameter and a second annular protrusion outside diameter. The second body section may also have a second body section hole passing from the second body section first planar surface through the second body section second planar surface and the second annular protrusion. The second body section may also have at least one second body section slot originating from a first position of the second body section circular perimeter and passing from the second body section first planar surface through the second body section second planar surface.

The gasket may have a gasket inside diameter and a gasket outside diameter. The gasket may be comprised of a gasket material having a first density. Similarly, the o-ring may have an o-ring inside diameter and an o-ring outside diameter. The o-ring may be comprised of an o-ring material having a second density.

The cylindrical stud may extend from a top surface of the first annular protrusion.

The cable gland cap may have a cable gland cap first end, a cable gland cap second end opposite the cable gland cap first end, a cable gland cap height dimension, and a cable gland cap hole.

The gasket inside diameter may be mated to the first annular protrusion outside diameter. The o-ring diameter may be mated to the gasket outside diameter. The first annular protrusion inside diameter may be mated to the second annular protrusion inside diameter. The cylindrical stud may pass through the second body section hole. The cable gland cap may be connected to the cylindrical stud.

In some embodiments, the cylindrical stud may have a threaded outside diameter, the cable gland cap hole may have a threaded inside diameter extending from the cable gland cap first end through at least a portion of the cable gland cap height dimension, and the cable gland cap may be connected to the cylindrical stud by mating the threaded outside diameter to the threaded inside diameter. In some embodiments the first body section may comprise a first body section hole which may pass from the first body section first planar surface through the first body section second planar surface and the first annular protrusion, and the cylindrical stud may be a bolt passing through the first body section hole.

In some embodiments the cylindrical stud may comprise a male cam latch element, the cable gland cap hole may comprise a female cam latch element, and the cable gland cap may be connected to the cylindrical stud by mating the male cam latch element to the female cam latch element.

In some embodiments the first annular protrusion may comprise a plurality of locking mechanism indentations within the first annular protrusion inside diameter, the second annular protrusion may comprise a plurality of locking mechanism protrusions within the second annular protrusion outside diameter, and the plurality of locking mechanism indentations may interact with the plurality of locking mechanism protrusions to prevent or reduce rotation of the first body section relative to the second body section. In other embodiments the first annular protrusion may comprise a plurality of locking mechanism protrusions within the first annular protrusion inside diameter, the second annular protrusion may comprise a plurality of locking mechanism indentations within the second annular protrusion outside diameter, and the plurality of locking mechanism indentations may interact with the plurality of locking mechanism protrusions to prevent or reduce rotation of the first body section relative to the second body section.

In some embodiments the at least one first body section slot may comprise a number of first body section slots selected from the group consisting of at least two, at least four, at least six, or at least eight, and each first body section slot may be located at a separate position on the first body section circular perimeter. In some embodiments the at least one second body section slot may comprise a number of second body section slots selected from the group consisting of at least two, at least four, at least six, or at least eight, and each second body section slot may be located at a separate position on the second body section circular perimeter. In some embodiments at least one of the at least one first body section slots may be vertically aligned with one of the at least one second body section slots. In other embodiments each of the at least one first body section slots may be vertically aligned with one of the at least one second body section slots.

In some embodiments a first radius of the first body section may be less than a second radius of the second body section.

In some embodiments the first body section, the second body section, and the cable gland cap may each independently be made from a material selected from the group consisting of polyethylene, nylon, aluminum, steel, and stainless steel.

In some embodiments the first density of the gasket may be not equal to the second density of the o-ring. In some such embodiments the first density of the gasket may be greater than the second density of the o-ring. In other such embodiments the first density of the gasket may be less than the second density of the o-ring. In other embodiments the first density of the gasket may be equal to the second density of the o-ring, and each of the first density and the second density may be in the range of between 450 kg/m$^3$ and 550 kg/m$^3$. In some embodiments the gasket and the o-ring may each independently be made from a material selected from the group consisting of silicone and foamed silicone.

It is also described herein a bearing assembly for a turn-table of a cryogenic freezer. The bearing assembly may comprise a central stud, a first flange, a second flange, a bearing cap, a bushing, a stop washer, and a snap-ring. The bearing assembly may be a part of a cryogenic freezer.

The central stud may have a central stud first end, a central stud second end opposite the central stud first end, a cylindrical profile having a central stud exterior surface and a central stud interior surface defining a central stud inside diameter and a central stud outside diameter, and a snap-ring groove disposed into the central stud exterior surface proximate to the central stud first end.

The first flange may have a first flange first end, a first flange second end opposite the first flange first end, and a cylindrical profile having a first flange exterior surface and a first flange interior surface defining a first flange inside diameter and a first flange outside diameter.

The second flange may have a second flange first end, a second flange second end opposite the second flange first end, and a cylindrical profile having a second flange exterior surface and a second flange interior surface defining a second flange inside diameter and a second flange outside diameter.

The bearing cap may have a bearing cap first end, a bearing cap second end opposite the bearing cap first end, a cylindrical profile having a bearing cap exterior surface and a bearing cap interior surface defining a bearing cap inside diameter and a bearing cap outside diameter, and a third flange which may extend from the bearing cap exterior surface proximate to the bearing cap second end.

The bushing may have a bushing first end, a bushing second end opposite the bushing first end, a bushing inside diameter, and a bushing outside diameter.

The stop washer may have a stop washer first end, a stop washer second end opposite the stop washer first end, a stop washer inside diameter, and a stop washer outside diameter.

The central stud second end may be attached to the first flange first end. The first flange second end may be attached to the second flange first end. The bearing cap, the bushing, and the stop washer may fit around the central stud exterior surface. The bearing cap may be located between the first flange first end and the bushing second end. The bushing may be located between the bearing cap first end and the stop washer second end. The snap ring may be mated to the snap-ring groove below the stop washer first end. The first flange outside diameter may be greater than the second flange outside diameter.

In some embodiments at least a portion of the first flange interior surface may be countersunk. In some embodiments at least a portion of the second flange interior surface may be countersunk.

In some embodiments the central stud may comprise a hole passing from the central stud exterior surface to the central stud interior surface proximate to the central stud second end.

In some embodiments the third flange may comprise a plurality of slots located along a circumference of the third flange. In some such embodiments the plurality of slots may comprise at least two slots located approximately 180° apart from one another along the circumference of the third flange. In other such embodiments the plurality of slots may comprise at least three slots located approximately 120° apart from one another along the circumference of the third flange. In other such embodiments the plurality of slots may comprise at least four slots located approximately 90° apart from one another along the circumference of the third flange.

In some embodiments the bearing cap may comprise a plurality of screw holes passing from the bearing cap exterior surface to the bearing cap interior surface. In some such embodiments the plurality of screw holes may comprise at least two screw holes located approximately 180° apart from one another along a circumference of the bearing cap. In other such embodiments the plurality of screw holes may comprise at least three screw holes located approximately 120° apart from one another along a circumference of the bearing cap. In other such embodiments the plurality of screw holes may comprise at least four screw holes located approximately 90° apart from one another along a circumference of the bearing cap.

In some embodiments the bushing may be made from a material selected from the group consisting of bronze, brass and plastic.

In some embodiments the first flange may further comprise a first lip which may extend from the first flange second end. In some embodiments the second flange may further comprise a second lip which may extend from the second flange second end.

In some embodiments the bearing cap may further comprise a third lip which may extend from the bearing cap first end having a third lip inside diameter. In some such embodiments the bushing outside diameter may be mated to the third lip inside diameter. In some such embodiments the stop washer outside diameter may be less than the third lip inside diameter.

In some embodiments the central stud may further comprise a keyway groove which may be disposed into the central stud exterior surface originating from the central stud first end and extending towards the central stud second end, the stop washer may further comprises a keyway, and the keyway may be mated to the keyway groove.

Also described herein is a bearing assembly for a turntable of a cryogenic freezer. The bearing assembly may comprise a central stud, a first flange, a second flange, a bearing cap, a bearing, a stop washer, and a snap ring. The bearing assembly may be a part of a cryogenic freezer.

The central stud may have a central stud first end, a central stud second end opposite the central stud first end, a cylindrical profile having a central stud exterior surface and a central stud interior surface defining a central stud inside diameter and a central stud outside diameter, and a snap-ring groove disposed into the central stud exterior surface proximate to the central stud first end.

The first flange may have a first flange first end, a first flange second end opposite the first flange first end, and a cylindrical profile having a first flange exterior surface and a first flange interior surface defining a first flange inside diameter and a first flange outside diameter.

The second flange may have a second flange first end, a second flange second end opposite the second flange first end, and a cylindrical profile having a second flange exterior surface and a second flange interior surface defining a second flange inside diameter and a second flange outside diameter.

The bearing cap may have a bearing cap first end, a bearing cap second end opposite the bearing cap first end, a cylindrical profile having a bearing cap exterior surface and a bearing cap interior surface defining a bearing cap inside diameter and a bearing cap outside diameter, and a third flange which may extend from the bearing cap exterior surface proximate to the bearing cap second end.

The bearing may have a bearing inside diameter and a bearing outside diameter.

The stop washer may have a stop washer first end, a stop washer second end opposite the stop washer first end, a stop washer inside diameter, and a stop washer outside diameter.

The central stud second end may be attached to the first flange first end. The first flange second end may be attached to the second flange first end. The bearing cap, the bearing, and the stop washer may fit around the central stud exterior surface. The bearing cap may be located between the first flange first end and the bearing. The bearing may be located between the bearing cap first end and the stop washer second end. The snap ring may be mated to the snap-ring groove below the stop washer first end. The first flange outside diameter may be greater than the second flange outside diameter.

In some embodiments the bearing may be a deep groove bearing which may comprise an outer bearing race, an inner bearing race, and a plurality of bearing balls disposed between the outer bearing race and the inner bearing race. In some such embodiments the outer bearing race and the inner bearing race may each independently be made of a type of material selected from the group consisting of steel, stainless steel, titanium, and ceramic. In some such embodiments each of the plurality of bearing balls may be made of a type of material selected from the group consisting of steel, stainless steel, titanium, and ceramic.

In some embodiments at least a portion of the first flange interior surface may be countersunk. In some embodiments at least a portion of the second flange interior surface may be countersunk.

In some embodiments the central stud may comprise a hole passing from the central stud exterior surface to the central stud interior surface proximate to the central stud second end.

In some embodiments the third flange may comprise a plurality of slots located along a circumference of the third flange. In some such embodiments the plurality of slots may comprise at least two slots located approximately 180° apart from one another along the circumference of the third flange. In other such embodiments the plurality of slots may comprise at least three slots located approximately 120° apart from one another along the circumference of the third flange. In other such embodiments the plurality of slots may comprise at least four slots located approximately 90° apart from one another along the circumference of the third flange.

In some embodiments the first flange may further comprise a first lip which may extend from the first flange second end. In some embodiments the second flange may further comprise a second lip which may extend from the second flange second end.

In some embodiments the bearing cap may further comprise a third lip which may extend from the bearing cap first end having a third lip inside diameter. In some such embodiments the bearing outside diameter may be mated to the third lip inside diameter. IN some such embodiments the stop washer outside diameter may be less than the third lip inside diameter.

In some embodiments the stop washer may further comprise a stop washer tapered surface located at the stop washer second end.

Also described herein is a system for charging a cryogen into a cryogenic freezer unit. The system for charging a cryogen into a cryogenic freezer unit may comprise a first conduit, a second conduit and a third conduit. The system for charging a cryogen into a cryogenic freezer may be part of a cryogenic freezer.

The first conduit may have a first conduit first end which may comprise a first conduit inlet fitting. The first conduit may also have a first conduit second end which may comprise a first conduit outlet fitting.

The second conduit may have a second conduit first end which may comprise a second conduit inlet fitting. The second conduit may also have a second conduit second end which may comprise a second conduit outlet fitting.

The third conduit may have a third conduit first end which may comprise a third conduit inlet fitting. The third conduit may also have a third conduit second end which may comprise a third conduit outlet fitting.

In some embodiments at least one of the first conduit inlet fitting, the second conduit inlet fitting, or the third conduit inlet fitting may be capable of connecting to a cryogen source.

In some embodiments one of the first conduit, the second conduit, and the third conduit may further comprise a first differential pressure sensor. In some embodiments one of the first conduit, the second conduit, and the third conduit further may comprise a second differential pressure sensor. The conduit which comprises the second differential pressure sensor may be a different conduit from the conduit which comprises the first differential pressure sensor. In some such embodiments the conduit outlet fitting of the conduit comprising the first differential pressure sensor may be located at a different elevation relative to the conduit outlet fitting of the conduit comprising the second differential pressure sensor.

In some embodiments at least one of the first conduit outlet fitting, the second conduit outlet fitting, or the third conduit outlet fitting may be a D-shaped fitting comprising a fitting first end, a fitting second end opposite the fitting first end, a fitting length dimension spanning between fitting first end and a fitting section having a fitting cross sectional profile comprising a flat surface and a curved surface attached to either end of the flat surface. The D-shaped fitting may also comprise an inlet port passing through the flat surface connected to an outlet port passing through the fitting second end. In some embodiments each of the first conduit outlet fitting, the second conduit outlet fitting, or the third conduit outlet fitting may be a D-shaped fitting.

Also described herein is a venting system for a cryogenic freezer. The cryogenic freezer may comprise an inner tank and an outer tank. The venting system may comprise an outer tank top cover, a cryogenic freezer cover, a lid conduit, a vent hole, and a duct. The venting system may be part of a cryogenic freezer.

The outer tank top cover may define a top surface of the outer tank and may comprise an outer tank lid hole which may have at least one outer tank lid hole edge.

The cryogenic freezer cover may comprise a cryogenic freezer cover lid hole which may have at least one cryogenic freezer cover lid hole edge. The cryogenic freezer cover lid hole may be substantially aligned with the outer tank lid hole.

The lid conduit may have a lid conduit sidewall spanning at least a distance between the outer tank lid hole and the cryogenic freezer cover lid hole.

The vent hole may extend from the cryogenic freezer cover lid hole edge. The vent hole may comprise at least a first vent hole edge, a second vent hole edge, and a third vent hole edge opposite the first vent hole edge.

The duct may comprise at least a first duct sidewall and a second duct sidewall. The duct may extend from the lid conduit sidewall. The first duct sidewall may be substantially aligned with the first vent hole edge. The second duct sidewall may be substantially aligned with the second vent hole edge.

In some embodiments, the venting system may further comprise a sealing member connected to the outer tank lid hole edge.

In some embodiments, the venting system may further comprise a lid attached to a top surface of the cryogenic freezer cover by a hinge. In some such embodiments the venting system may further comprise a lid insulation member connected to a bottom surface of the lid.

In some embodiments the outer tank lid hole may have an outer tank lid hole shape selected from the group consisting of a circular shape, an ovular shape, and a polygonal shape. In some embodiments the cryogenic freezer cover lid hole may have a cryogenic freezer cover lid hole shape selected from the group consisting of a circular shape, an ovular shape, and a polygonal shape.

Also described herein is a cryogenic freezer comprising a lid and a handle. The lid may be attached to a top surface of a cryogenic freezer cover by a hinge adjacent to an outer edge of the cryogenic freezer cover. The handle may extend from an outer tank sidewall adjacent to the outer edge of the cryogenic freezer cover. The handle may have a handle first end, a handle second end opposite the handle first end, a handle length dimension spanning from the handle first end to the handle second end, and a handle center point located half way between the handle first end and the handle second end and substantially aligned with a cryogenic freezer cover center point.

The handle length dimension may be at least 50% of a radius dimension of the outer tank. A center point of the lid may be not substantially aligned with the handle center point or the cryogenic freezer cover center point.

In some embodiments the center point of the lid may be offset to the left of the handle center point. In other embodiments the center point of the lid may be offset to the right of the handle center point.

In some embodiments the lid may have a lid shape selected from the group consisting of a circular shape, an ovular shape, and a polygonal shape.

DETAILED DESCRIPTION

Figure 1:
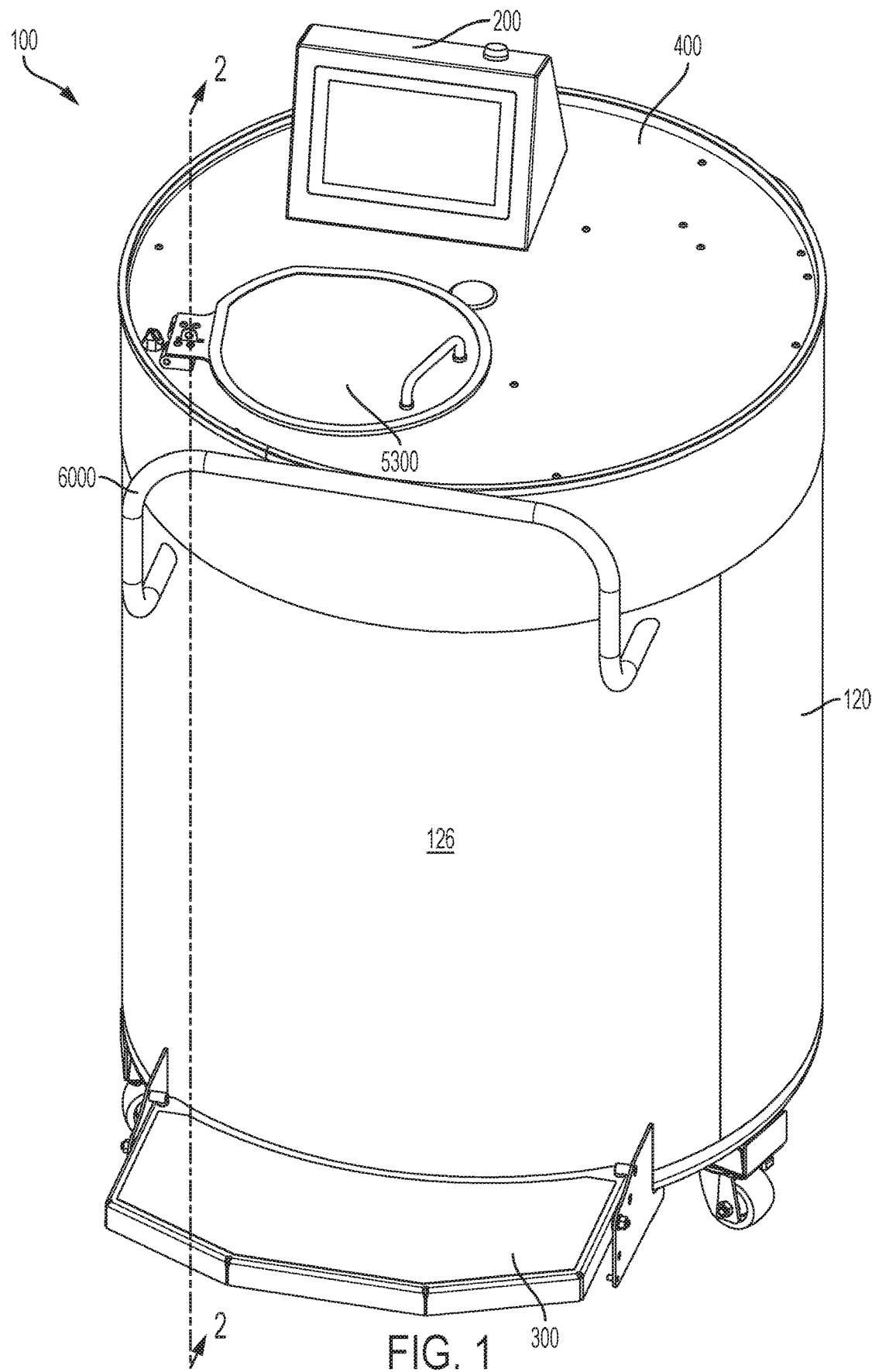
FIG. 1 shows a perspective view of an embodiment of a cryogenic freezer as described herein.

This invention is to an improved cryogenic freezer, and improved devices for use with cryogenic freezers. Reference will now be made to the various Figures in which, unless otherwise noted, like numbers refer to like structures. As described herein and in the claims, the following numbers refer to the following structures as noted in the Figures.

100 refers to a cryogenic freezer.
110 refers to an inner tank.

112 refers to an inner tank top cover.
114 refers to an inner tank lid hole.
115 refers to an inner tank lid hole edge.
120 refers to an outer tank.
122 refers to an outer tank top cover.
124 refers to an outer tank lid hole.
125 refers to an outer tank lid hole edge.
126 refers to an outer tank sidewall.
$r_{ot}$ refers to a radius dimension of an outer tank.
200 refers to a control unit.
300 refers to a step.
400 refers to a cryogenic freezer cover.
402 refers to a cryogenic freezer cover lid hole.
404 refers to a cryogenic freezer cover lid hole edge.
406 refers to a top surface of a cryogenic freezer cover.
408 refers to an outer edge of a cryogenic freezer cover.
410 refers to a cryogenic freezer cover center point.
1000 refers to an apparatus for thermal regulation.
1100 refers to a mount section.
1110 refers to an outer perimeter of the mount section.
1120 refers to a first planar surface of the mount section.
1130 refers to a second planar surface of the mount section.
1140 refers to locator holes in the mount section.
1150 refers to a mount section center point
1200 refers to a plurality of fins.
1210 refers to a first end of a fin.
1220 refers to a second end of a fin.
1230 refers to a fin length dimension.
1240 refers to a first fin.
1250 refers to a plurality of intermediate fins.
1260 refers to a second fin.
1300 refers to a plurality of dividers.
1310 refers to a first edge of a divider.
1320 refers to a second edge of a divider.
1330 refers to a third edge of a divider.
1340 refers to a fourth edge of a divider.
2000 refers to a cable gland.
2100 refers to a rigid body.
2110 refers to a first body section.
2111 refers to a first body section circular perimeter.
2112 refers to a first body section first planar surface.
2113 refers to a first body section second planar surface.
2114 refers to a first annular protrusion.
2115 refers to a first annular protrusion inside diameter.
2116 refers to a first annular protrusion outside diameter.
2117 refers to a first body section slot.
2118 refers to a first body section hole.
2120 refers to a second body section.
2121 refers to a second body section circular perimeter.
2122 refers to a second body section first planar surface.
2123 refers to a second body section second planar surface.
2124 refers to a second annular protrusion.
2125 refers to a second annular protrusion inside diameter.
2126 refers to a second annular protrusion outside diameter.
2127 refers to a second body section slot.
2128 refers to a second body section hole.
2200 refers to a gasket.
2210 refers to a gasket inside diameter.
2220 refers to a gasket outside diameter.
2300 refers to an o-ring.
2310 refers to an o-ring inside diameter.
2320 refers to an o-ring outside diameter.
2400 refers to a cylindrical stud.
2500 refers to a cable gland cap.
2510 refers to a cable gland cap first end.
2520 refers to a cable gland cap second end.
2530 refers to a cable gland cap height dimension.
2540 refers to a cable gland cap hole.
2600 refers to a locking mechanism indentation.
2700 refers to a locking mechanism protrusion.
$r_1$ refers to a first radius of the first body section.
$r_2$ refers to a second radius of the second body section.
3000 refers to a bearing assembly.
3100 refers to a central stud.
3110 refers to a central stud first end.
3120 refers to a central stud second end.
3130 refers to an exterior surface of the central stud.
3140 refers to an interior surface of the central stud.
3150 refers to a central stud inside diameter.
3160 refers to a central stud outside diameter.
3170 refers to a keyway groove.
3180 refers to a snap-ring groove.
3190 refers to a hole.
3200 refers to a first flange.
3210 refers to a first flange first end.
3220 refers to a first flange second end.
3230 refers to a first flange exterior surface.
3240 refers to a first flange interior surface.
3250 refers to a first flange inside diameter.
3260 refers to a first flange outside diameter.
3270 refers to a first lip.
3300 refers to a second flange.
3310 refers to a second flange first end.
3320 refers to a second flange second end.
3330 refers to a second flange exterior surface.
3340 refers to a second flange interior surface.
3350 refers to a second flange inside diameter.
3360 refers to a second flange outside diameter.
3370 refers to a second lip.
3400 refers to a bearing cap.
3410 refers to a bearing cap first end.
3420 refers to a bearing cap second end.
3430 refers to a bearing cap exterior surface.
3440 refers to a bearing cap interior surface.
3450 refers to a bearing cap inside diameter.
3460 refers to a bearing cap outside diameter.
3470 refers to a third lip.
3475 refers to a third lip inside diameter.
3480 refers to a third flange.
3485 refers to slots.
3490 refers to screw holes.
3500 refers to a bushing.
3510 refers to a bushing first end.
3520 refers to a bushing second end.
3530 refers to a bushing inside diameter.
3540 refers to a bushing outside diameter.
3550 refers to a bearing.
3551 refers to a bearing inside diameter.
3552 refers to a bearing outside diameter.
3553 refers to an outer bearing race.
3554 refers to an inner bearing race.
3555 refers to bearing balls.
3600 refers to a stop washer.
3610 refers to a stop washer first end.
3620 refers to a stop washer second end.
3630 refers to a stop washer inside diameter.
3640 refers to a stop washer outside diameter.
3650 refers to a keyway.
3660 refers to a stop washer tapered surface.
3700 refers to a snap-ring.

4000 refers to a system for charging a coolant.
4100 refers to a first conduit.
4110 refers to a first conduit first end.
4115 refers to a first conduit inlet fitting.
4120 refers to a first conduit second end.
4125 refers to a first conduit outlet fitting.
4127 refers to a first phase separator.
4200 refers to a second conduit.
4225 refers to a second conduit outlet fitting.
4227 refers to a second phase separator.
4300 refers to a third conduit.
4327 refers to a third phase separator.
4400 refers to a D-shaped fitting.
4410 refers to a fitting first end.
4420 refers to a fitting second end.
4430 refers to a fitting length dimension.
4440 refers to a fitting cross sectional profile.
4442 refers to a flat surface.
4444 refers to a curved surface.
4450 refers to an inlet port.
4460 refers to an outlet port.
5000 refers to a venting system.
5100 refers to a lid conduit.
5110 refers to a lid conduit sidewall.
5200 refers to a vent hole.
5210 refers to a first vent hole edge.
5220 refers to a second vent hole edge.
5230 refers to a third vent hole edge.
5300 refers to a lid.
5310 refers to a hinge.
5320 refers to a lid insulation member.
5330 refers to a center point of the lid.
5400 refers to a duct.
5410 refers to a first duct sidewall.
5420 refers to a second duct sidewall.
6000 refers to a handle.
6100 refers to a handle first end.
6200 refers to a handle second end.
6300 refers to a handle length dimension.
6400 refers to a handle center point.
7010 refers to a light emitting diode.
7100 refers to a metal core printed circuit board.
7110 refers to a resistor.
7120 refers to a lighting element.
7130 refers to a wire.
7140 refers to an outer perimeter.
7150 refers to a first planar surface.
7160 refers to a second planar surface.
7170 refers to a plurality of holes.
7200 refers to a mounting platform.
7210 refers to a plurality of threaded holes.
7300 refers to a thermal interface membrane.
7400 refers to a screw.
7500 refers to a lens.
7510 refers to a plurality of lens holes.

FIG. 1 depicts a cryogenic freezer (100). As shown in FIG. 1, the cryogenic freezer may comprise an outer tank (120) having an outer tank sidewall (126), a control unit (200), a step (300), a lid (5300), and a handle (6000).

Figure 2:
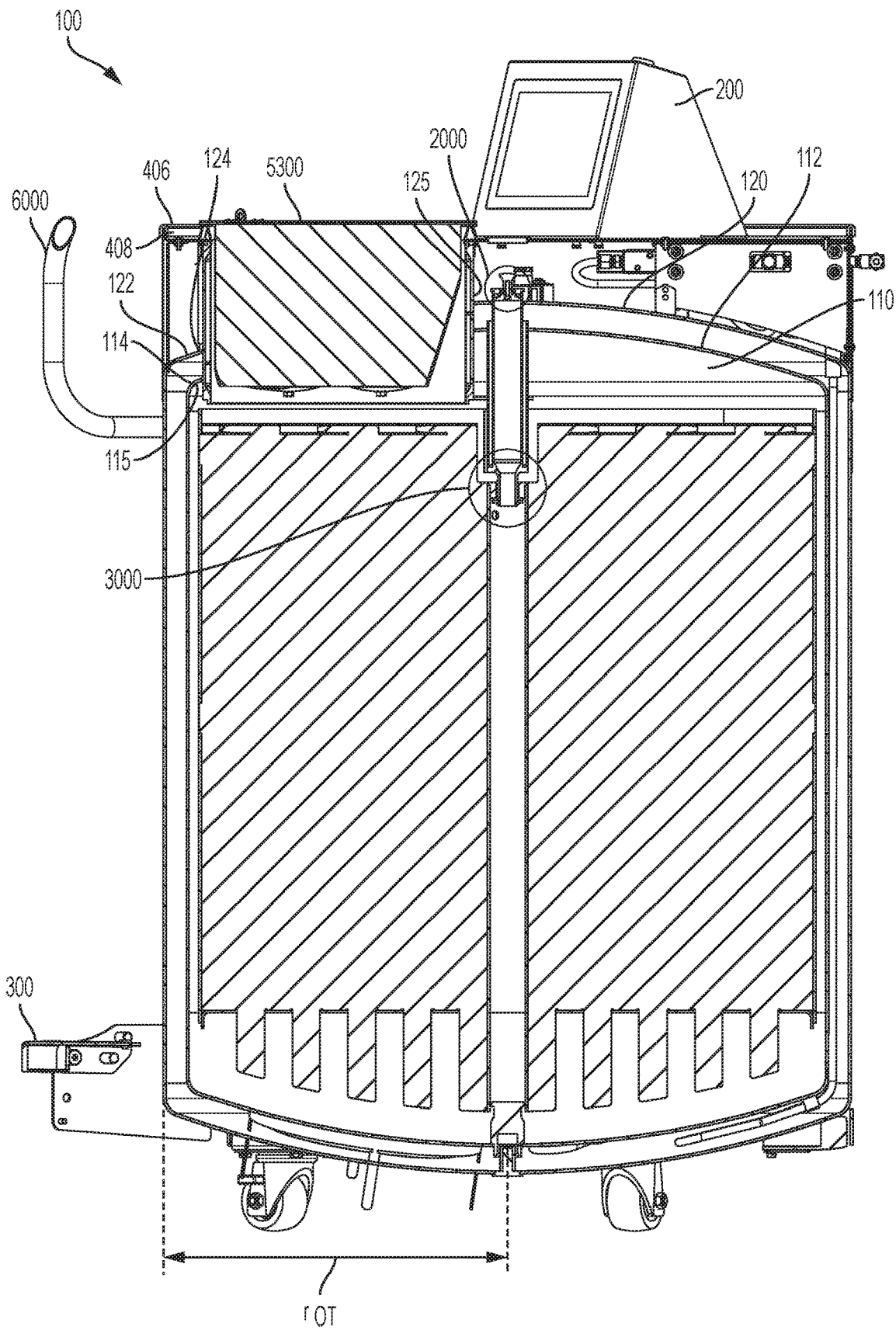
FIG. 2 shows a cut-away side view of the embodiment of the cryogenic freezer of FIG. 1.

FIG. 2 depicts a cross-section view of a cryogenic freezer of the type shown in FIG. 1. As shown in FIG. 2, the cryogenic freezer may comprise an inner tank (110) disposed within an outer tank (120) with a vacuum space provided between the two tanks. The cryogenic freezer depicted in FIG. 2 may further comprise an apparatus for thermal regulation (1000) disposed within the inner tank. FIG. 2 also shows a cable gland (2000) located at the top of a central shaft assembly, and a bearing assembly (3000) for suspending a turn-table inside the inner tank.

The Apparatus for Thermal Regulation

FIG. 3 to FIG. 7 depict various embodiments of an apparatus for thermal regulation (1000) in a cryogenic freezer as described herein.

Figure 3:
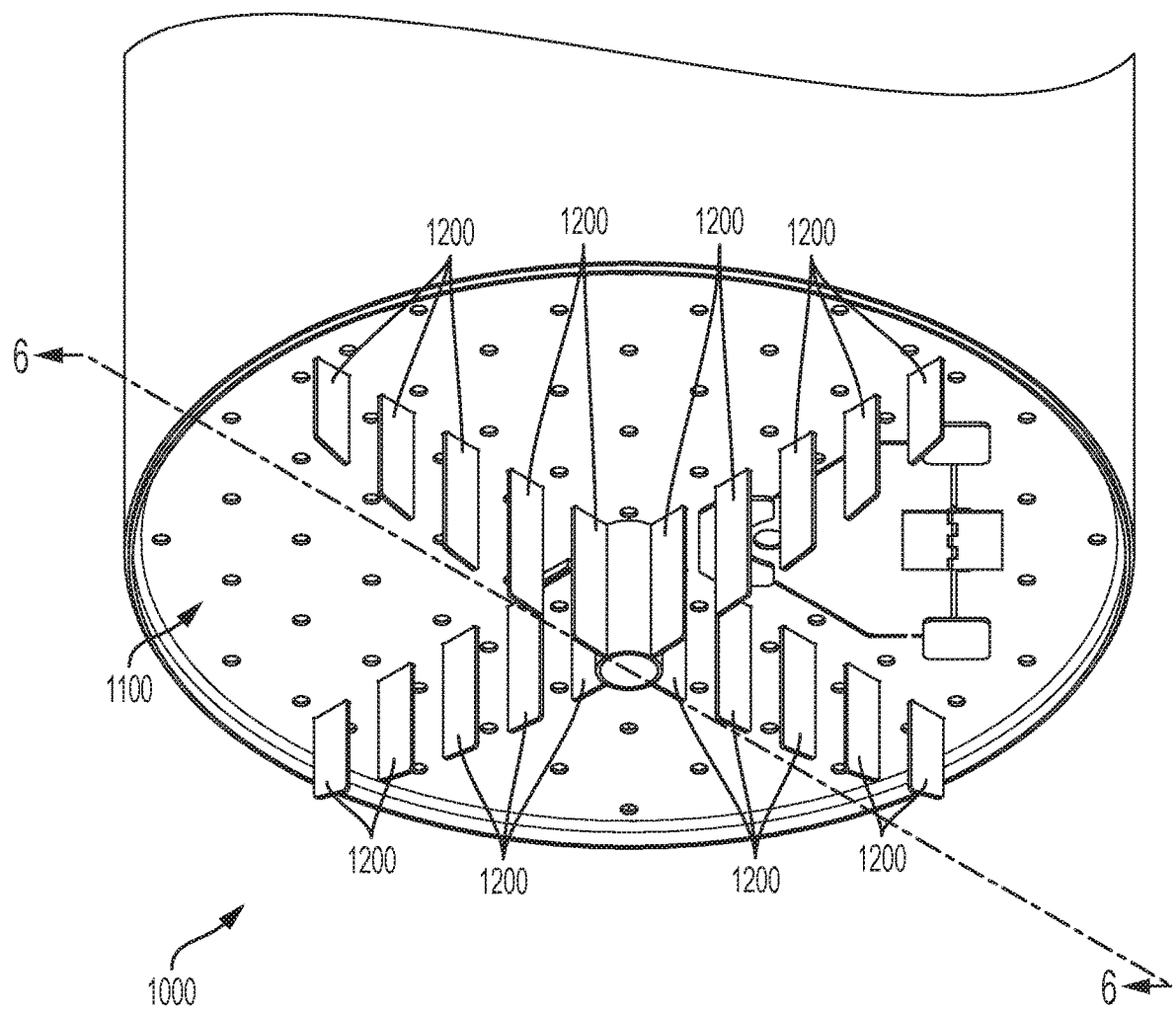
FIG. 3 shows a perspective view of a portion of an embodiment of an apparatus for thermal regulation in a cryogenic freezer as described herein.

FIG. 3 depicts a perspective view of an apparatus for thermal regulation (1000). As shown in FIG. 3, the apparatus for thermal regulation may comprise a mount section (1100), which may be located at or near the bottom of the turn-table. The apparatus may further comprise a plurality of fins (1200) extending from the mount section.

Figure 4:
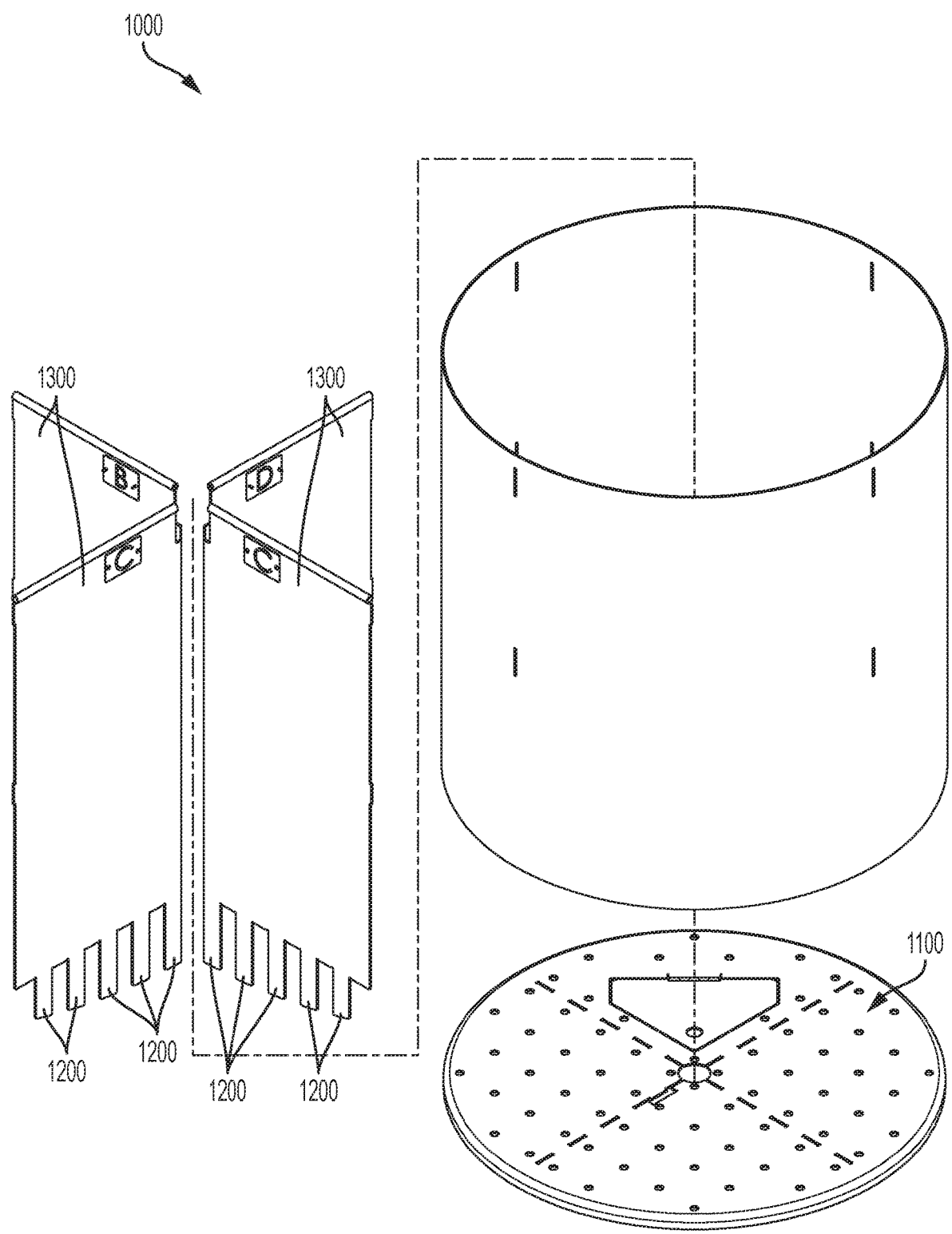
FIG. 4 shows an exploded perspective view of the embodiment of an apparatus for thermal regulation in a cryogenic freezer of FIG. 3.

FIG. 4 depicts an exploded perspective view of the apparatus for thermal regulation (1000) shown in FIG. 3. As shown in FIG. 4, the apparatus for thermal regulation may further comprise a plurality of dividers (1300) disposed within the turn-table. FIG. 4 shows each of the plurality of fins (1200) directly attached to one of the plurality of dividers. In certain embodiments, at least one fin of the plurality of fins may be directly attached to the mount section (1100).

As used herein and in the claims, when referring to the apparatus for thermal regulation, "directly attached" means that two or more components are permanently affixed to one another. Examples of such permanent affixment include, but are not limited to, welding one component to another, an adhesive bond between one component and another, or manufacturing two components from one integral piece of material.

Figure 5A:
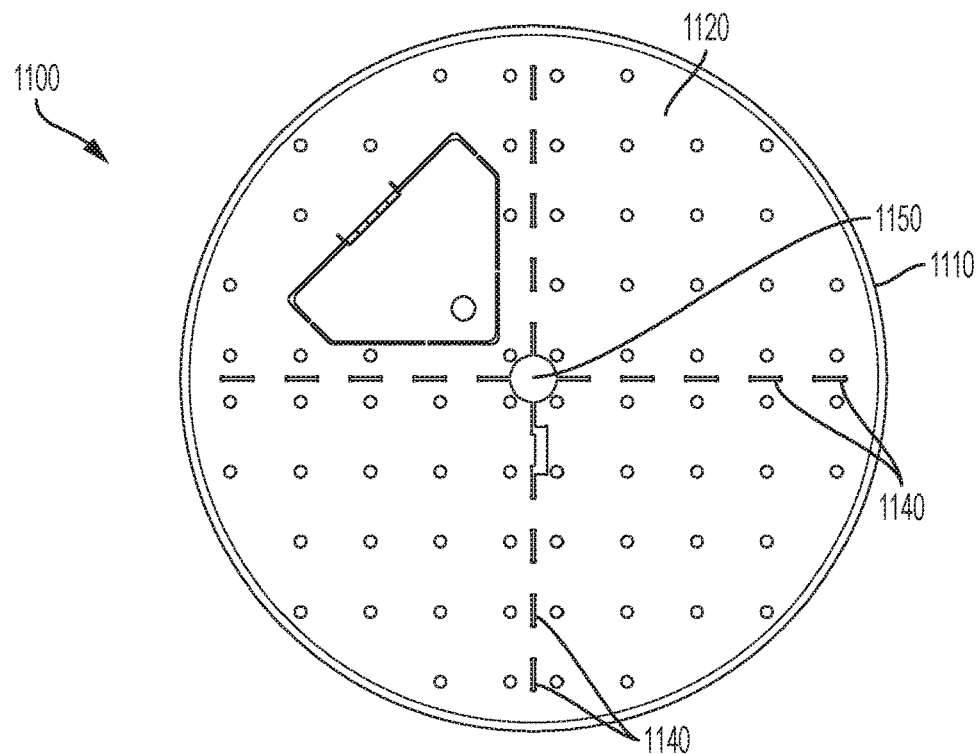
FIG. 5A shows a bottom view of an embodiment of a mount section for an apparatus for thermal regulation in a cryogenic freezer as described herein.

FIG. 5A shows one side of the mount section (1100) having an outer perimeter (1110). The outer perimeter defines a first planar surface (1120). FIG. 5A also shows a plurality of locator holes (1140). The locator holes allow one or more of the plurality of fins to pass through the mount section in embodiments where at least one fin of the plurality of fins is directly attached to a divider. While the plurality of locator holes are arranged in an "X" pattern in FIG. 5A, one of ordinary skill will recognize that the number, size, shape, and orientation of the locator holes will be dependent upon the number, size, shape, and location of the fins, and may also be dependent upon the number and location of the dividers. In embodiments, where all of the plurality of fins are directly attached to the first planar surface of the mount section, there may be no locator holes at all.

Figure 5B:
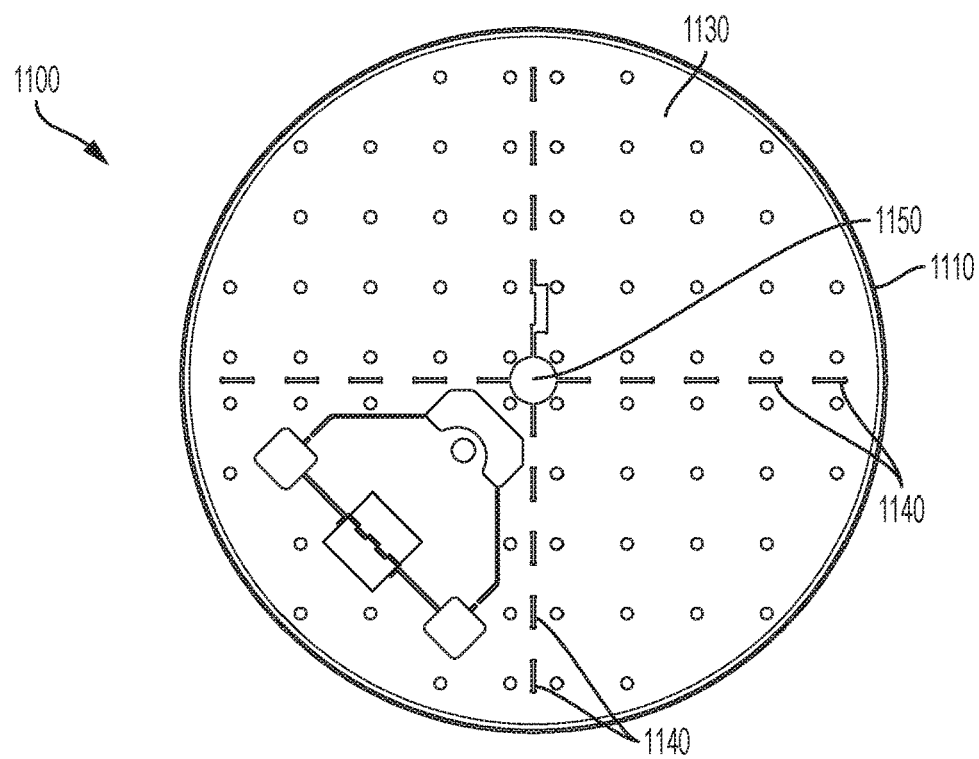
FIG. 5B shows a top view of the embodiment of a mount section for an apparatus for thermal regulation in a cryogenic freezer of FIG. 5A.

FIG. 5B shows the opposite side of the mount section (1100) shown in FIG. 5A. As shown in FIG. 5B, the outer perimeter (1110) of mount section defines a second planar surface (1130) opposite the first planar surface depicted in FIG. 5A. When one or more of the plurality of fins is directly attached to the mount section, it is preferred that said fins be directly attached to the second planar surface. As shown in FIG. 5A and FIG. 5B, each of the plurality of locator holes (1140) passes through the mount section from the first planar surface to the second planar surface. In embodiments where one or more of the plurality of fins is directly attached to a divider, each fin that is attached to a divider preferably extends through one of the plurality of locator holes from the second planar surface to the first planar surface. FIG. 5A and FIG. 5B also show a mount section center point (1150).

Figure 6:
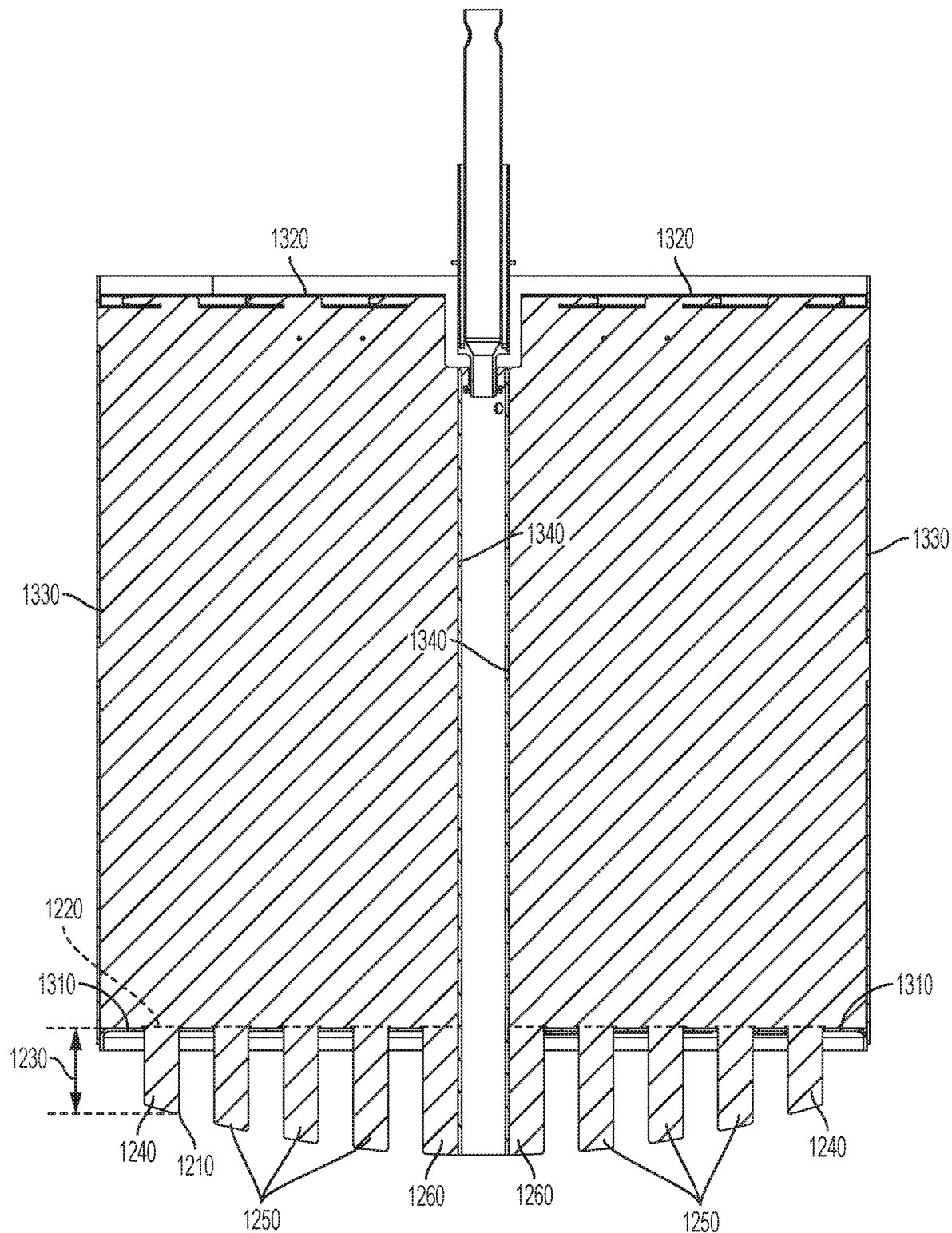
FIG. 6 shows a side view of an embodiment of an apparatus for thermal regulation in a cryogenic freezer as described herein.

FIG. 6 shows the arrangement of a plurality of fins (1200) along two dividers of a plurality of dividers (1300). As shown in FIG. 6, each divider has a first edge (1310), a second edge (1320) opposite the first edge, a third edge (1330) spanning a distance between the first edge and the second edge, and a fourth edge (1340) opposite the third edge and also spanning the distance between the first edge and the second edge. In some embodiments, the first edge of at least one divider of the plurality of dividers may be directly attached to the second planar surface of the mount section. In some embodiments, the first edge of each divider of the plurality of dividers may be directly attached to the second planar surface.

FIG. 6 depicts a plurality of fins (1200) directly attached to the first edge (1310) of one of the two dividers. As shown in FIG. 6, the plurality of fins directly attached to each divider comprise a first fin (1240) located proximate to the outer perimeter, a second fin (1260) located proximate to the mount section center point, and a plurality of intermediate fins (1250) located between the first fin and the second fin.

As also shown in FIG. 6, each fin of the plurality of fins has a first end (1210), a second end (1220) opposite the first end, and a fin length dimension (1230) spanning from the first end to the second end. When assembled, the second end of each fin of the plurality of fins will be located adjacent to the first planar surface of the mount section. FIG. 6 shows the fin length dimension of the first fin being less than the fin length dimension of the second fin while the fin length dimension of each fin of the plurality of intermediate fins is greater than the fin length dimension of the first fin and less than the fin length dimension of the second fin. As shown in FIG. 6, the fin length dimension of each individual fin of the plurality of intermediate fins increases as the plurality of intermediate fins extends from the first fin towards the second fin. This arrangement of varied fin length dimensions is thought to improve the thermal transfer capabilities of the apparatus by enabling at least one fin of the plurality of fins to be maintained in a contact with a cryogen located in the bottom of the inner tank as the cryogen level rises or lowers.

Figure 7:
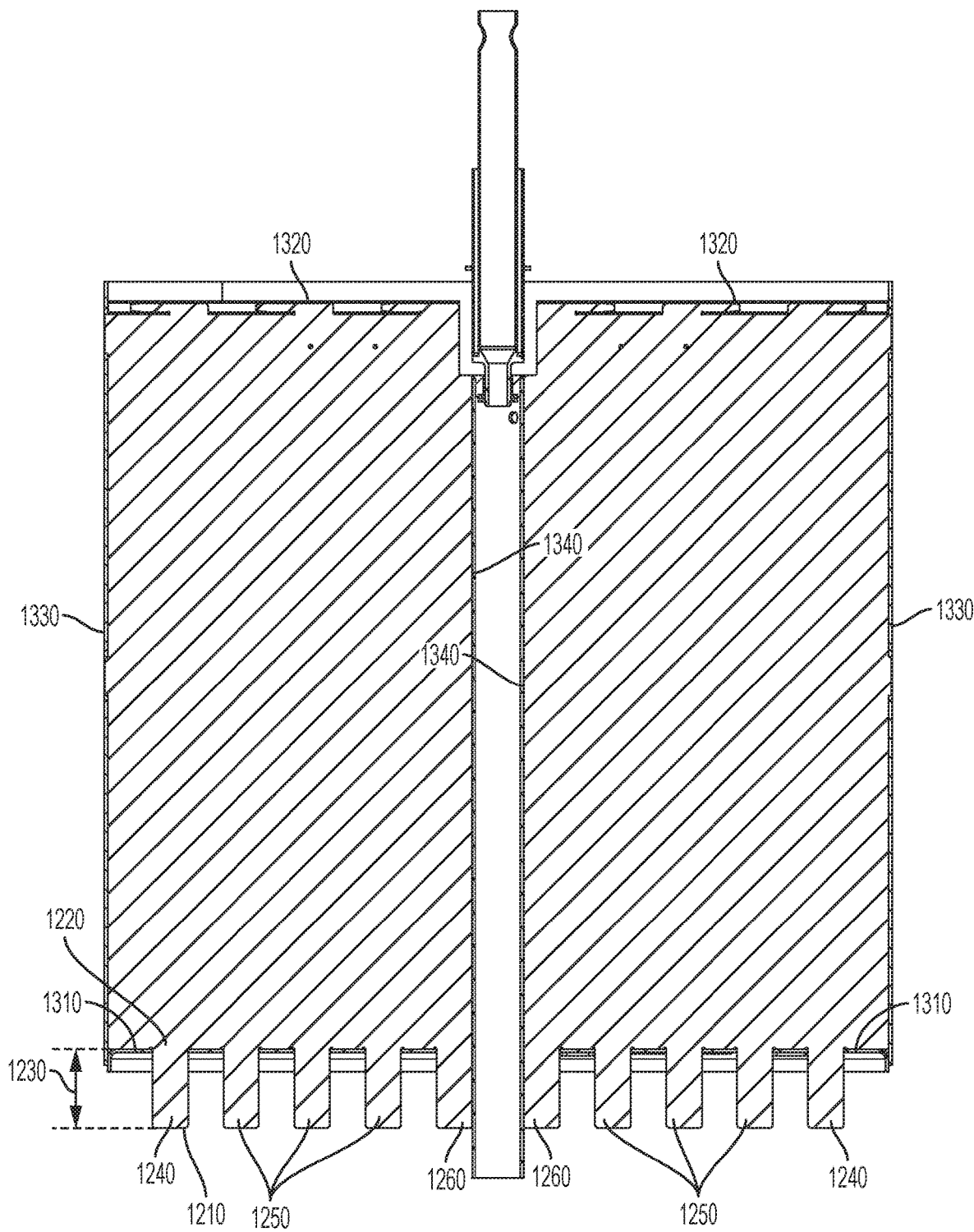
FIG. 7 shows a side view of an embodiment of an apparatus for thermal regulation in a cryogenic freezer as described herein.

FIG. 7 shows an alternative embodiment wherein the fin length dimension of each fin of the plurality of fins is identical or substantially identical.

Regardless of whether the fins are directly attached to the second planar surface or the first edge of a divider, it is preferable that one or more fins of the plurality of fins be located at a position on the second planar surface corresponding to a position on the first planar surface at which at least one divider of the plurality of dividers is located. Preferably, each fin of the plurality of fins will be located at a position on the second planar surface corresponding to a position on the first planar surface at which at least one divider of the plurality of dividers is located. Locating the fins in alignment with the dividers is thought to improve the ability of the thermal regulation system to transfer cold temperature from a cryogen located in the bottom of the inner tank throughout the storage area inside the inner tank.

The inventors surprisingly discovered that the apparatus for thermal regulation provides for a more even distribution of temperature through the cryogenic storage area within the cryogenic freezer. Without wishing to be bound by any theory, it believed that, when the various fins extend into the cryogen within the inner tank, the fins transfer the low temperature from the cryogen through the fins and along the dividers from the bottom of the dividers to the top of the dividers thereby providing for a more even temperature distribution throughout the cryogenic storage area.

Cable Gland

FIG. 8 to FIG. 12 depict various embodiments of a cable gland (2000) as described herein.

Figure 8:
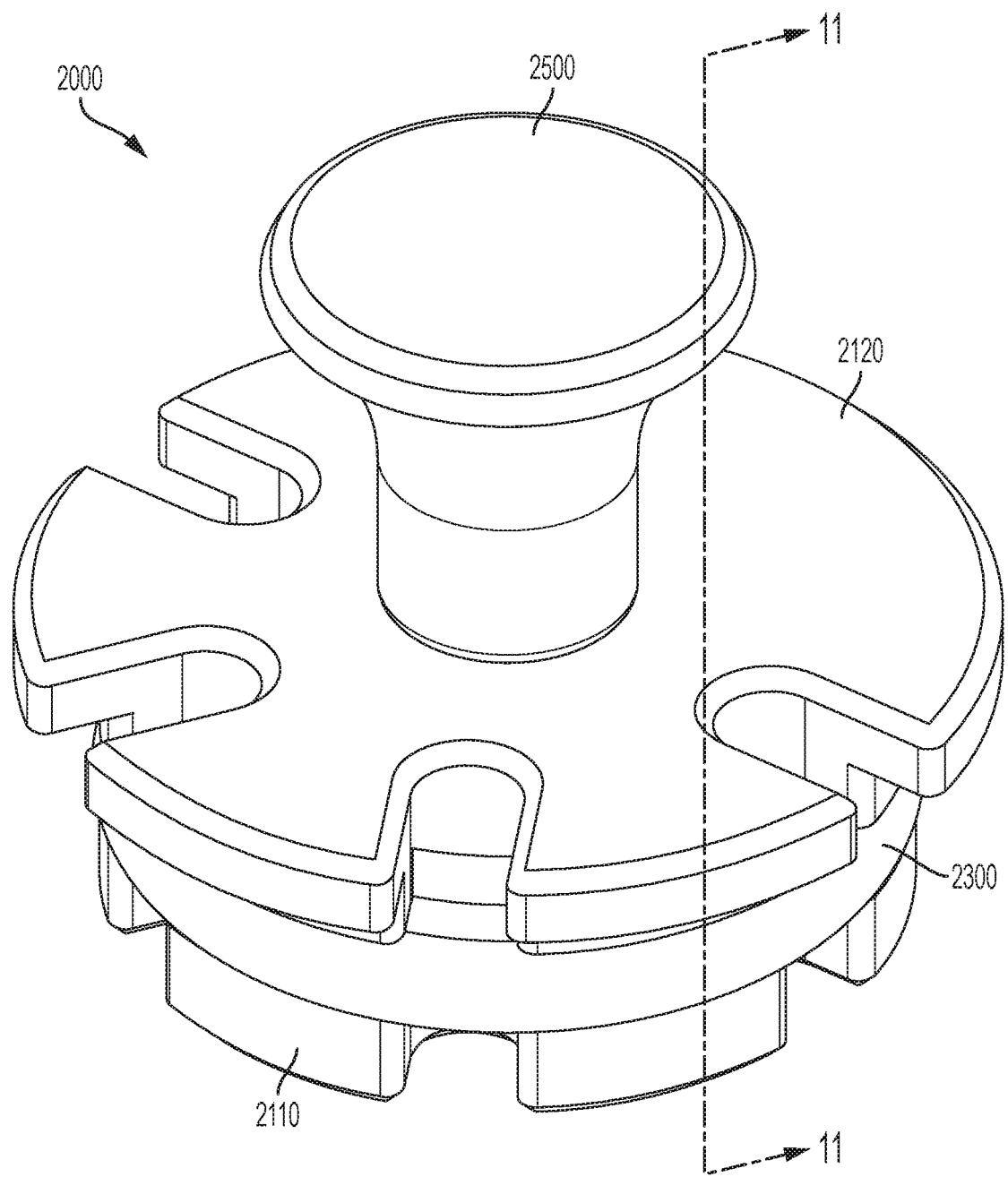
FIG. 8 shows a perspective view of an embodiment of a cable gland as described herein.

As shown in FIG. 8, the cable gland (2000) comprises a rigid body (2100) having a first body section (2110) and a second body section (2120). The cable gland may also comprise an o-ring (2300) disposed between the first body section and the second body section. The cable gland may further comprise a cable gland cap (2500).

Figure 9:
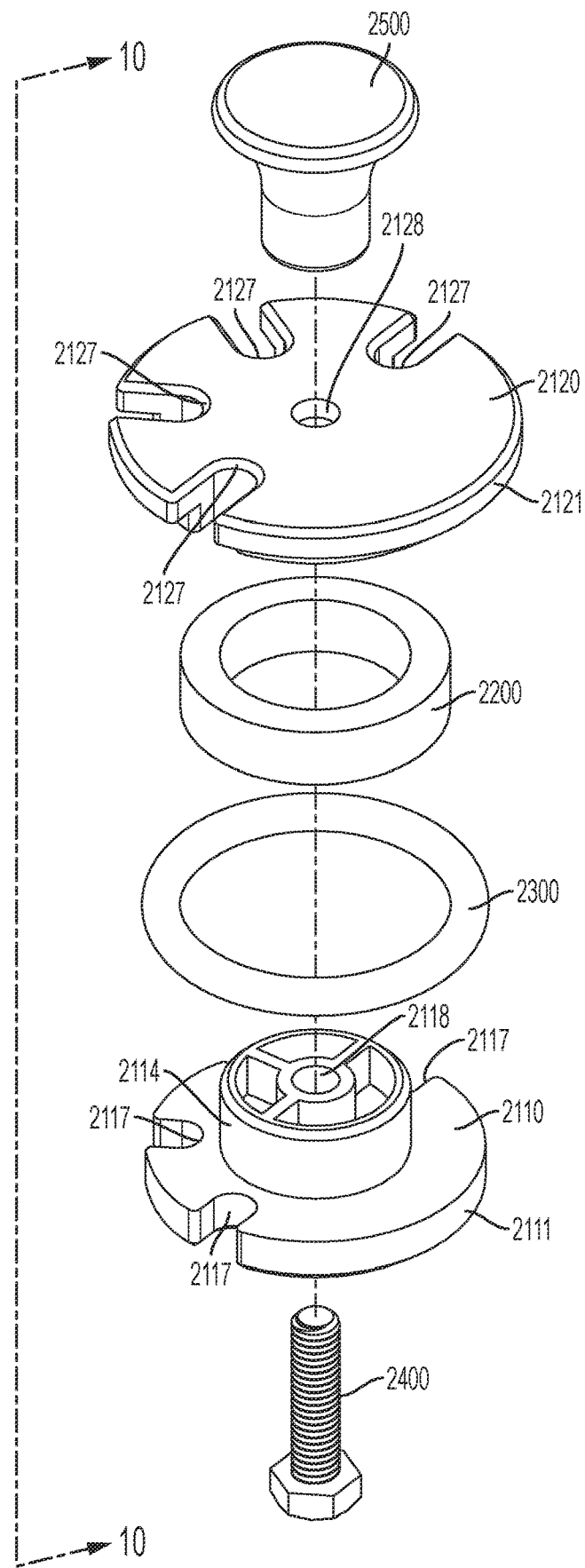
FIG. 9 shows an exploded perspective view of the embodiment of the cable gland of FIG. 8.

FIG. 9 shows an exploded perspective view of the cable gland (2000) shown in FIG. 8. FIG. 9 shows the cable gland comprising a first body section (2110), a second body section (2120), a gasket (2200) disposed between the first body section and the second body section, an o-ring (2300) disposed between the first body section and the second body section, a cylindrical stud (2400), and a cable gland cap (2500).

As shown in FIG. 9, the first body section (2110) has a first body section circular perimeter (2111), a first annular protrusion (2114), and at least one first body section slot (2117). In some embodiments, the first body section may also comprise a first body section hole (2118) through which the cylindrical stud passes. As also shown in FIG. 9, the second body section has a second body section circular perimeter (2121), at least one second body section slot (2127), and a second body section hole (2128) through which the cylindrical stud may pass.

Figure 10:
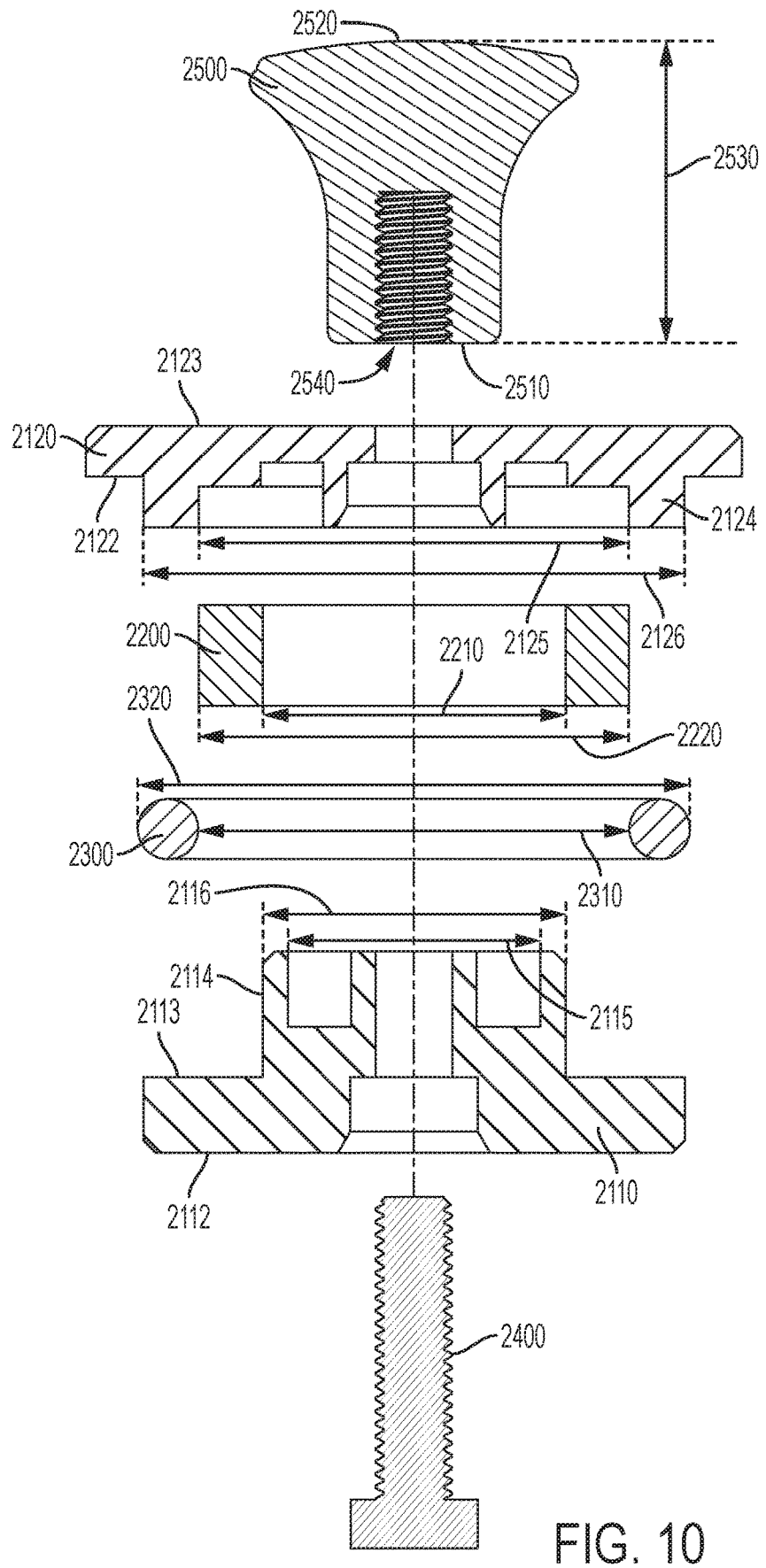
FIG. 10 shows an exploded cut-away view of the embodiment of the cable gland of FIG. 8.

FIG. 10 shows an exploded cut-away view of the cable gland (2000) shown in FIG. 8. As shown in FIG. 10, the first body section (2110) has a first body section first planar surface (2112) and a first body section second planar surface (2113) opposite the first body section first planar surface. The first body section first planar surface and the first body section second planar surface are each defined by the first body section circular perimeter as shown in FIG. 9. FIG. 10 also shows the first annular protrusion (2114) extending from the first body section first planar surface. As shown in FIG. 10, the first annular protrusion has a first annular protrusion inside diameter (2115) and a first annular protrusion outside diameter (2116). The first body section hole, when present, may pass from the first body section first planar surface through the first body section second planar surface and the first annular protrusion.

As further shown in FIG. 10, the second body section (2120) has a second body section first planar surface (2122) and a second body section second planar surface (2123) opposite the second body section first planar surface. The second body section first planar surface and the second body section second planar surface are each defined by the second body section circular perimeter as shown in FIG. 9. FIG. 10 also shows a second annular protrusion (2124) extending from the second body section first planar surface. As shown in FIG. 10, the second annular protrusion has a second annular protrusion inside diameter (2125) and a second annular protrusion outside diameter (2126). The second body section hole may pass from the second body section first planar surface through the second body section second planar surface and the second annular protrusion.

As further shown in FIG. 10, the gasket (2200) has a gasket inside diameter (2210) and a gasket outside diameter (2220). The gasket may be comprised of a gasket material having a gasket material density. The gasket material density may be in a range selected from the group consisting of between 450 kg/m$^3$ and 650 kg/m$^3$, between 450 kg/m$^3$ and 600 kg/m$^3$, between 450 kg/m$^3$ and 550 kg/m$^3$, between 450 kg/m$^3$ and 500 kg/m$^3$, between 500 kg/m$^3$ and 650 kg/m$^3$, between 550 kg/m$^3$ and 650 kg/m$^3$, and between 600 kg/m$^3$ and 650 kg/m$^3$.

FIG. 10 also shows the o-ring (2300) having an o-ring inside diameter (2310) and an o-ring outside diameter (2320). The o-ring may be comprised of an o-ring material having an o-ring material density. The o-ring material density may be in a range selected from the group consisting of between 450 kg/m$^3$ and 650 kg/m$^3$, between 450 kg/m$^3$ and 600 kg/m$^3$, between 450 kg/m$^3$ and 550 kg/m$^3$, between 450 kg/m³ and 500 kg/m³, between 500 kg/m³ and 650 kg/m³, between 550 kg/m³ and 650 kg/m³, and between 600 kg/m³ and 650 kg/m³.

FIG. 10 also shows the cable gland cap (2500) having a cable gland cap first end (2510), a cable gland cap second end (2520) opposite the cable gland cap first end, a cable gland cap height dimension (2530) spanning from the cable gland cap first end to the cable gland cap second end, and a cable gland cap hole (2540). As shown in FIG. 10, the cable gland cap hole may extend from the cable gland cap first end through at least a portion of the cable gland cap height dimension. In some embodiments, the cable gland cap hole may extend from the cable gland cap first end through the entire cable gland cap height dimension and the cable gland cap second end. As shown in FIG. 10, the cable gland cap hole may have a threaded inside diameter. It is preferred that the threaded inside diameter of the cable gland cap hole be mated to the threaded outside diameter of the cylindrical stud allowing the cable gland cap to be threaded onto the cylindrical stud.

An alternative to a threaded outside diameter of the cylindrical stud and a threaded inside diameter of the cable gland cap hole is a cam latch mechanism. In the cam latch mechanism (not shown), the cylindrical stud may comprise a male cam latch element while the cable gland cap hole comprises a female cam latch element. When assembled, the cable gland cap is connected to the cylindrical stud by mating the male cam latch element to the female cam latch element.

When assembled, the gasket inside diameter may be mated to the first annular protrusion outside diameter. Similarly, the o-ring inside diameter may be mated to the gasket outside diameter. Further, the first annular protrusion outside diameter may be mated to the second annular protrusion inside diameter.

As used herein and in the claims, "mated to" means that the inside diameter of one component fits around the outside diameter of another component having a snug fit, also known as a tight fit. For example, if the outside diameter of one component is 1 cm, the inside diameter of another component that is mated to the outside diameter of the first component should be slightly greater than 1 cm.

Figure 11:
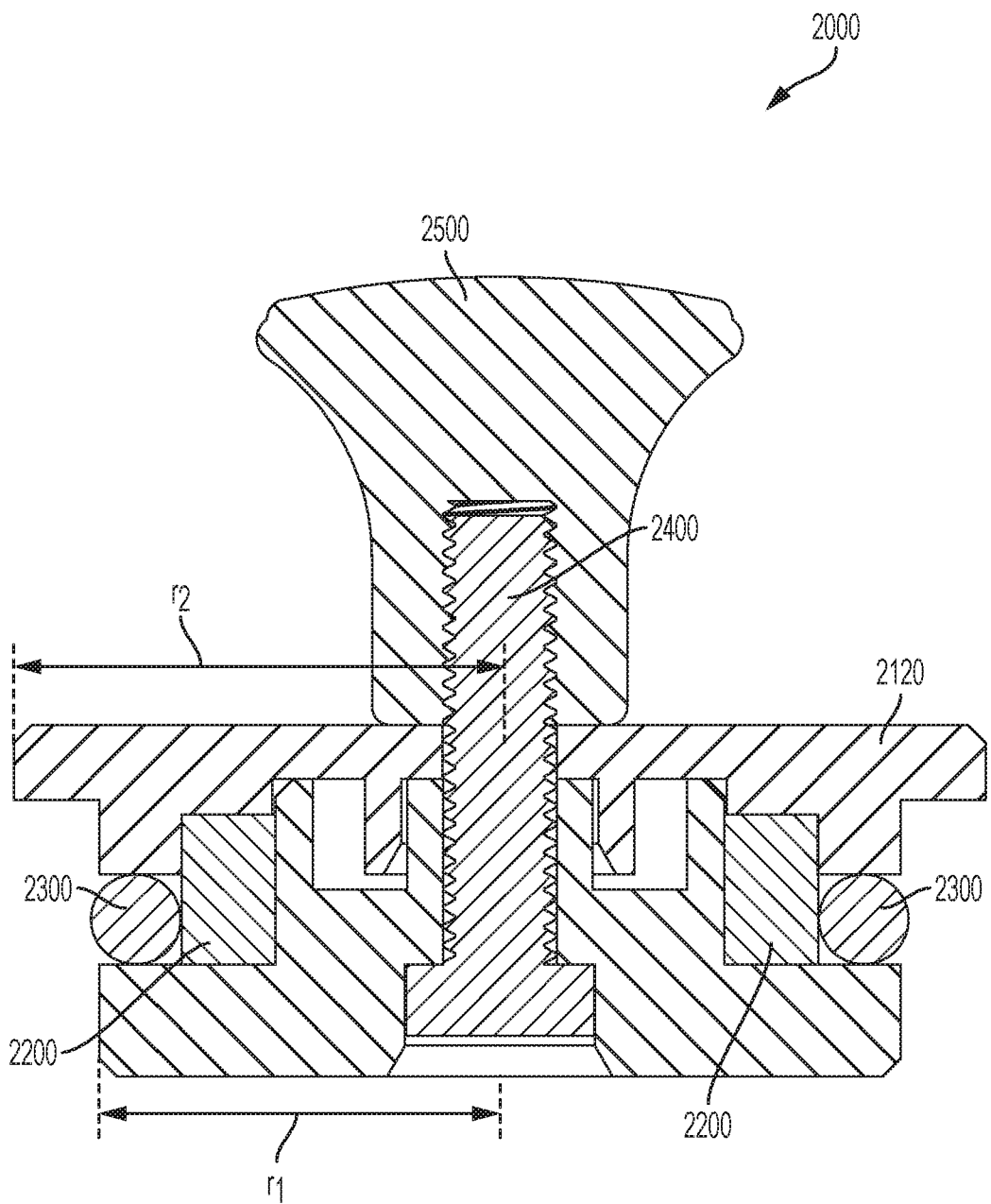
FIG. 11 shows an assembled cut-away view of the embodiment of the cable gland of FIG. 8.

FIG. 11 shows an assembled cross section view of the cable gland (2000). As shown in FIG. 11, as the cable gland cap (2500) is threaded further onto the cylindrical stud (2400), the distance between the first body section (2110) and the second body section decreases. This places a compressive force upon the gasket (2200) and the o-ring (2300) forcing the inside diameter of the o-ring and the outside diameter of the gasket to distort closer to one another while also forcing the outside diameter of the o-ring to expand. These compressive forces provide the force necessary to seal the cable gland to the sidewall of a tube (not shown) by increasing the outside diameter of the o-ring. Also, the compressive forces provide the force necessary to seal a cable, wire, or other element disposed from a second body section slot, between the outside diameter of the gasket and the inside diameter of the o-ring, and through the first body section slot. It is believed that such sealing is improved when the first density is not equal to the second density, although embodiments may exist in which the first density is equal to the second density. In embodiments where the first density is equal to the second density, it is preferred that both the first density and the second density are a low density defined as being in the range of between 450 kg/m³ and 550 kg/m³. Examples of such low density materials include foamed silicone. When the first density is not equal to the second density, the first density may be greater than or less than the second density. In some embodiments, the first density may be greater than the second density. In other embodiments, the second density may be greater than the first density. FIG. 11 also shows the cylindrical stud (2400) extending from the top surface of the first annular protrusion. As shown in FIG. 11, the cylindrical stud has a threaded outside diameter.

FIG. 11 also shows the first radius ($r_1$) of the first body section and the second radius ($r_2$) of the second body section. In a preferred embodiment, the first radius of the first body section is less than the second radius of the second body section as shown in FIG. 10.

Figure 12:
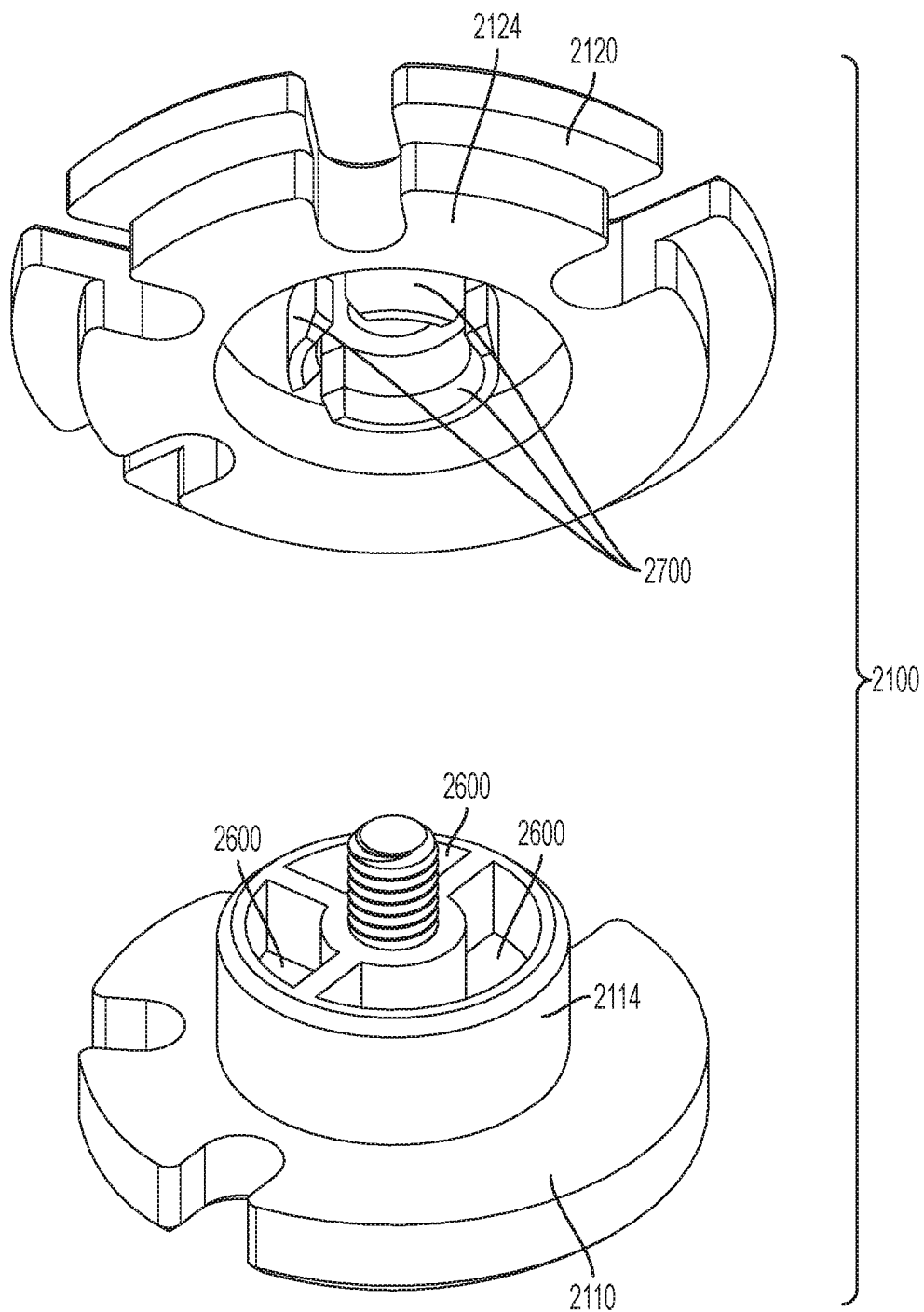
FIG. 12 shows perspective views of an embodiment of a first body section and a second body section of a cable gland as described herein.

FIG. 12 shows perspective views of the first body section (2110) and the second body section (2120) of the rigid body (2100). As shown in FIG. 12, the first annular protrusion comprises a plurality of locking mechanism indentations (2600) within the first annular protrusion inside diameter while the second annular protrusion comprises a plurality of locking mechanism protrusions (2700) within the second annular protrusion inside diameter. When assembled, the plurality of locking mechanism indentations interact with the plurality of locking mechanism protrusions to prevent or reduce the ability of the first body section to rotate relative to the second body section. This allows at least one first body section slot to maintain a vertical alignment with at least one second body section slots as a cable, wire, or other element is disposed from the second body section slot, between the outside diameter of the gasket and the inside diameter of the o-ring, and through the first body section slot. Preferably, each first body section slot will maintain a vertical alignment with each second body section slot as a cable, wire, or other element is disposed from a second body section slot, between the outside diameter of the gasket and the inside diameter of the o-ring, and through a first body section slot. One of ordinary skill will recognize that the locking mechanism components may be reversed in some embodiments. In other words, the first annular protrusion may comprise a plurality of locking mechanism protrusions within the first annular protrusion inside diameter while the second annular protrusion may comprise a plurality of locking mechanism indentations within the second annular protrusion inside diameter.

The at least one first body section slot (2117) will originate from a first position of the first body section circular perimeter and pass from the first body section first planar surface through the first body section second planar surface. Similarly, the at least one second body section slot (2127) will originate from a first position of the second body section circular perimeter and pass from the second body section first planar surface through the second body section second planar surface.

The at least one first body section slot may comprise a number of first body section slots depending upon—amongst other factors—the type, number, and arrangement of cables, wires, or other elements passing through the cable gland. The number of first body section slots may be selected from the group consisting of at least two, at least four, at least six, or at least eight. Preferably, each first body section slot may be located at a separate position of the first body section circular perimeter.

Similarly, the at least one second body section slot may comprise a number of second body section slots depending upon—amongst other factors—the type, number, and arrangement of cables, wires, or other elements passing through the cable gland. The number of second body section slots may be selected from the group consisting of at least two, at least four, at least six, or at least eight. Preferably, each second body section slot may be located at a separate position of the second body section circular perimeter.

The first body section, the second body section, and the cable gland cap may each independently be made from a material selected from the group consisting of polyethylene, nylon, aluminum, steel, or stainless steel. Preferably, the cable gland cap is made of a material selected from the group consisting of polyethylene, nylon, or related plastics.

The gasket and the o-ring may each independently be made from a material selected from the group consisting of silicone or foamed silicone. In preferred embodiments, the gasket is made from foamed silicone while the o-ring is made of silicone or vice versa.

The inventors surprisingly discovered that an improved sealing can be achieved for wires, cables, temperature probes, and the like which are disposed into various locations within the inner tank and/or the outer tank when the cable gland utilizes and o-ring and a gasket of different densities as described herein, or when the cable gland utilizes and o-ring and a gasket of the same or similar low density materials as described herein.

The Bearing Assembly

FIG. 13A to FIG. 19 depict various embodiments of a bearing assembly (3000) as described herein.

Figure 13A:
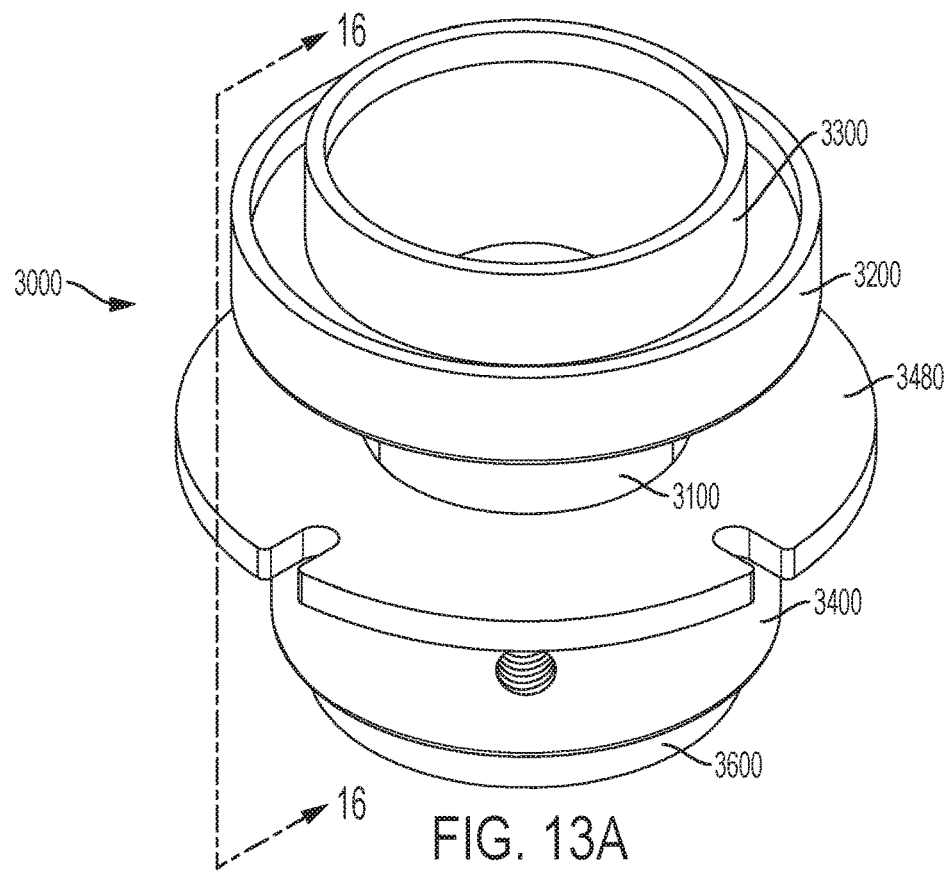
FIG. 13A shows a perspective view of an embodiment of a bearing assembly as described herein.
Figure 13B:
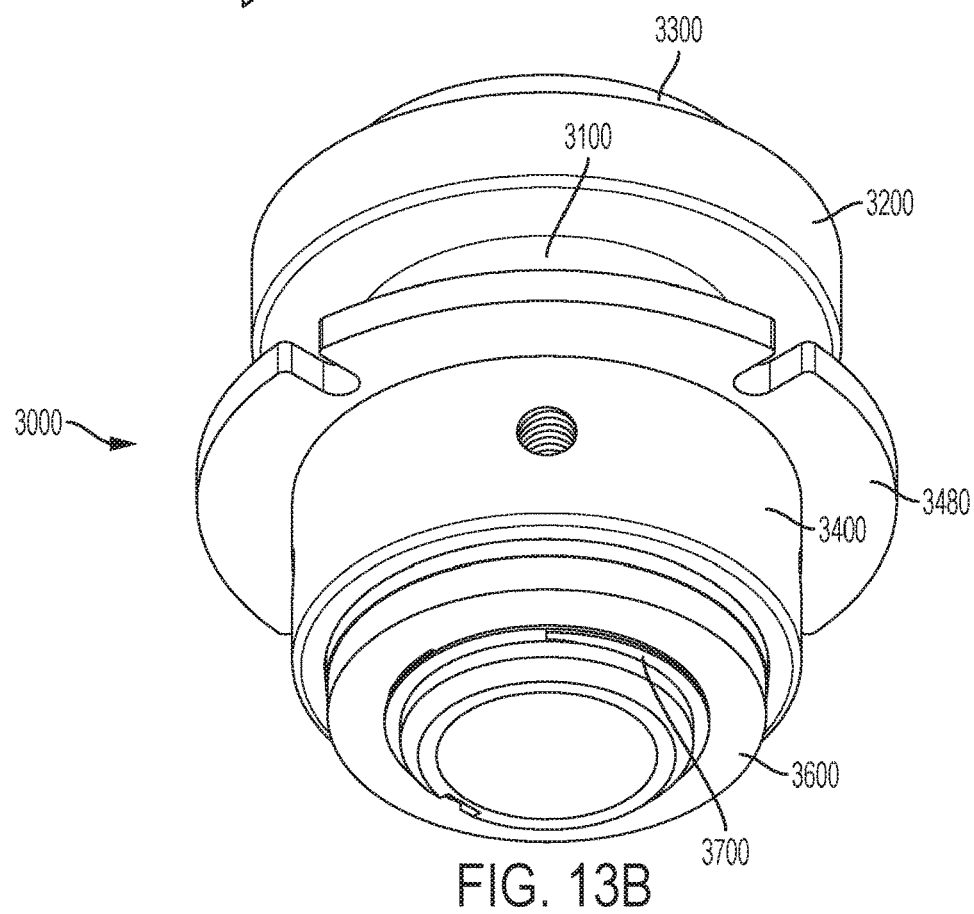
FIG. 13B shows an alternative perspective view of the embodiment of the bearing assembly of FIG. 13A.

FIG. 13A and FIG. 13B show the bearing assembly (3000) having a central stud (3100), a first flange (3200), a second flange (3300), a bearing cap (3400) having a third flange (3480), a stop washer (3600), and a snap-ring (3700).

Figure 14:
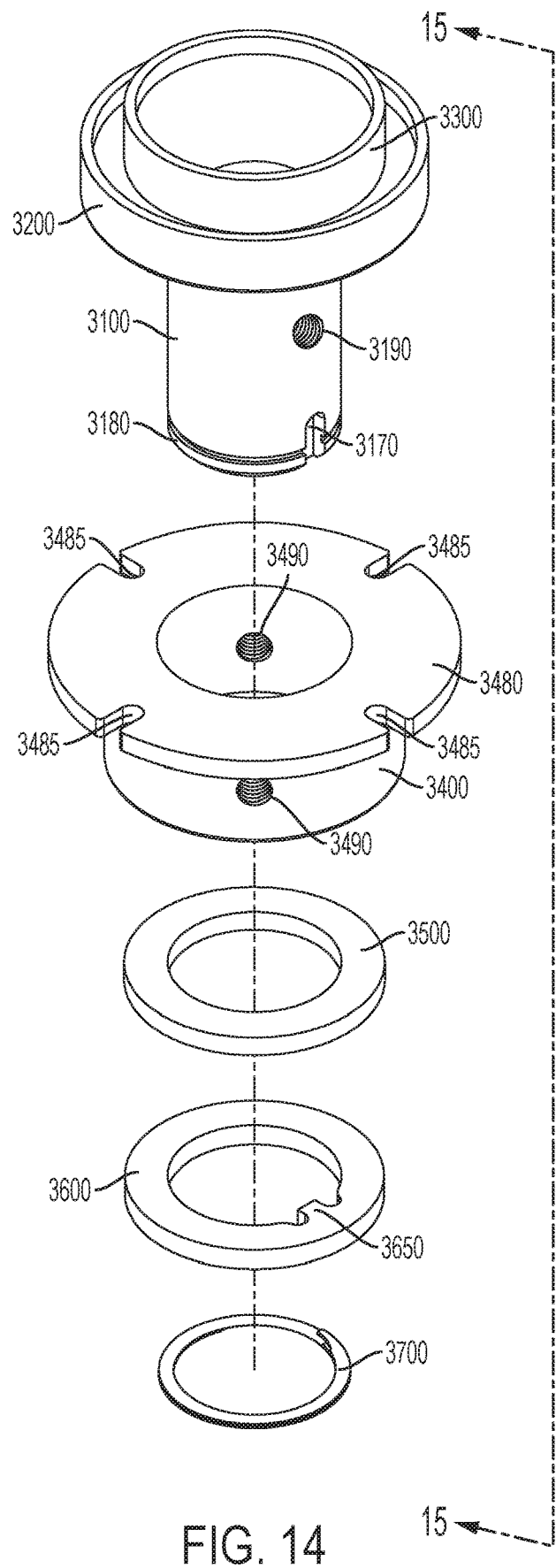
FIG. 14 shows an exploded perspective view of the embodiment of the bearing assembly of FIG. 13A.

FIG. 14 shows an exploded perspective view of one embodiment of a bearing assembly (3000). As shown in FIG. 14, the bearing assembly has a central stud (3100). The central stud has a keyway groove (3170) disposed into a central stud exterior surface originating from a central stud first end and extending towards a central stud second end. The central stud also has a snap-ring groove (3180) disposed into the central stud exterior surface proximate to the central stud first end. The snap-ring groove may span a circumference of the central stud outer surface. The central stud may also comprise a hole (3190) passing from a central stud exterior surface to a central stud interior surface. This hole, when present, may be located proximate to the central stud second end, and may be used to route additional elements such as cables and wires through a hollow interior of the central stud.

FIG. 14 also shows the first flange (3200) attached to the central stud at the central stud second end. Further shown is the second flange (3300) attached to the first flange.

FIG. 14 also shows a bearing cap (3400). As shown, the bearing cap may have a third flange (3480) extending from a bearing cap exterior surface proximate to a bearing cap second end. The third flange may comprise a plurality of slots (3485) located along a circumference of the third flange. The plurality of slots may be present in order to allow the third flange of the bearing cap to fit over a series of dividers (1300 as shown in FIG. 4) without allowing the bearing cap to rotate or at least reducing the amount of rotation. The number and location of the slots may be dependent—at least partially—upon the number and location of dividers. In one example, the plurality of slots may comprise at least two slots located approximately 180° or 180° apart from one another along the circumference of the third flange. In another embodiment, the plurality of slots may comprise at least three slots located approximately 120° or 120° apart from one another along the circumference of the third flange. In still another embodiment, the plurality of slots may comprise at least four slots located approximately 90° or 90° apart from one another along the circumference of the third flange.

Also shown in FIG. 14 are a plurality of screw holes (3490) having a threaded interior surface. When present, said screw holes may pass from the bearing cap exterior surface to the bearing cap interior surface. These screw holes may be used to fasten the bearing cap to another component, such as a central shaft, which fits around the bearing cap exterior surface. The number and location of the screw holes is not considered important. In one embodiment, the plurality of screw holes may comprise at least two screw holes located approximately 180° or 180° apart from one another along a circumference of the bearing cap. In another embodiment, the plurality of screw holes may comprise at least three screw holes located approximately 120° or 120° apart from one another along a circumference of the bearing cap. In still another embodiment, the plurality of screw holes may comprise at least four screw holes located approximately 90° or 90° apart from one another along a circumference of the cap. It is preferred that at least one of the screw holes, when present, is not aligned with any of the slots (3485). More preferably, none of the screw holes, when present, are aligned with any of the slots.

FIG. 14 also shows a bushing (3500), a stop washer (3600) having a keyway (3650), and a snap-ring (3700).

Figure 15:
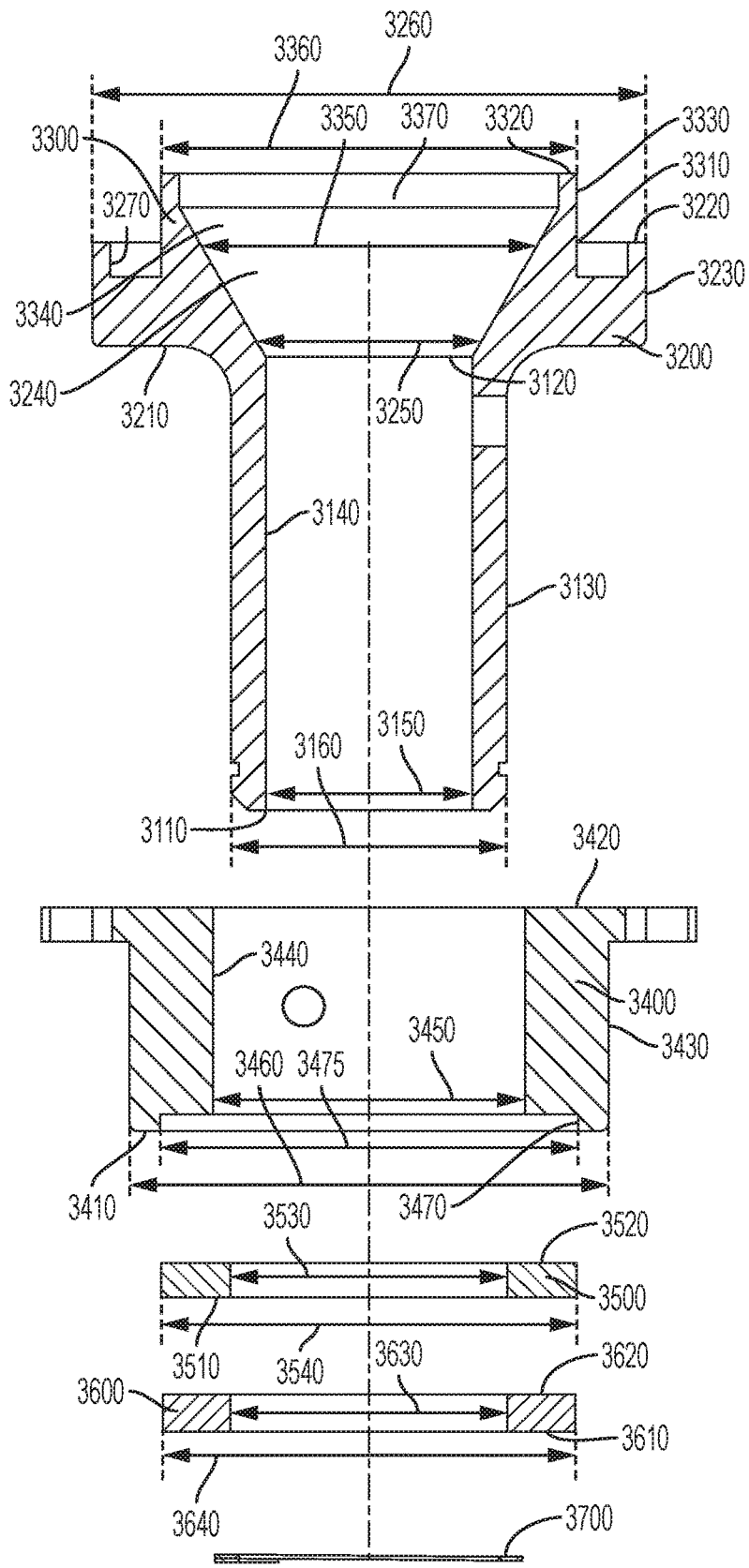
FIG. 15 shows an exploded cut-away view of the embodiment of the bearing assembly of FIG. 13A.

FIG. 15 depicts an exploded cut-away view of one embodiment of the bearing assembly (3000). As shown in FIG. 15, the central stud (3100) has a central stud first end (3110) and a central stud second end (3120) opposite the central stud first end. The central stud may have a cylindrical profile having a central stud exterior surface (3130) and a central stud interior surface (3140) which define a central stud inside diameter (3150) and a central stud outside diameter (3160).

Also depicted in FIG. 15 is a first flange (3200) having a first flange first end (3210) and a first flange second end (3220) opposite the first flange first end. As shown in FIG. 15, the first flange may have a cylindrical profile having a first flange exterior surface (3230) and a first flange interior surface (3240) defining a first flange inside diameter (3250) and a first flange outside diameter (3260). The first flange may also comprise a first lip (3270) extending from the first flange second end. The first lip is not considered necessary, but when present provides a surface to which another component may be welded, including orbital welding. As shown in FIG. 15, at least a portion of the first flange interior surface may be countersunk.

FIG. 15 also shows a second flange having a second flange (3300) having a second flange first end (3310) and a second flange second end (3320) opposite the second flange first end. As shown in FIG. 15, the second flange may have a cylindrical profile having a second flange exterior surface (3330) and a second flange interior surface (3340) defining a second flange inside diameter (3350) and a second flange outside diameter (3360). The second flange may also comprise a second lip (3370) extending from the second flange second end. The second lip is not considered necessary, but when present provides a surface to which another component may be welded, including orbital welding. As shown in FIG. 15, at least a portion of the second flange interior surface may be countersunk. Countersinking the first flange interior surface and/or the second flange interior surface is thought to improve the ability for elements such as cables or wires to be threaded through the hollow interior of the central stud.

As shown in FIG. 15, the central stud second end (3120) may be attached to the first flange first end (3210). Further, the first flange second end (3220) may be attached to the second flange first end (3310). Preferably the attachment between the central stud second end and the first flange first end is such that the central stud and the first flange are formed from one integral piece of material. In an alternative embodiment, the attachment between the central stud second end and the first flange first end is such that the central stud is welded to the first flange. Similarly, the attachment between the first flange second end and the second flange first end may be such that first flange and the second flange may be formed of one integral piece of material, or the attachment may be such that the first flange is welded to the second flange.

FIG. 15 also depicts the bearing cap (3400) having a bearing cap first end (3410) and a bearing cap second end (3420) opposite the bearing cap first end. As shown in FIG. 15, the bearing cap may have a cylindrical profile having a bearing cap exterior surface (3430) and a bearing cap interior surface (3440) defining a bearing cap inside diameter (3450) and a bearing cap outside diameter (3460). The bearing cap may also comprise a third lip (3470) extending from the bearing cap first end and having a third lip inside diameter (3475).

Also depicted in FIG. 15 is a bushing (3500) having a bushing first end (3510) and a bushing second end (3520) opposite the bushing first end. The bushing will also have a bushing inside diameter (3530) and a bushing outside diameter (3540). The bushing may be made of any common bushing material. Preferably, the bushing will be made from a material selected from the group consisting of bronze, brass, or plastic.

In some embodiments, the bushing may be eliminated by making the bearing cap out of a suitable bushing material such as bronze, brass, or plastic.

FIG. 15 also shows a stop washer (3600) and a snap-ring (3700). The stop washer has a stop washer first end (3610) and a stop washer second end (3620) opposite the stop washer first end. The stop washer will also have a stop washer inside diameter (3630) and a stop washer outside diameter (3640).

Figure 16:
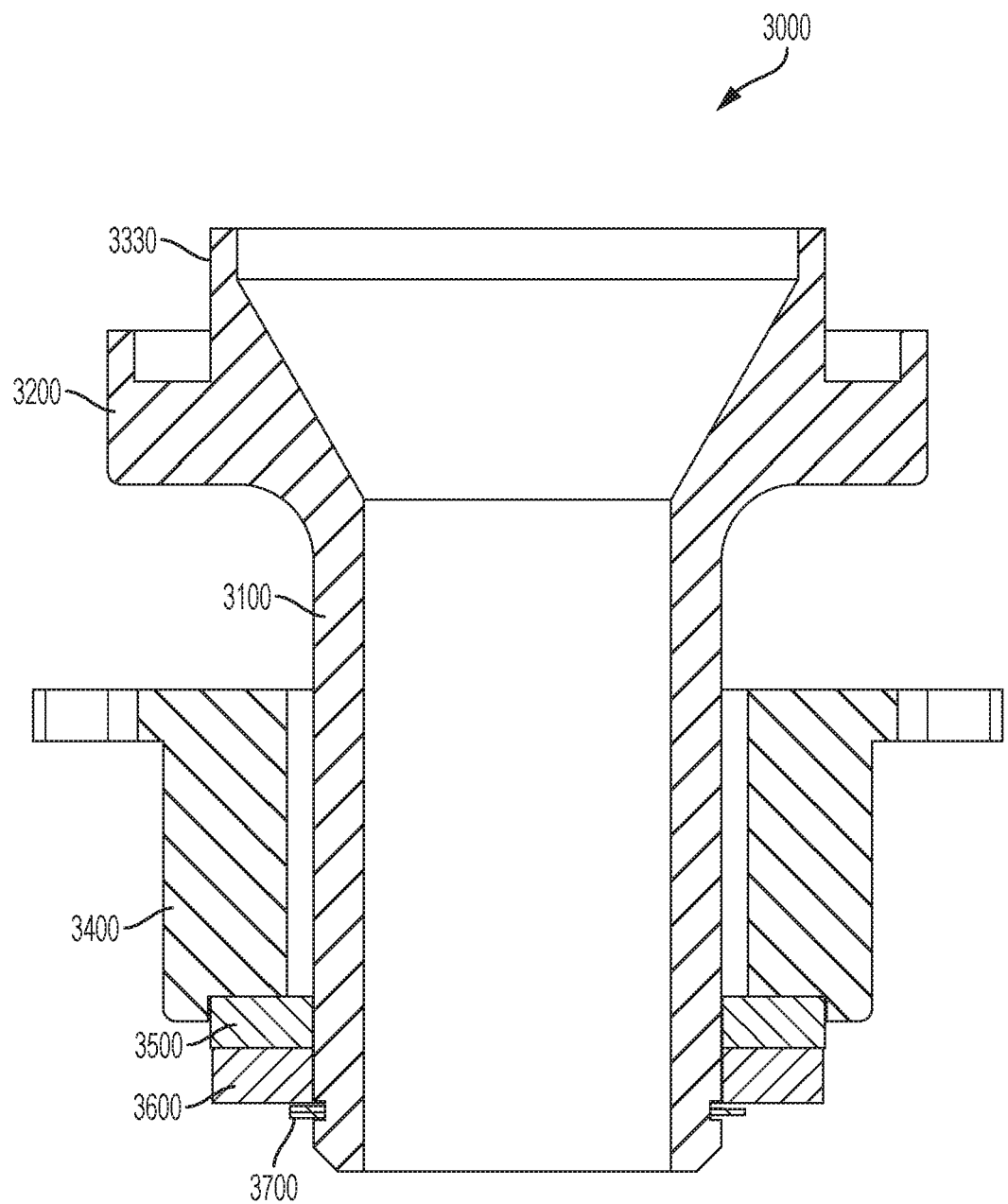
FIG. 16 shows an assembled cut-away view of the embodiment of the bearing assembly of FIG. 13A.

FIG. 16 depicts an assembled cut-away view of an embodiment of a bearing assembly (3000). As shown in FIG. 16, the bearing cap (3400), the bushing (3500), and the stop washer (3600) fit around the central stud exterior surface. In the assembled version, the bearing cap may be located between the first flange first end and the bushing second end. Further, the bushing may be located between the bearing cap first end and the stop washer second end. The keyway may be mated to the keyway groove to prevent the stop washer from rotating around the central stud or at least reduce rotation. The snap-ring may be mated to the snap ring groove below the stop washer first end to provide a surface for the stop washer to abut against and prevent the stop washer, the bushing, and the bearing cap from falling off of the central stud.

As further depicted in FIG. 16, the first flange outside diameter is greater than the second flange outside diameter allowing for one element to be welded to the first lip while a different element is welded to the second lip. The bushing outside diameter is mated to the third lip inside diameter. In a preferred embodiment, the stop washer outside diameter is less than the third lip inside diameter as shown in FIG. 16.

Figure 17:
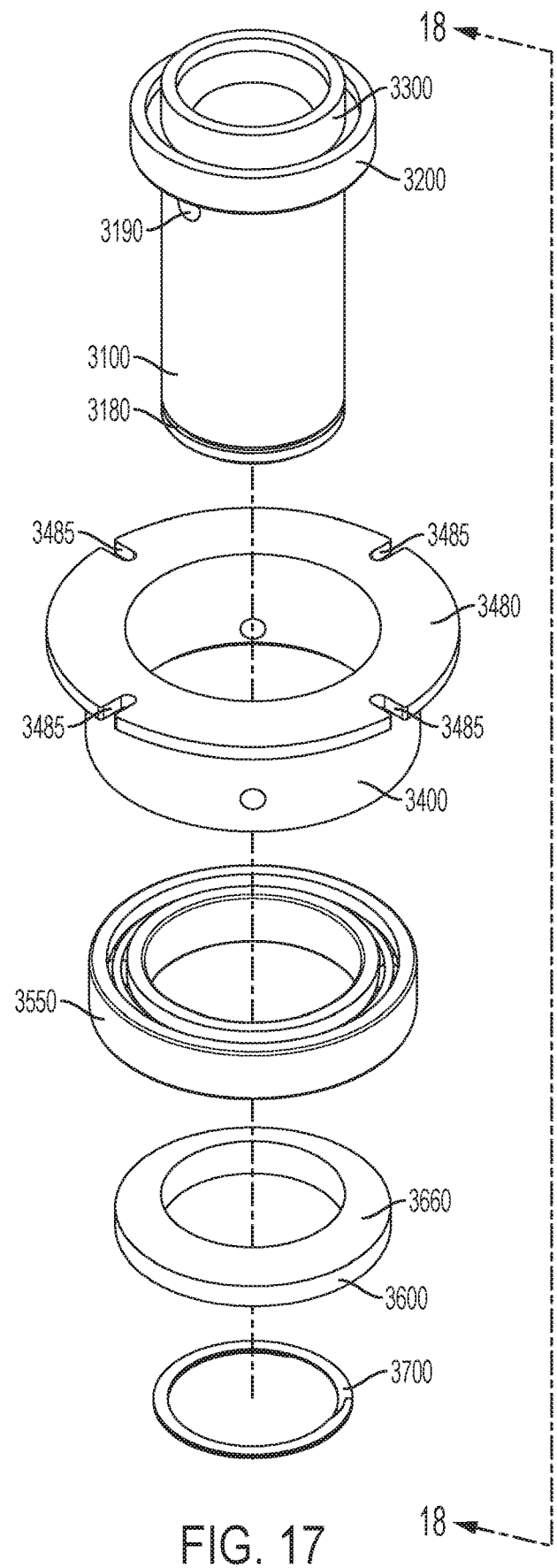
FIG. 17 shows an exploded perspective view of an embodiment of a bearing assembly as described herein.
Figure 18:
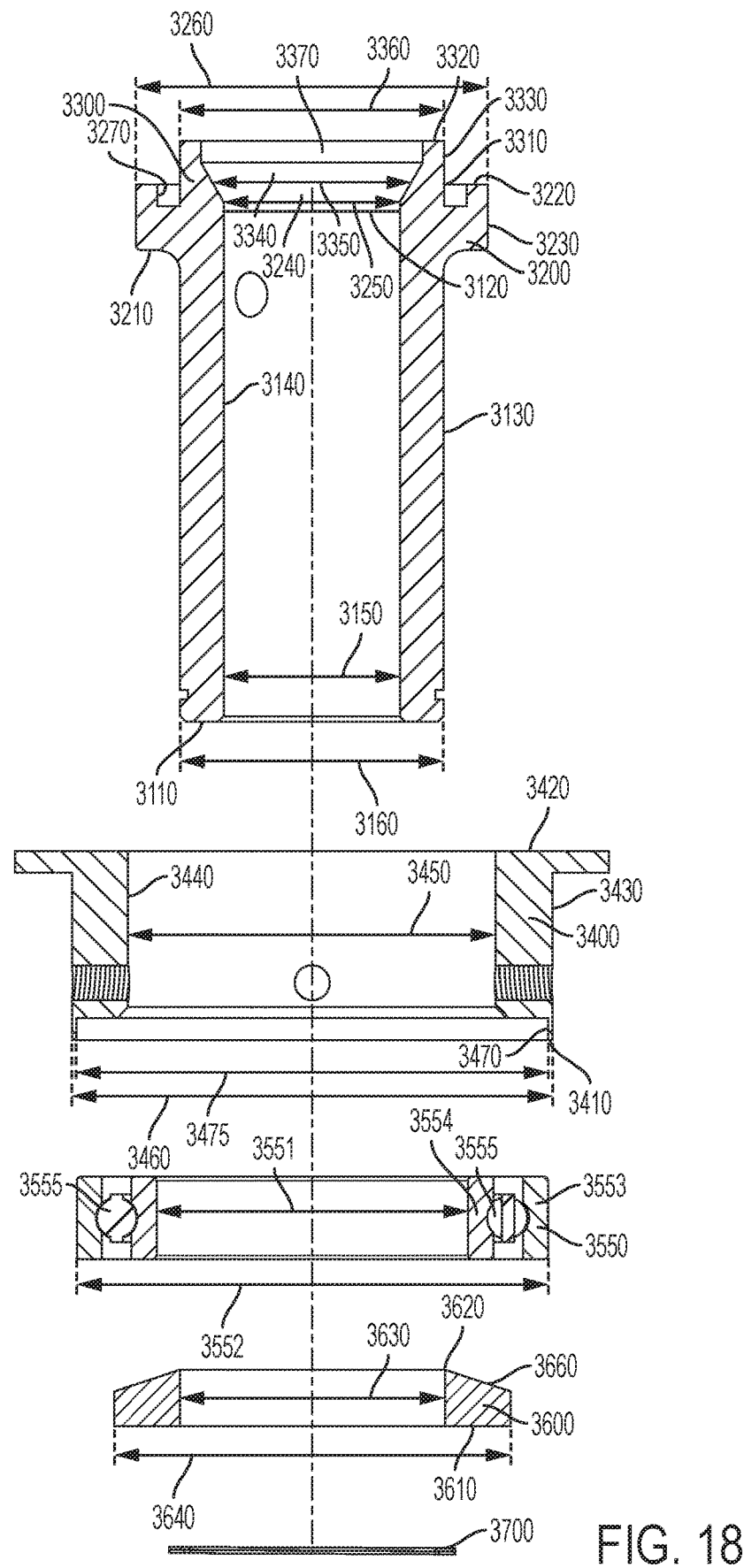
FIG. 18 shows an exploded cut-away view of the embodiment of the bearing assembly of FIG. 17.
Figure 19:
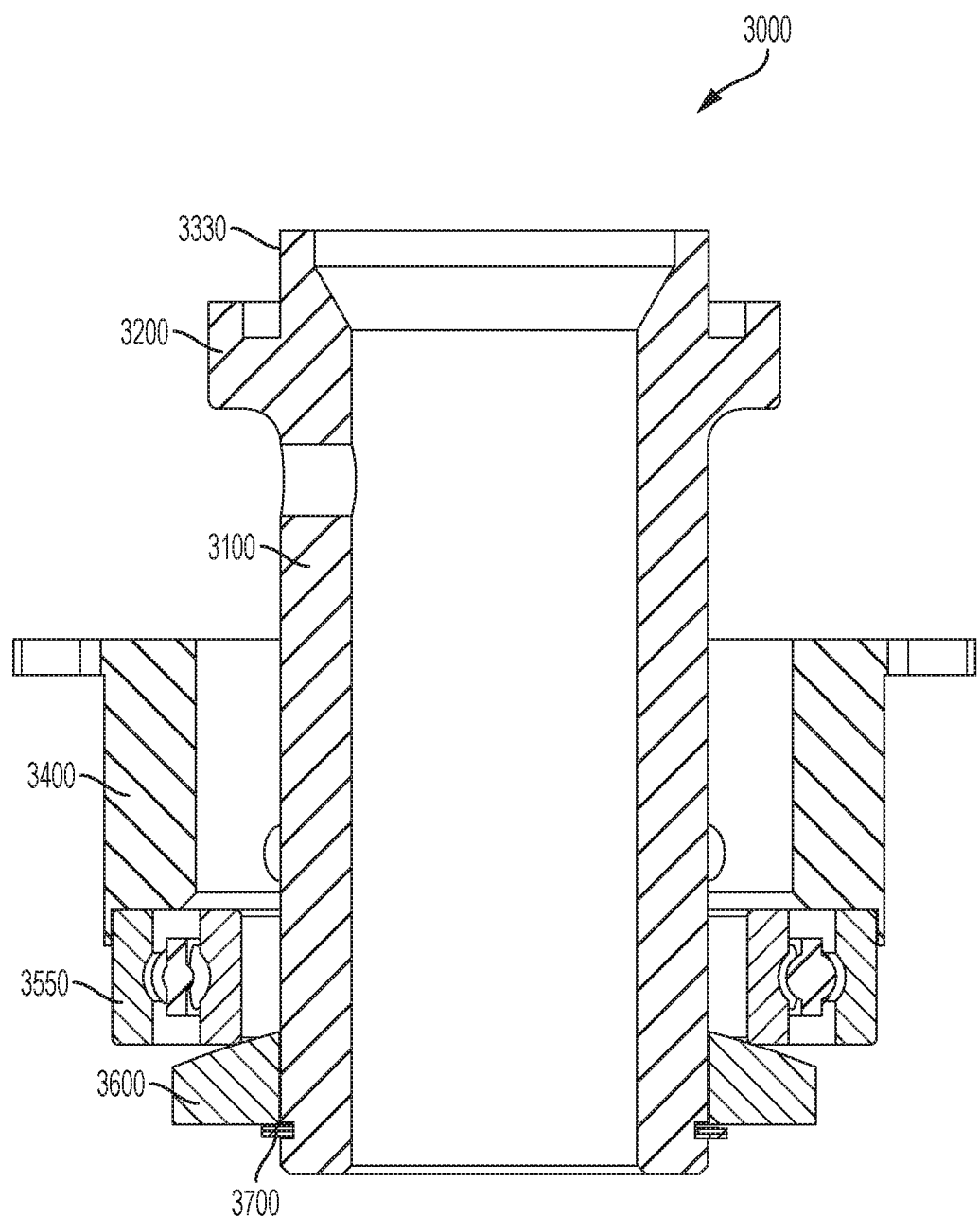
FIG. 19 shows an assembled cut-away view of the embodiment of the bearing assembly of FIG. 17.

FIG. 17 to FIG. 19 depicts an alternative embodiment of a bearing assembly (3000).

FIG. 17 shows an exploded perspective view of the alternative embodiment of a bearing assembly (3000). As shown in FIG. 17, the bearing assembly has a central stud (3100). The central stud may have a snap-ring groove (3180) disposed into the central stud exterior surface proximate to the central stud first end. The snap-ring groove may span a circumference of the central stud outer surface. It should be noted that, in the embodiment shown in FIG. 17, the central stud does not contain a keyway groove as in the central stud of the embodiment shown in FIG. 14. In this regard, the keyway groove as shown in the central stud of the embodiment shown in FIG. 14 is considered an optional element of the central stud. FIG. 17 also shows the first flange (3200) attached to the central stud at the central stud second end. Further shown is the second flange (3300) attached to the first flange.

FIG. 17 also shows a bearing cap (3400). As shown, the bearing cap may have a third flange (3480) extending from a bearing cap exterior surface proximate to a bearing cap second end. The third flange may comprise a plurality of slots (3485) located along a circumference of the third flange. The plurality of slots may be present in order to allow the third flange of the bearing cap to fit over a series of dividers (1300 as shown in FIG. 4) without allowing the bearing cap to rotate or at least reducing the amount of rotation. The number and location of the slots may be dependent—at least partially—upon the number and location of dividers. In one example, the plurality of slots may comprise at least two slots located approximately 180° or 180° apart from one another along the circumference of the third flange. In another embodiment, the plurality of slots may comprise at least three slots located approximately 120° or 120° apart from one another along the circumference of the third flange. In still another embodiment, the plurality of slots may comprise at least four slots located approximately 90° or 90° apart from one another along the circumference of the third flange.

FIG. 17 also shows a bearing (3550), a stop washer (3600), and a snap-ring (3700). As shown in FIG. 17, the stop washer may have a stop washer tapered surface (3660).

FIG. 18 depicts an exploded cut-away view of the alternative embodiment of the bearing assembly (3000). As shown in FIG. 18, the central stud (3100) has a central stud first end (3110) and a central stud second end (3120) opposite the central stud first end. The central stud may have a cylindrical profile having a central stud exterior surface (3130) and a central stud interior surface (3140) which define a central stud inside diameter (3150) and a central stud outside diameter (3160).

Also depicted in FIG. 18 is a first flange (3200) having a first flange first end (3210) and a first flange second end (3220) opposite the first flange first end. As shown in FIG. 18, the first flange may have a cylindrical profile having a first flange exterior surface (3230) and a first flange interior surface (3240) defining a first flange inside diameter (3250) and a first flange outside diameter (3260). The first flange may also comprise a first lip (3270) extending from the first flange second end. The first lip is not considered necessary, but when present provides a surface to which another component may be welded, including orbital welding. As shown in FIG. 18, at least a portion of the first flange interior surface may be countersunk.

FIG. 18 also shows a second flange (3300) having a second flange first end (3310) and a second flange second end (3320) opposite the second flange first end. As shown in FIG. 18, the second flange may have a cylindrical profile having a second flange exterior surface (3330) and a second flange interior surface (3340) defining a second flange inside diameter (3350) and a second flange outside diameter (3360). The second flange may also comprise a second lip (3370) extending from the second flange second end. The second lip is not considered necessary, but when present provides a surface to which another component may be welded, including orbital welding. As shown in FIG. 18, at least a portion of the second flange interior surface may be countersunk. Countersinking the first flange interior surface and/or the second flange interior surface is thought to improve the ability for elements such as cables or wires to be threaded through the hollow interior of the central stud.

As shown in FIG. 18, the central stud second end (3120) may be attached to the first flange first end (3210). Further, the first flange second end (3220) may be attached to the second flange first end (3310). Preferably the attachment between the central stud second end and the first flange first end is such that the central stud and the first flange are formed from one integral piece of material. In an alternative embodiment, the attachment between the central stud second end and the first flange first end is such that the central stud is welded to the first flange. Similarly, the attachment between the first flange second end and the second flange first end may be such that first flange and the second flange may be formed of one integral piece of material, or the attachment may be such that the first flange is welded to the second flange.

FIG. 18 also depicts the bearing cap (3400) having a bearing cap first end (3410) and a bearing cap second end (3420) opposite the bearing cap first end. As shown in FIG. 18, the bearing cap may have a cylindrical profile having a bearing cap exterior surface (3430) and a bearing cap interior surface (3440) defining a bearing cap inside diameter (3450) and a bearing cap outside diameter (3460). The bearing cap may also comprise a third lip (3470) extending from the bearing cap first end and having a third lip inside diameter (3475).

Also depicted in FIG. 18 is a bearing (3550). The bearing may be of any type of bearing including a roller bearing, a deep groove bearing, a needle thrust bearing, or a tapered needle roller bearing. The embodiment shown in FIG. 18 is a deep groove bearing comprising an outer bearing race (3553), an inner bearing race (3554), and a plurality of bearing balls (3555). The outer bearing race defines an outer profile of the bearing having a bearing outside diameter (3552). Similarly, the inner bearing race defines an inner profile of the bearing having a bearing inside diameter (3551). The outer bearing race and the inner bearing race may be made of a material selected from the group consisting of stainless steel, steel, titanium, or ceramic. Each bearing ball of the plurality of bearing balls may be made of a material selected from the group consisting of stainless steel, steel, titanium, or ceramic. One preferred bearing is a 6909 Hybrid Ceramic Bearing available from Ortech, Inc. of Sacramento, California, U.S.A.

FIG. 18 also shows a stop washer (3600) and a snap-ring (3700). The stop washer has a stop washer first end (3610) and a stop washer second end (3620) opposite the stop washer first end. The stop washer will also have a stop washer inside diameter (3630) and a stop washer outside diameter (3640). The stop washer preferably has a stop washer tapered surface (3660) located at the stop washer second end (3620).

FIG. 19 depicts an assembled cut-away view of the alternative embodiment of a bearing assembly (3000). As shown in FIG. 19, the bearing cap (3400), the bearing (3550), and the stop washer (3600) fit around the central stud exterior surface. In the assembled version, the bearing cap may be located between the first flange first end and the bearing second end. Further, the bearing may be located between the bearing cap first end and the stop washer second end. The snap-ring may be mated to the snap ring groove below the stop washer first end to provide a surface for the stop washer to abut against and prevent the stop washer, the bearing, and the bearing cap from falling off of the central stud.

As further depicted in FIG. 19, the first flange outside diameter is greater than the second flange outside diameter allowing for one element to be welded to the first lip while a different element is welded to the second lip. The bearing outside diameter is mated to the third lip inside diameter. In a preferred embodiment, the stop washer outside diameter is less than the third lip inside diameter as shown in FIG. 19.

The inventors surprisingly discovered that the bearing assemblies disclosed herein achieve decreased pull loads when an operator rotates the turn-table within the cryogenic freezer.

The System for Charging a Cryogen

FIG. 20 to FIG. 23 depict various embodiments of a system for charging a cryogen (4000) to a cryogenic freezer unit as described herein.

Figure 20:
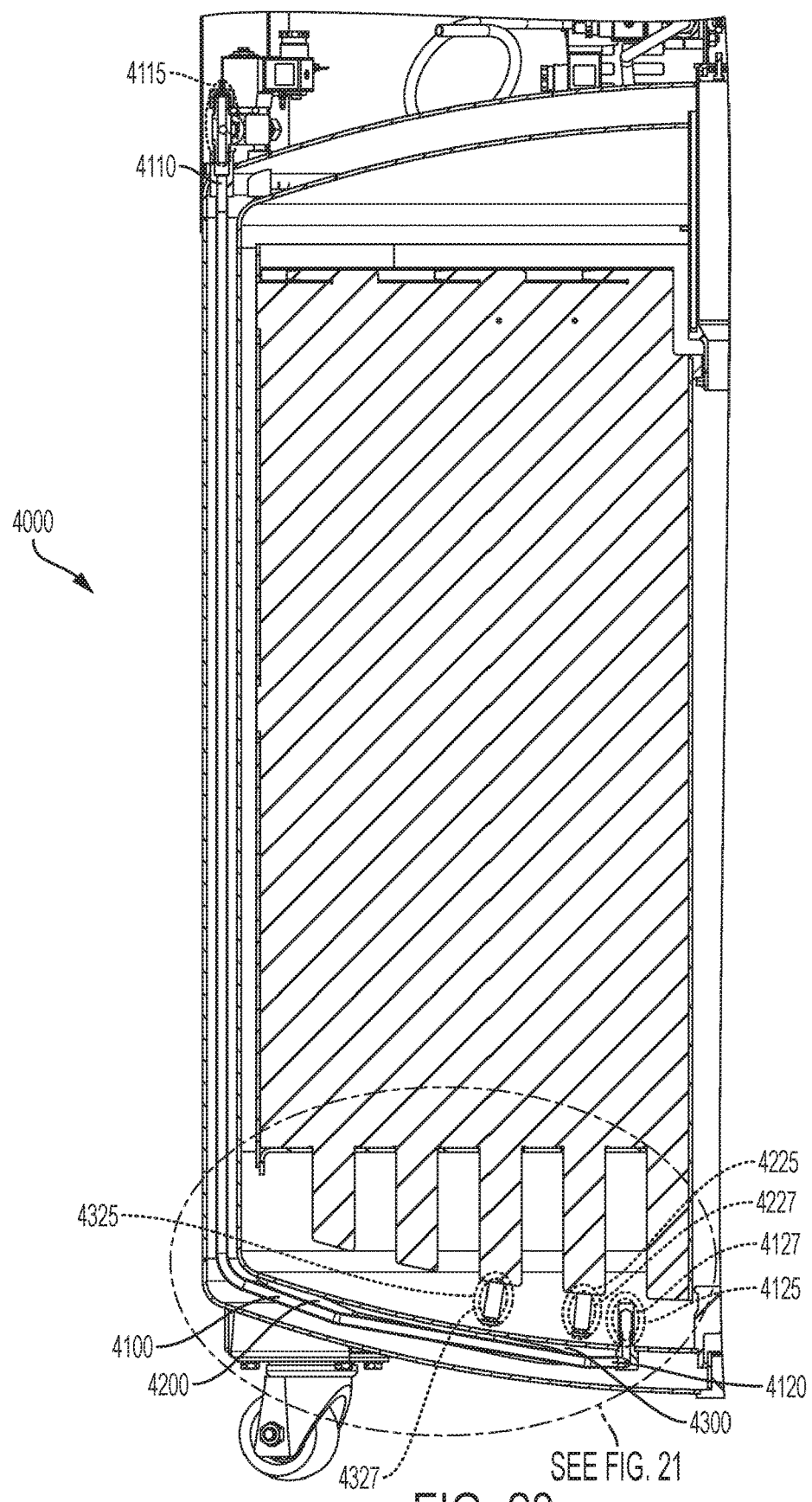
FIG. 20 shows a cut-away view of an embodiment of a system for charging a cryogen to a cryogenic freezer unit as described herein.

FIG. 20 shows the system for charging a cryogen comprising a first conduit (4100), a second conduit (4200), and a third conduit (4300).

The first conduit (4100) has a first conduit first end (4110) located at or near the top of the cryogenic freezer and connected to a sidewall or top wall of the outer tank, and a first conduit second end (4120) located at or near the bottom of the cryogenic freezer and connected to a bottom wall of the inner tank. The first conduit first end may comprise a first conduit inlet fitting. Similarly, the first conduit second end may comprise a second conduit outlet fitting (4125) which may comprise a first phase separator (4127).

The second conduit (4200) has a second conduit first end located at or near the top of the cryogenic freezer and connected to a sidewall or top wall of the outer tank, and a second conduit second end located at or near the bottom of the cryogenic freezer and connected to a bottom wall of the inner tank. The second conduit first end may comprise a second conduit inlet fitting. Similarly, the second conduit second end may comprise a second conduit outlet fitting (4225) which may comprise a second phase separator (4227).

The third conduit (4300) has a third conduit first end located at or near the top of the cryogenic freezer and connected to a sidewall or top wall of the outer tank, and a third conduit second end located at or near the bottom of the cryogenic freezer and connected to a bottom wall of the inner tank. The third conduit first end may comprise a third conduit inlet fitting. Similarly, the third conduit second end may comprise a third conduit outlet fitting (4325) which may comprise a third phase separator (4327).

Figure 21:
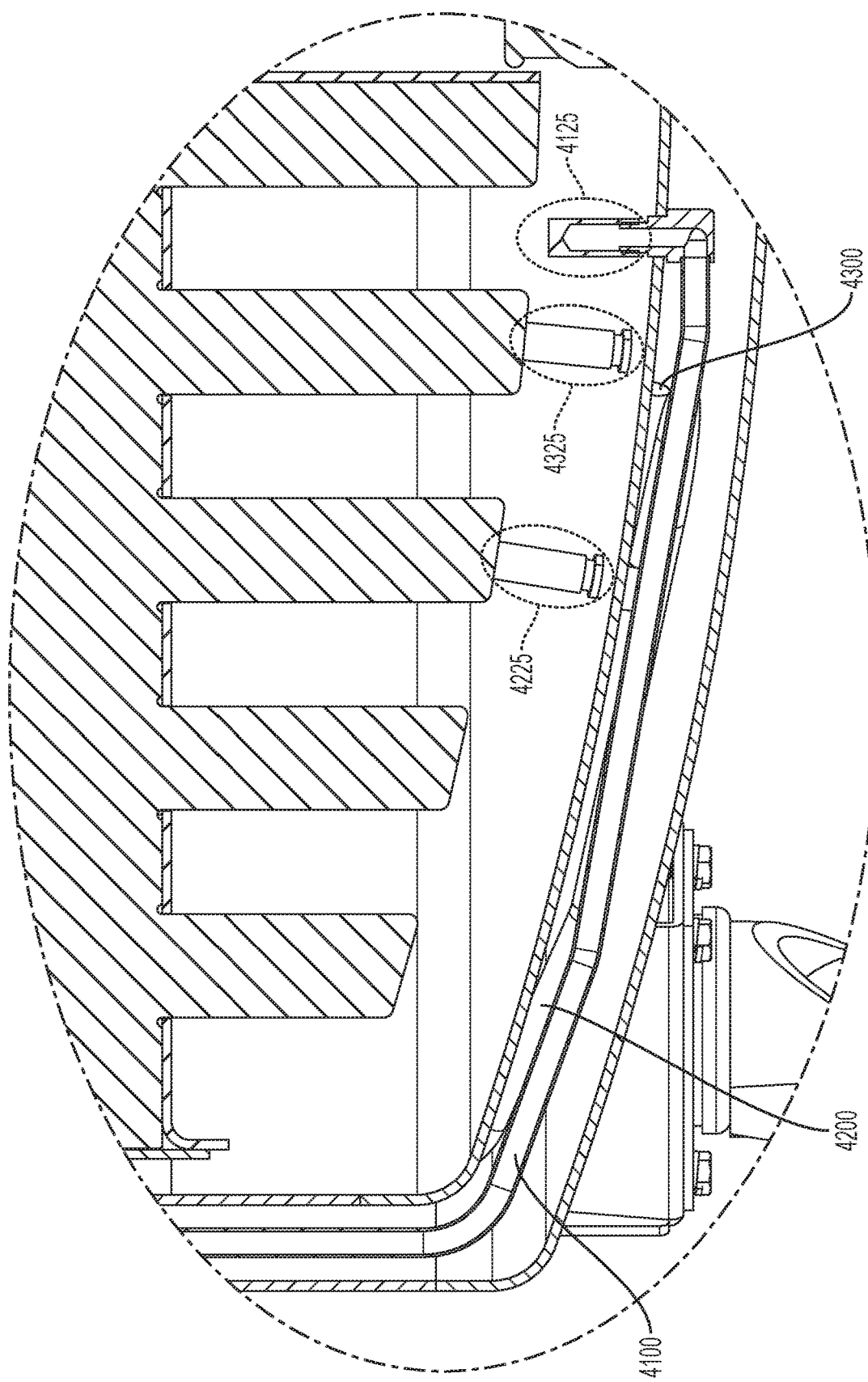
FIG. 21 shows a close-up view of a cut-away of an embodiment of the system for charging a cryogen to a cryogenic freezer unit of FIG. 20.

FIG. 21 shows a detailed view of the first conduit second end, the second conduit second end, and the third conduit second end as they are installed in the bottom wall of the inner tank.

Figure 22:
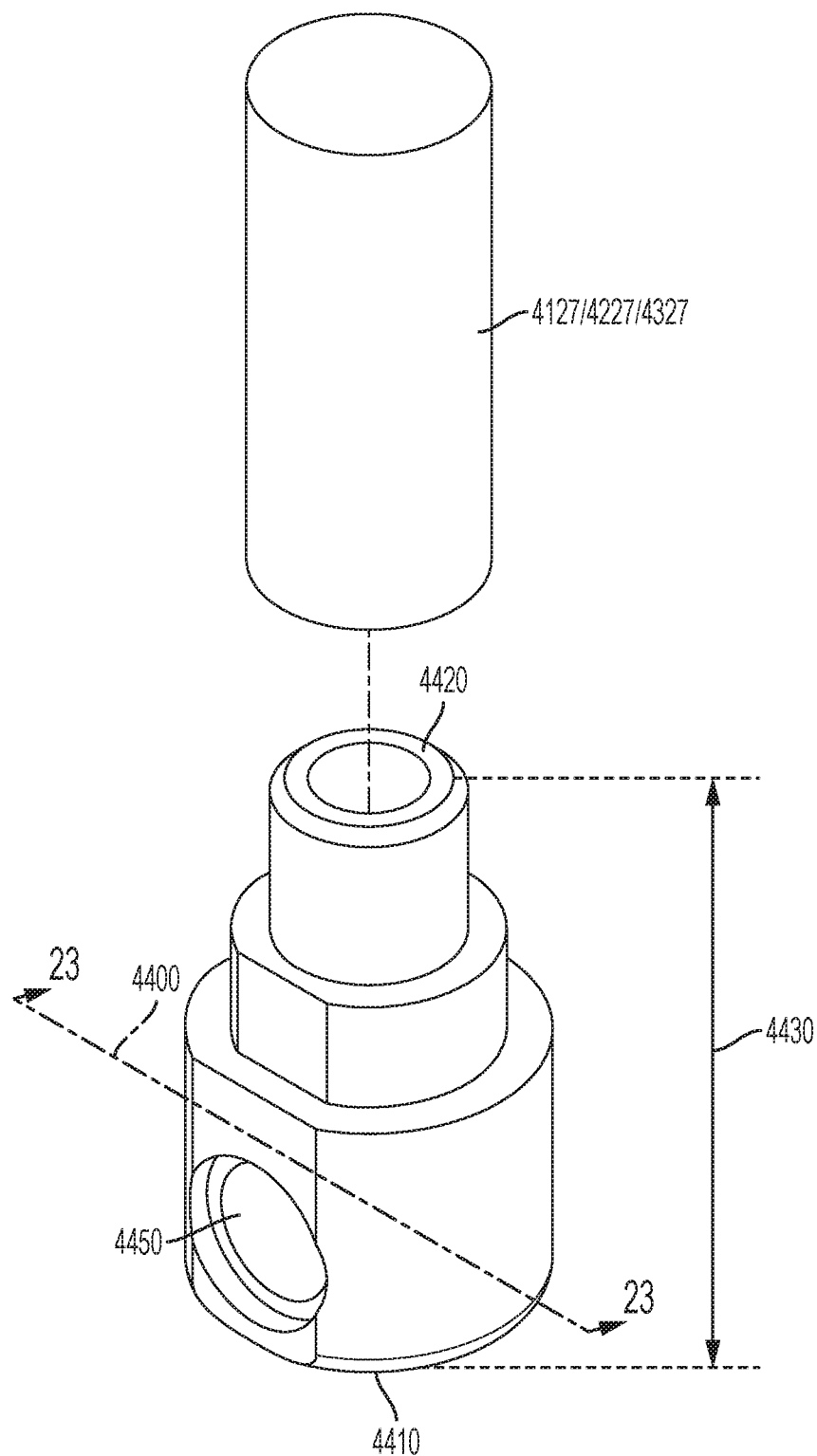
FIG. 22 shows an exploded perspective view of an embodiment of a D-shaped outlet fitting comprising a phase separator for a system for charging a cryogen to a cryogenic freezer unit as described herein.

FIG. 22 shows an exploded view of one embodiment of an outlet fitting (4125, 4225, or 4325). As shown in FIG. 22, the outlet fitting is a D-shaped fitting (4400) comprising a fitting first end (4410), a fitting second end (4420) opposite the fitting first end, a fitting length dimension (4430) spanning between the fitting first end and the fitting second end. FIG. 22 also shows an inlet port (4450) passing through a flat surface of the D-shaped fitting. The inlet port may be where the first conduit second end, the second conduit second end, or the third conduit second end attaches to the outlet fitting. At least one of the first conduit outlet fitting, the second conduit outlet fitting, and the third conduit outlet fitting may be a D-shaped fitting. Preferably, each of the first conduit outlet fitting, the second conduit outlet fitting, and the third conduit outlet fitting may be a D-shaped fitting.

Figure 23:
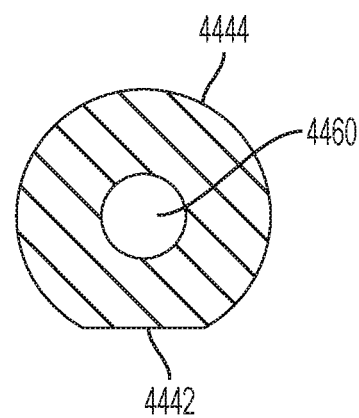
FIG. 23 shows a perspective cross section of the embodiment of the D-shaped outlet fitting of FIG. 22.

FIG. 23 shows a cross section of the D-shaped fitting (4400) of FIG. 22. By D-shaped it is meant that the fitting has an outer profile which, when viewed from above, forms the shape of the English capital letter "D" with one flat surface with the opposing ends of the flat surface connected by opposing ends of a curved circular surface. As shown in FIG. 23, the D-shaped fitting may comprise a flat surface (4442) and a curved surface (4444) attached to either end of the flat surface. FIG. 23 also shows an outlet port (4460) passing through the fitting second end. This outlet port may be connected to the first phase separator, the second phase separator, or the third phase separator.

When assembled, at least one of the first conduit inlet fitting, the second conduit inlet fitting, or the third conduit inlet fitting may be capable of connecting to a cryogen source, such as a liquid nitrogen tank, via a hose, line, or conduit. One of the first conduit, the second conduit, and the third conduit may further comprise a first differential pressure sensor. Similarly, one of the first conduit, the second conduit, and the third conduit may comprise a second differential pressure sensor. The conduit which comprises the first differential pressure sensor should be different than the conduit which comprises the second differential pressure sensor and the conduit that is capable of connecting to a cryogen source. For example, if the first conduit is capable of connecting to a cryogen source, and the second conduit comprises the first differential pressure sensor, then the third conduit should comprise the second differential pressure sensor. Which conduit comprises which component (first differential pressure sensor, second differential sensor, connection to a cryogen source) is not considered important so long as at least one conduit is capable of connecting to a cryogen source and at least two conduits comprise a differential pressure sensor.

The first differential pressure sensor and/or the second differential pressure sensor will preferably have two ports—a first port located within the conduit for measuring the pressure in the conduit created by the cryogen filling into the conduit from the conduit second end, and a second port located outside the conduit for measuring ambient pressure. One example of such a differential pressure sensor is a Model 616KD-08-V Differential pressure transmitter available from Dwyer Instruments, Inc. of Michigan City, Indiana, U.S.A. Each differential pressure sensor may also comprise a means for electronically communicating the pressure in the conduit and the ambient pressure to a monitoring system such as a wireless signal, Bluetooth, or a hard-wired electrical connection. Preferably, the differential pressure sensors will be located at or near the conduit first end of the respective conduit. In some embodiments, a gauge pressure sensor having a single port with an opening to reference ambient pressure may be used in place of a differential pressure sensor. One such gauge pressure sensor is a Model TBPDANS005PGUCV Board Mount Pressure Sensor available from Honeywell International Inc. of Golden Valley, Minnesota, U.S.A.

The first differential pressure sensor and the second differential pressure sensor may sense a cryogen level by determining the pressure applied through the respective conduit. In some embodiments, only one of the first differential pressure sensor and the second differential pressure sensor may be connected to a monitoring system. In such embodiments, the differential pressure sensor which is not connected to a monitoring system may serve as a backup in the event that the differential pressure sensor that is connected to the monitoring system freezes over or otherwise fails. In some embodiments, both the first differential pressure sensor and the second differential pressure sensor are connected to a monitoring system. When a change in differential pressure is sensed in one or more of the conduits containing the differential pressure sensors, the differential pressure sensors send a signal to the monitoring system. In some embodiments, the monitoring system can then notify an operator to check the cryogen level in the cryogenic freezer, and add additional cryogen as needed through the conduit connected to the cryogen source. In other embodiments, the monitoring system can automatically add additional cryogen by sending a signal to open a valve between the cryogen source and the conduit connected to the cryogen source, allowing additional cryogen to enter the cryogenic freezer through the conduit connected to the cryogen source until the cryogen reaches a pre-determined level as measured by the differential pressure sensors.

It is preferred that the conduit outlet fitting for the conduit comprising the first differential pressure sensor be located at a different elevation relative to the conduit outlet fitting for the conduit comprising the second differential pressure sensor. By keeping the conduit outlet fittings at different elevations, the differential pressure sensors can better determine changes in the cryogen level and communicate such changes to the monitoring system.

The inventors surprisingly discovered that the system for charging a cryogen improves the temperature consistency over time by maintaining the cryogen level within the cryogenic freezer at the same or similar level. The inventors found that the multiple differential pressure sensors can more accurately communicate changes in pressure, which indicate a change in cryogen level, to a control center. Further, the inventors found that, by keeping the conduit connected to the cryogen source separate from the conduits containing the differential pressure sensors, the differential pressure sensors are not interfered with during charging of the cryogen.

The Venting System

FIG. 24 to FIG. 28 depict various embodiments of a venting system (5000) for a cryogenic freezer (100) as described herein.

Figure 24:
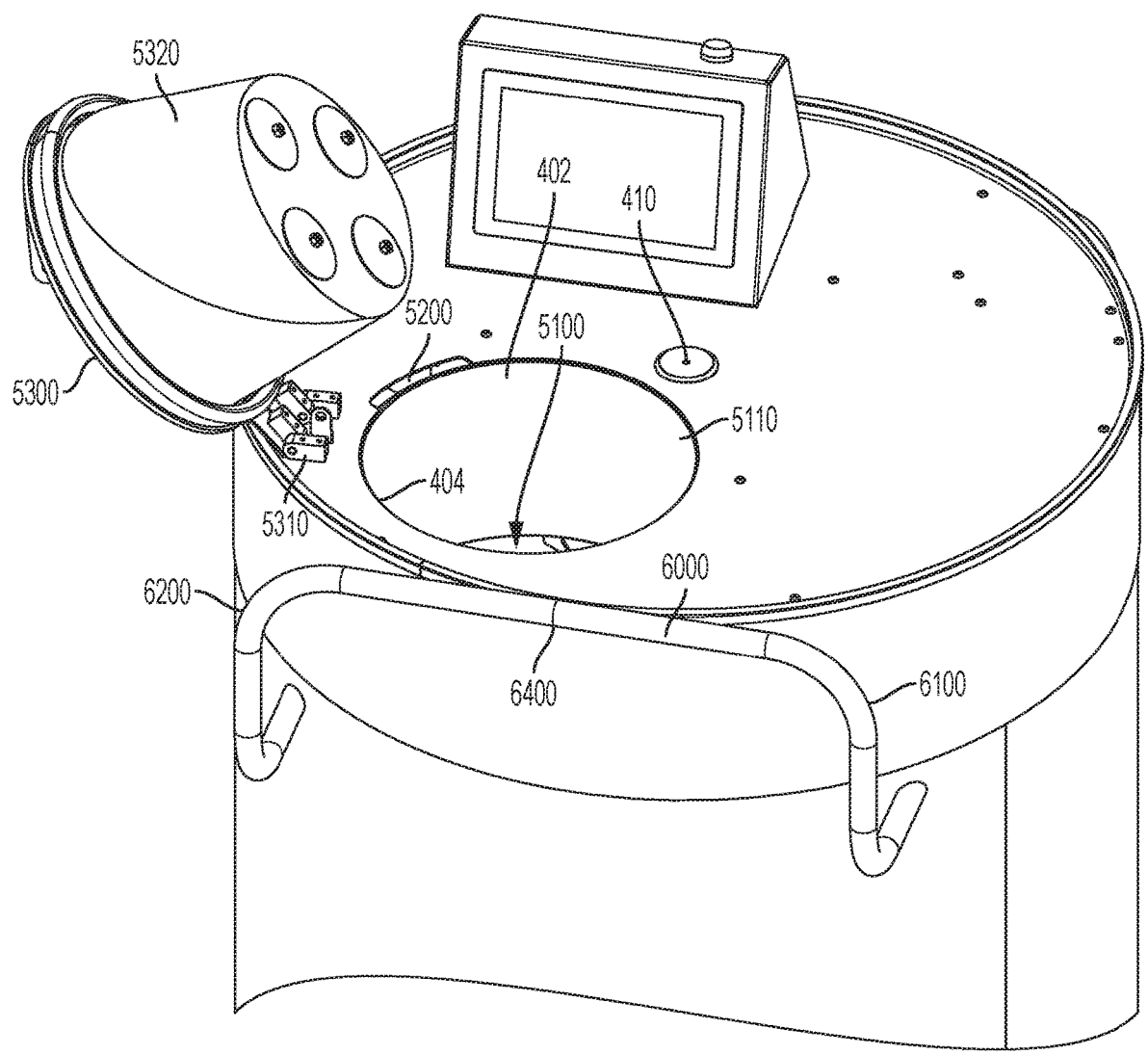
FIG. 24 shows a perspective view of a top section of an embodiment of a cryogenic freezer as described herein.

FIG. 24 shows a perspective view of the top of a cryogenic freezer comprising a venting system for the cryogenic freezer. The venting system comprises an outer tank top cover (122) of an outer tank (120) defining a top surface of the outer tank comprising an outer tank lid hole (124) having at least one outer tank lid hole edge (125) as shown in FIG. 2. The venting system may also comprise a cryogenic freezer cover (400 as shown in FIG. 1. The cryogenic freezer cover may comprise a cryogenic freezer cover lid hole (402) as shown in FIG. 24 having at least one cryogenic freezer cover lid hole edge (404). Preferably the cryogenic freezer cover lid hole is aligned or substantially aligned with the outer tank lid hole. As shown in FIG. 24, the cryogenic freezer cover also has a cryogenic freezer cover center point (410).

FIG. 24 also shows a lid conduit (5100) having a lid conduit sidewall (5110). The lid conduit may span at least a distance between the outer tank lid hole, and the cryogenic freezer cover lid hole.

FIG. 24 also shows a vent hole (5200) extending from the cryogenic freezer cover lid hole edge. Also shown in FIG. 24 is a lid (5300) having a lid insulation member (5320) connected to a bottom surface of the lid. As shown in FIG. 24, the lid is attached to the top surface of the cryogenic freezer cover by a hinge (5310).

FIG. 24 also shows a handle (6000) attached to a sidewall of the outer tank. As shown in FIG. 24, the handle has a handle first end (6100) and a handle second end (6200).

Figure 25:
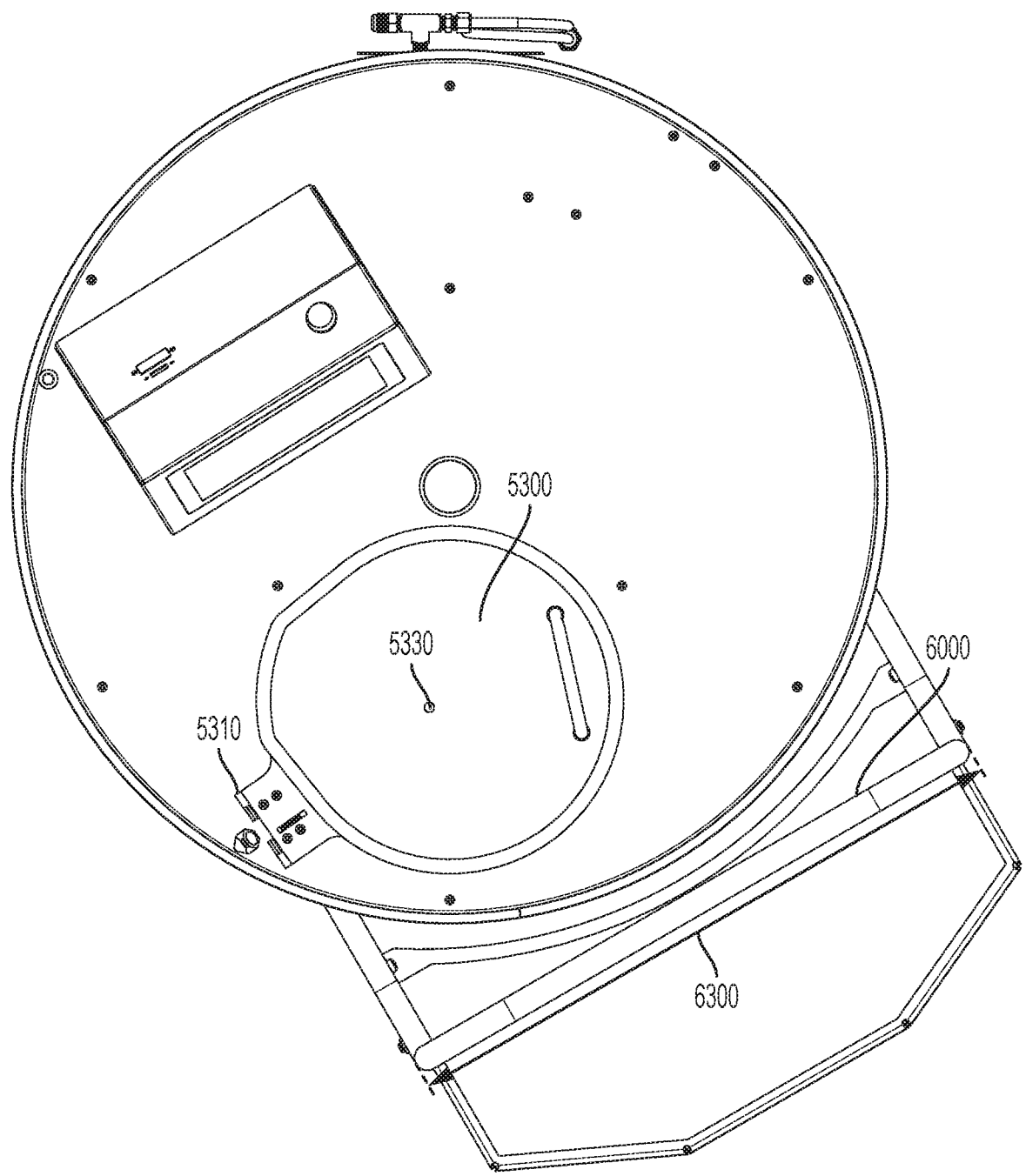
FIG. 25 shows a top view of a top section of an embodiment of a cryogenic freezer as described herein.

FIG. 25 shows a top view of a cryogenic freezer. As shown in FIG. 25, the lid (5300) has a lid center point (5330). Also shown in FIG. 25 is the handle (6000) having a handle length dimension (6300).

Figure 26:
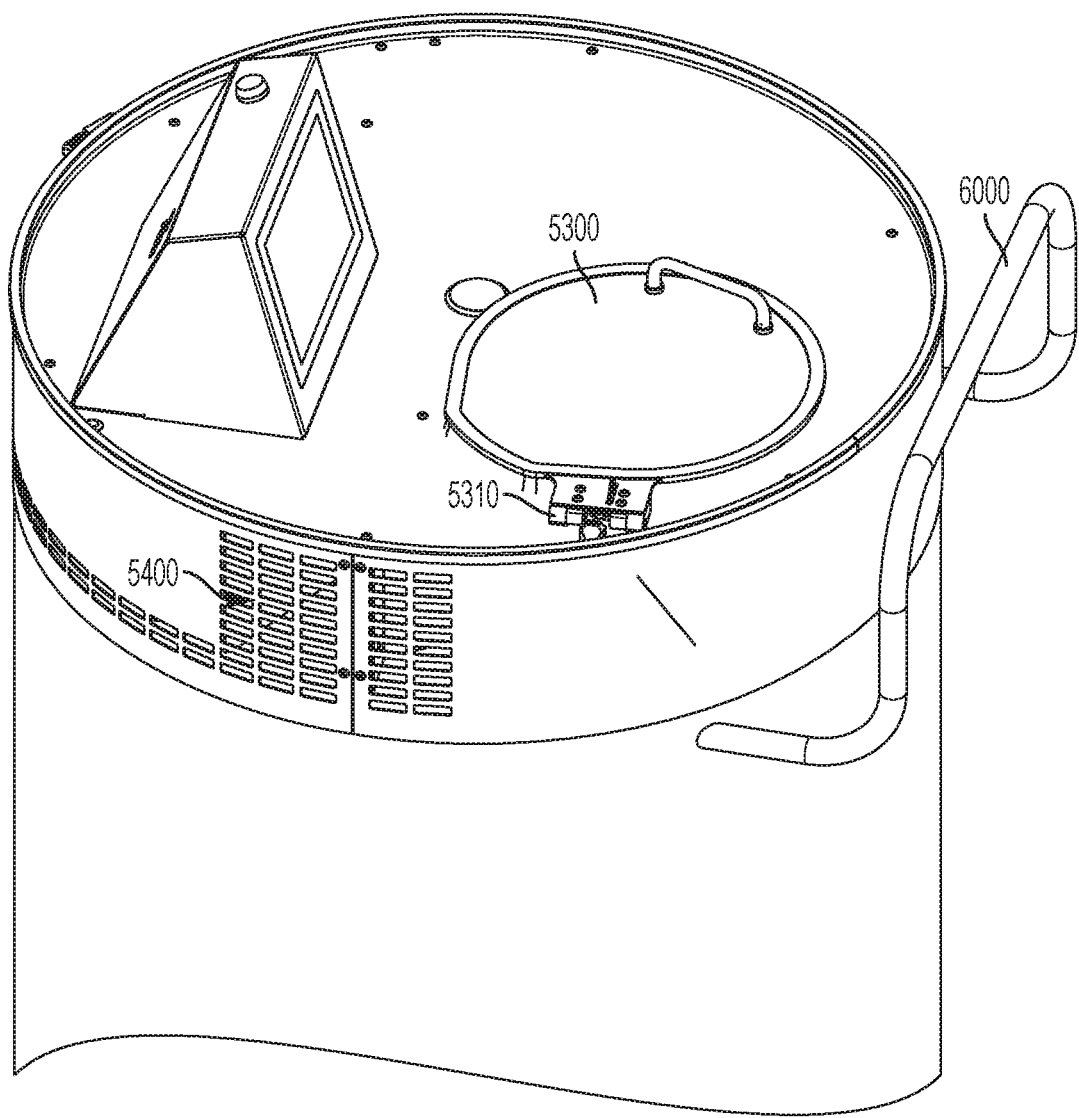
FIG. 26 shows a perspective view of an embodiment of a venting system for a cryogenic freezer as described herein.

FIG. 26 shows an alternate perspective view of the top of one embodiment of the freezer. As shown in FIG. 26, the venting system may also comprise a duct (5400) extending to an outer surface of the freezer.

Figure 27:
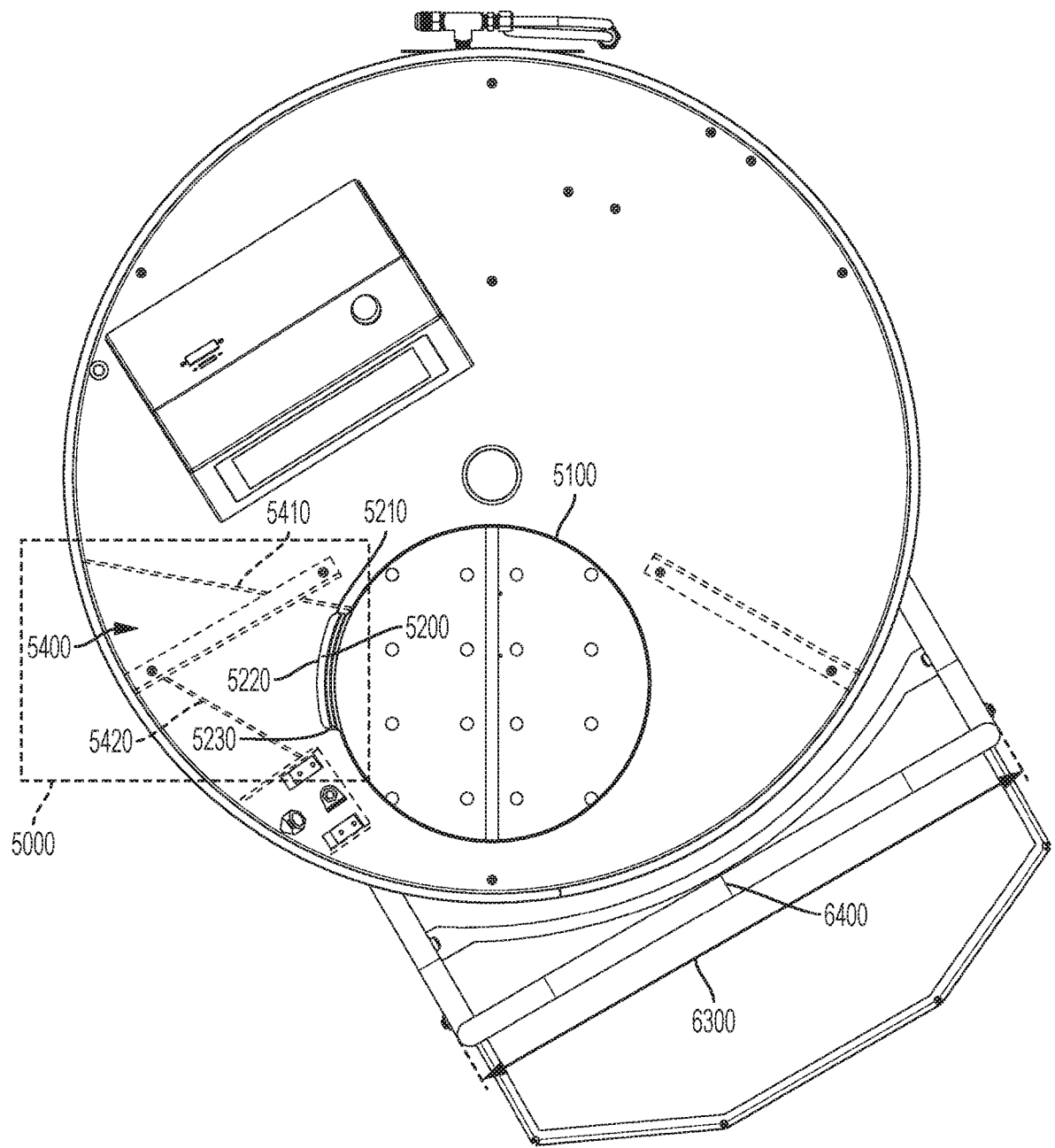
FIG. 27 shows a top view of an embodiment of a venting system for a cryogenic freezer as described herein.

FIG. 27 shows a top cut-away view of one embodiment of the venting system. As shown in FIG. 27, the vent hole comprises a first vent hole edge (5210), a second vent hole edge (5220), and a third vent hole edge (5230) opposite the first vent hole edge. FIG. 27 also shows the duct (5400), which may comprise at least a first duct sidewall (5410) and a second duct sidewall (5420). A shown in FIG. 27, the duct extends from the lid conduit sidewall to the outer edge of the outer tank (120) where it exits through a series of outer tank vent holes as shown in FIG. 26. In some embodiments, the first duct sidewall may be aligned with or substantially aligned with the first vent hole edge. In some embodiments, the second duct sidewall may be substantially aligned with the second vent hole edge.

Figure 28:
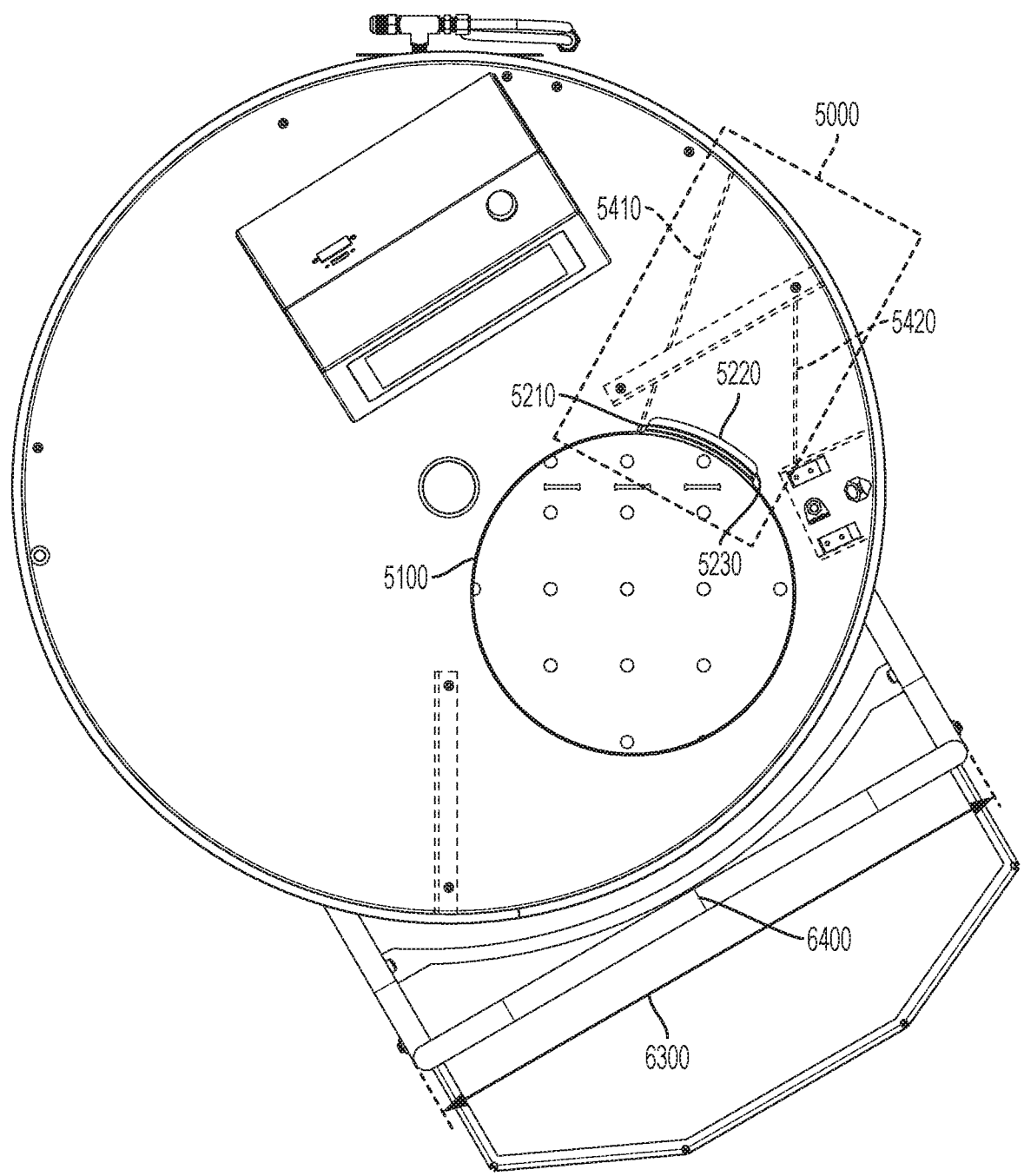
FIG. 28 shows a top view of an alternative embodiment of a venting system for a cryogenic freezer as described herein.

FIG. 28 shows a cut-away view of an alternative embodiment of the venting system with the lid conduit located to the right as opposed to the left as shown in FIG. 27.

In some embodiments, there may also be a sealing member connected to the outer tank lid hole edge. The sealing member may provide an air tight seal between the lid conduit and the outer tank lid hole conduit.

While the lid as shown in the drawings has a circular shape, one of ordinary skill will recognize that the lid may have other shapes, such as an ovular shape, or a polygonal shape. Also, the outer tank lid hole may have an outer tank lid hole shape selected from the group consisting of a circular shape, an ovular shape, and a polygonal shape. Finally, the cryogenic freezer cover lid hole may have a cryogenic freezer cover lid hole shape selected from the group consisting of a circular shape, an ovular shape, and a polygonal shape. The shape of the inner tank lid hole, the outer tank lid hole, and the cryogenic freezer cover lid hole should match one another, and also match the shape of the lid.

In practice, the venting system allows vapors from boiled cryogen to be directed away from the lid and to a location on the outer surface of the tank, thereby reducing visual obstructions to operators trying to utilize samples stored within the cryogenic freezer and also reducing the risk of frostbite to the user due to cold surfaces that are exposed to cold vapors.

The inventors surprisingly discovered that the venting system does not require a fan or external motivating force to pull the vapors away from the vent hole. While not wishing to be bound by any particular theory, it is believed that the boiling vapors rise due to increased pressure, and the rapid dissipation into the space above the lid causes the vapors to enter the vent hole and travel through the duct, exiting the duct away from the lid. This venting is most prevalent when the lid is in a closed position, but also occurs when the lid is open. It seems that a siphon effect or other flow dynamic pulls the vapors down into the duct and subsequently away from the lid.

The Cryogenic Freezer Handle and Lid

FIG. 24 to FIG. 28 also depict various embodiments of the cryogenic freezer having different lid locations.

For instance, the lid may be attached to a top surface of the cryogenic freezer cover by a hinge adjacent to an outer edge (408) of the cryogenic freezer cover. Simultaneously, the handle may extend from the outer tank sidewall (126) adjacent to the outer edge of the cryogenic freezer cover. Said handle may have a handle length dimension (6300) spanning from the handle first end to the handle second end. The handle may also have a handle center point (6400) located half way between the handle first end and the handle second end. In preferred embodiments, the handle center point may be aligned with or substantially aligned with the cryogenic freezer cover center point.

In some embodiments, the center point of the lid may be offset to the left of the handle center point as shown in FIG. 27. In other embodiments, the center point of the lid may be offset to the right of the handle center point as shown in FIG. 28. By offsetting the center point of the lid relative to the center point of the handle, the cryogenic freezer cover will contain a larger available surface area upon which operators can temporarily set down samples from inside the cryogenic freezer inner tank in order to observe and work with said samples.

The handle length dimension may be at least 50% of a radius dimension of the outer tank ($r_{ot}$). By increasing the handle length dimension, the handle provides a more stable surface for operators to grab on to while opening the lid, obtaining samples from inside the inner tank, and working with samples which are set down upon the cryogenic freezer cover.

The inventors surprisingly discovered that by making the center point of the lid offset relative to the center point of the handle, a flat surface of increased surface area is created on the top exterior surface of the cryogenic freezer which operators can use to temporarily place samples retrieved from within the freezer.

Light Emitting Diode

FIG. 29 to FIG. 34 also depict various embodiments of a light emitting diode useful for illuminating the inside of the cryogenic freezer.

Figure 29:
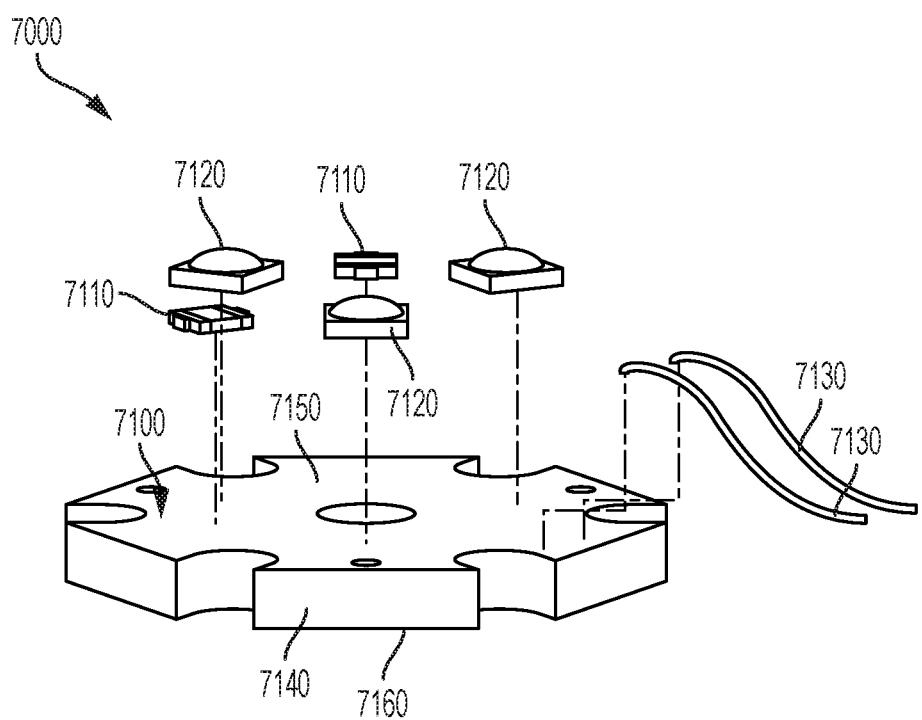
FIG. 29 shows an exploded perspective view of an embodiment of a light emitting diode as described herein.

FIG. 29 depicts an exploded perspective view of a light emitting diode (7010). As shown in FIG. 29, the light emitting diode may comprise a metal core printed circuit board (7100). Connected to the metal core printed circuit board may be at least one wire (7130) and at least one lighting element (7120). In some embodiments, at least one optional resistor (7110) may also be connected to the metal core printed circuit board. As further shown in FIG. 29, the metal core printed circuit board (7100) comprises an outer perimeter (7140) defining a first planar surface (7150) and a second planar surface (7160) opposite the first planar surface.

The metal core printed circuit board (7100) may come in many sizes, shapes and configurations and may be of any type previously disclosed in the art and those yet to be invented. Certain metal core printed circuit boards may be encapsulated in a dielectric resin, although a dielectric resin encapsulation is not considered necessary. One example of a metal core printed circuit board is a SinkPAD™ printed circuit board available from ADURA LED Solutions of Corona, California, U.S.A.

As further shown in FIG. 29, the metal core printed circuit board (7100) may optionally comprise at least one resistor (7110). The at least one resistor may be connected to the metal core printed circuit board on the first planar surface (7150) by a first solder. Preferably the first solder is free of tin or substantially free of tin. By substantially free of tin it is meant that the first solder comprises no more than trace amounts of tin defined as preferably less than 2.0% by weight tin in the first solder with less than 1.5% by weight tin in the first solder being more preferred, less than 1.0% by weight tin in the first solder being even more preferred, and less than 0.5% by weight tin in the first solder being most preferred. Without wishing to be bound to any theory, it is believed that these trace amounts are insufficient for the tin to express its metal characteristics when present in the metal alloy of the first solder. More preferably, the first solder comprises indium. Most preferably the first solder consists of indium, that is, the first solder is pure indium having less than 0.01% of an element which is not indium.

In some embodiments, the first solder may comprise elements other than indium. For example, the first solder may comprise indium and silver. In other embodiments, the first solder may comprise indium and lead. In still other embodiments, the first solder may comprise indium, silver, and bismuth. In yet other embodiments, the first solder may comprise indium, silver, and gallium.

Where the first solder comprises indium and silver, the level of indium and silver may each be expressed as a range based on the total weight percent of the first solder. In a preferred embodiment, silver is present in the first solder at a level in a range of between 0.1% by weight and 10% by weight while indium is present in the first solder at a level in a range of between 85% by weight and 99.8% by weight with the silver and indium combined to account for 100% by weight of the first solder. One of ordinary skill will recognize that the weight percentages disclosed herein and in the claims represent weight percentages of the various elements in the composition that forms the first solder.

Where the first solder comprises indium and lead, the level of indium and lead may each be expressed as a range based on the total weight percent of the first solder. In a preferred embodiment, lead is present in the first solder at a level in a range of between 40% by weight and 50% by weight while indium is present in the first solder at a level in a range of between 50% by weight and 60% by weight with the lead and indium combined to account for 100% by weight of the first solder. One of ordinary skill will recognize that the weight percentages disclosed herein and in the claims represent weight percentages of the various elements in the composition that forms the first solder.

Where the first solder comprises indium, silver, and bismuth, the level of indium, silver, and bismuth may each be expressed as a range based on the total weight percent of the first solder. In a preferred embodiment, bismuth is present in the first solder at a level in a range of between 0.1% by weight and 5% by weight, silver is present in the first solder at a level in a range of between 0.1% by weight and 10% by weight, and indium is present in the first solder at a level in a range of between 85% by weight and 99.8% by weigh with the bismuth, silver, and indium combined to account for 100% by weight of the first solder. One of ordinary skill will recognize that the weight percentages disclosed herein and in the claims represent weight percentages of the various elements in the composition that forms the first solder.

Where the first solder comprises indium, silver, and gallium, the level of indium, silver, and gallium may each be expressed as a range based on the total weight percent of the first solder. In a preferred embodiment, gallium is present in the first solder at a level in a range of between 1% by weight and 6% by weight, silver is present in the first solder at a level in a range of between 0.1% by weight and 10% by weight, and indium is present in the first solder at a level in a range of between 85% by weight and 99.8% by weight with the gallium, silver, and indium combined to account for 100% by weight of the first solder. One of ordinary skill will recognize that the weight percentages disclosed herein and in the claims represent weight percentages of the various elements in the composition that forms the first solder.

The number and location of optional resistor(s) is not considered important and will vary depending upon a number of factors. While the example shown in the Figures comprises three resistors, embodiments may exist which have more or less than three resistors. For example, the metal core printed circuit board (7100) may comprise at least two resistors, at least three resistors, at least four resistors, or at least five resistors. Each resistor may have one or more leads. The resistors, when used, limit the current flowing from the wire(s) to the lighting element(s).

As further shown in FIG. 29, the metal core printed circuit board (7100) may comprise at least one wire (7130). The at least one wire may be connected to the metal core printed circuit board on the first planar surface (7150) by a second solder. Preferably, the second solder is free of tin or substantially free of tin. By substantially free of tin it is meant that the second solder comprises no more than trace amounts of tin defined as preferably less than 2.0% by weight tin in the second solder with less than 1.5% by weight tin in the second solder being more preferred, less than 1.0% by weight tin in the second solder being even more preferred, and less than 0.5% by weight tin in the second solder being most preferred. Without wishing to be bound to any theory, it is believed that these trace amounts are insufficient for the tin to express its metal characteristics when present in the metal alloy of the second solder. More preferably, the second solder comprises indium. Most preferably the second solder consists of indium, that is, the second solder is pure indium having less than 0.01% of an element which is not indium.

In some embodiments, the second solder may comprise elements other than indium. For example, the second solder may comprise indium and silver. In other embodiments, the second solder may comprise indium and lead. In still other embodiments, the second solder may comprise indium, silver, and bismuth. In yet other embodiments, the second solder may comprise indium, silver, and gallium.

Where the second solder comprises indium and silver, the level of indium and silver may each be expressed as a range based on the total weight percent of the second solder. In a preferred embodiment, silver is present in the second solder at a level in a range of between 0.1% by weight and 10% by weight while indium is present in the second solder at a level in a range of between 85% by weight and 99.8% by weight with the silver and indium combined to account for 100% by weight of the second solder. One of ordinary skill will recognize that the weight percentages disclosed herein and in the claims represent weight percentages of the various elements in the composition that forms the second solder.

Where the second solder comprises indium and lead, the level of indium and lead may each be expressed as a range based on the total weight percent of the second solder. In a preferred embodiment, lead is present in the second solder at a level in a range of between 40% by weight and 50% by weight while indium is present in the second solder at a level in a range of between 50% by weight and 60% by weight with the lead and indium combined to account for 100% by weight of the second solder. One of ordinary skill will recognize that the weight percentages disclosed herein and in the claims represent weight percentages of the various elements in the composition that forms the second solder.

Where the second solder comprises indium, silver, and bismuth, the level of indium, silver, and bismuth may each be expressed as a range based on the total weight percent of the second solder. In a preferred embodiment, bismuth is present in the second solder at a level in a range of between 0.1% by weight and 5% by weight, silver is present in the second solder at a level in a range of between 0.1% by weight and 10% by weight, indium is present in the second solder at a level in a range of between 85% by weight and 99.8% by weight, and the bismuth, silver, and indium combined account for 100% by weight of the second solder. One of ordinary skill will recognize that the weight percentages disclosed herein and in the claims represent weight percentages of the various elements in the composition that forms the second solder.

Where the second solder comprises indium, silver, and gallium, the level of indium, silver, and gallium may each be expressed as a range based on the total weight percent of the second solder. In a preferred embodiment, gallium is present in the second solder at a level in a range of between 1% by weight and 6% by weight, silver is present in the second solder at a level in a range of between 0.1% by weight and 10% by weight, and indium is present in the second solder at a level in a range of between 85% by weight and 99.8% by weight with the gallium, silver, and indium combined to account for 100% by weight of the second solder. One of ordinary skill will recognize that the weight percentages disclosed herein and in the claims represent weight percentages of the various elements in the composition that forms the second solder.

The number and location of wires is not considered important and will depend upon a variety of factors. While the examples shown in the Figures comprise two wires, embodiments may exist which have more or less than two wires. For example, the metal core printed circuit board (7100) may comprise at least two wires, at least three wires, at least four wires, or at least five wires. The wires are used to transfer electricity generated from a source outside of the light emitting diode, such as a battery or an electrical grid, to the metal core printed circuit board.

As further shown in FIG. 29, the metal core printed circuit board may further comprise at least one lighting element (7120). The lighting element(s) may be connected to the metal core printed circuit board on the first planar surface (7150) by a third solder. Preferably, the third solder is free of tin or substantially free of tin. By substantially free of tin it is meant that the third solder comprises no more than trace amounts of tin defined as preferably less than 2.0% by weight tin in the third solder with less than 1.5% by weight tin in the third solder being more preferred, less than 1.0% by weight tin in the third solder being even more preferred, and less than 0.5% by weight tin in the third solder being most preferred. Without wishing to be bound to any theory, it is believed that these trace amounts are insufficient for the tin to express its metal characteristics when present in the metal alloy of the third solder. More preferably, the third solder comprises indium. Most preferably the third solder consists of indium, that is, the third solder is pure indium having less than 0.01% of an element which is not indium.

In some embodiments, the third solder may comprise elements other than indium. For example, the third solder may comprise indium and silver. In other embodiments, the third solder may comprise indium and lead. In still other embodiments, the third solder may comprise indium, silver, and bismuth. In yet other embodiments, the third solder may comprise indium, silver, and gallium.

Where the third solder comprises indium and silver, the level of indium and silver may each be expressed as a range based on the total weight percent of the third solder. In a preferred embodiment, silver is present in the third solder at a level in a range of between 0.1% by weight and 10% by weight while indium is present in the third solder at a level in a range of between 85% by weight and 99.8% by weight with the silver and indium combined to account for 100% by weight of the third solder. One of ordinary skill will recognize that the weight percentages disclosed herein and in the claims represent weight percentages of the various elements in the composition that forms the third solder.

Where the third solder comprises indium and lead, the level of indium and lead may each be expressed as a range based on the total weight percent of the third solder. In a preferred embodiment, lead is present in the third solder at a level in a range of between 40% by weight and 50% by weight while indium is present in the third solder at a level in a range of between 50% by weight and 60% by weight with the lead and indium combined to account for 100% by weight of the third solder. One of ordinary skill will recognize that the weight percentages disclosed herein and in the claims represent weight percentages of the various elements in the composition that forms the third solder.

Where the third solder comprises indium, silver, and bismuth, the level of indium, silver, and bismuth may each be expressed as a range based on the total weight percent of the third solder. In a preferred embodiment, bismuth is present in the third solder at a level in a range of between 0.1% by weight and 5% by weight, silver is present in the third solder at a level in a range of between 0.1% by weight and 10% by weight, and indium is present in the third solder at a level in a range of between 85% by weight and 99.8% by weigh with the bismuth, silver, and indium combined to account for 100% by weight of the third solder. One of ordinary skill will recognize that the weight percentages disclosed herein and in the claims represent weight percentages of the various elements in the composition that forms the third solder.

Where the third solder comprises indium, silver, and gallium, the level of indium, silver, and gallium may each be expressed as a range based on the total weight percent of the third solder. In a preferred embodiment, gallium is present in the third solder at a level in a range of between 1% by weight and 6% by weight, silver is present in the third solder at a level in a range of between 0.1% by weight and 10% by weight, and indium is present in the third solder at a level in a range of between 85% by weight and 99.8% by weight with the gallium, silver, and indium combined to account for 100% by weight of the third solder. One of ordinary skill will recognize that the weight percentages disclosed herein and in the claims represent weight percentages of the various elements in the composition that forms the third solder.

The number and location of lighting element(s) is not considered important and will vary depending upon a number of factors. While the example shown in the Figures comprises three lighting elements, embodiments may exist which have more or less than three lighting elements. For example, the metal core printed circuit board (7100) may comprise at least two lighting elements, at least three lighting elements, at least four lighting elements, or at least five lighting elements. The lighting elements produce light when they receive an electrical current which passes from a source outside of the light emitting diode, such as a battery or an electrical grid, through the wire(s) into the metal core printed circuit board (and optionally through the resistor(s)) and to the lighting element(s).

Figure 30:
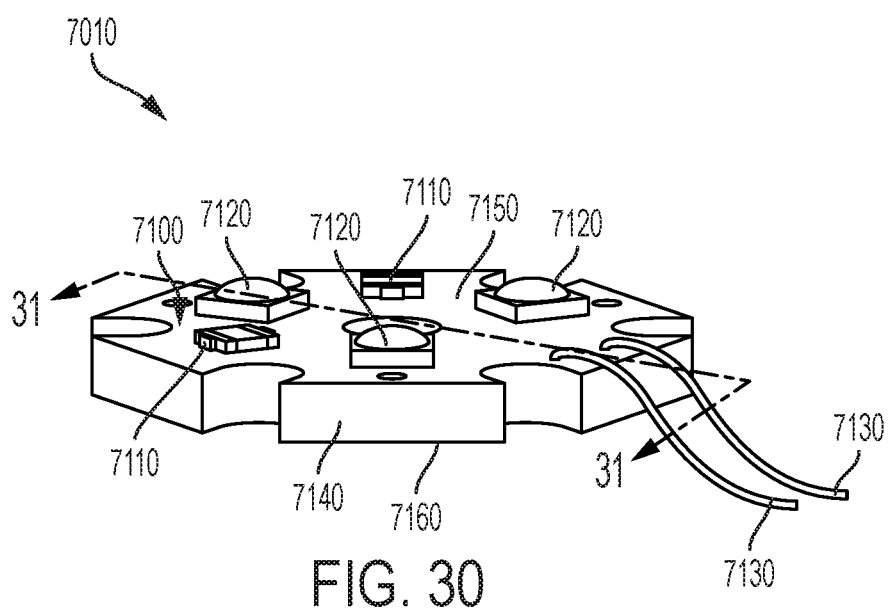
FIG. 30 shows an assembled perspective view of the embodiment of a light emitting diode of FIG. 29.

FIG. 30 depicts an assembled perspective view of the embodiment of a light emitting diode (7010) shown in FIG. 29. FIG. 30 shows the optional resistors (7110), the wires (7130), and the lighting elements (7120) connected to the first planar surface (7150) of the metal core printed circuit board (7100).

Figure 31:
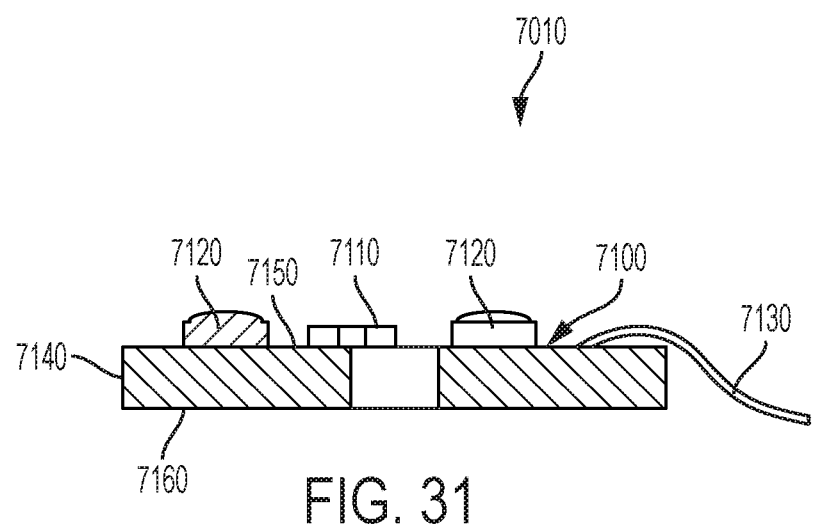
FIG. 31 shows a cross section view of the embodiment of a light emitting diode of FIG. 30.

FIG. 31 depicts a cross section view of the embodiment of a light emitting diode (7010) shown in FIG. 30. As shown in FIG. 31, each of the optional resistors (7110) may be connected to the first planar surface (7150) of the metal core printed circuit board (7100) by the first solder. FIG. 31 also shows each of the wires (7130) connected to the first planar surface of the metal core printed circuit board by the second solder. Finally, FIG. 31 shows the lighting element (7120) connected to the first planar surface of the metal core printed circuit board by the third solder.

Figure 32:
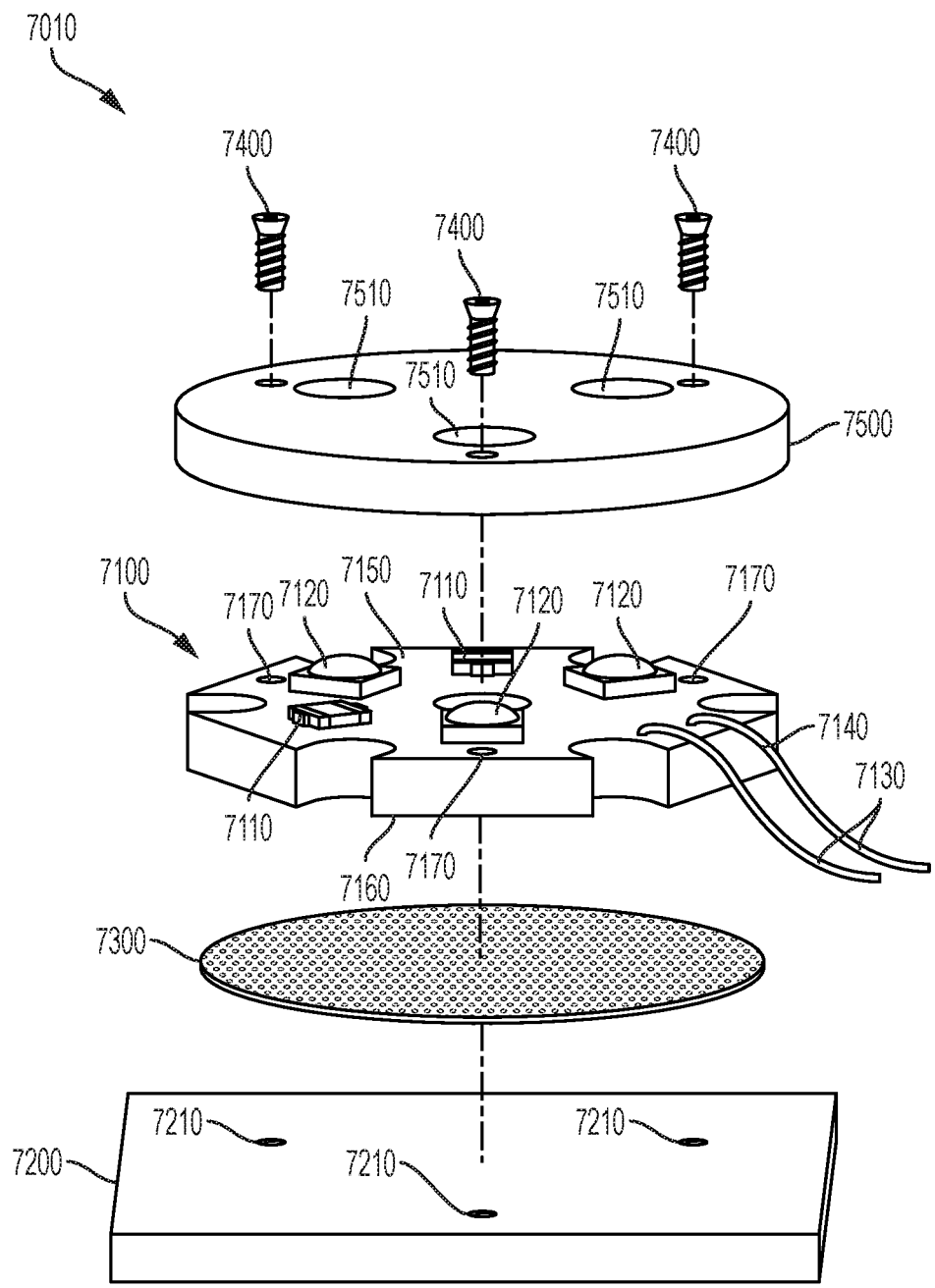
FIG. 32 shows an exploded perspective view of an embodiment of a light emitting diode as described herein.

FIG. 32 depicts an exploded perspective view of a light emitting diode (7010). As shown in FIG. 32, the light emitting diode may comprise the metal core printed circuit board (7100), a mounting platform (7200), and a thermal interface membrane (7300). The thermal interface membrane, when present, is preferably located between the metal core printed circuit board and the mounting platform. The metal core printed circuit board may be connected to the mounting platform by a plurality of screws (7400), each of which passes through one of a plurality of holes (7170) located in the metal core printed circuit board and threads into a corresponding threaded hole of a plurality of threaded holes (7210) located in the mounting platform. The number of holes and number of threaded holes is not considered important and will depend upon a variety of factors including the size and configuration of the light emitting diode.

FIG. 32 also depicts the light emitting diode having an optional lens (7500). When present, the optional lens may be connected to the metal core printed circuit board by the plurality of screws (7400) each of which passes through one of a plurality of lens holes (7510) located in the lens and threads into a corresponding hole of a plurality of holes (7170) located in the metal core printed circuit board. The plurality of screws which connect the optional lens to the metal core printed circuit board may be the same as or different than the plurality of screws that connects the metal core printed circuit board to the optional mounting platform (7200). When the plurality of screws which connect the optional lens to the metal core printed circuit board are the same as the plurality of screws that connect the metal core printed circuit board to the optional mounting platform, each screw of the plurality of screws will pass through one of the plurality of holes in the metal core printed circuit board, and thread into one of the threaded holes of the plurality of threaded holes (7210) located in the mounting platform. One of ordinary skill will recognize that the plurality of screws may be replaced by a plurality of other fasteners such as bolts, rivets, and the like. The lens, when present, may be manufactured from a polycarbonate material.

In some embodiments, the mounting platform (7200)—when present—may be a heat sinking platform. A heat sinking platform is defined as a surface through which heat generated by one or more components of the light emitting diode is transferred. Preferably the heat sinking platform is a metal surface having a thermal conductivity. Preferably, the thermal conductivity of the heat sinking platform will be in a range selected from the group consisting of between 6 W/(m-K) and 450 W/(m-K), between 6 W/(m-K) and 300 W/(m-K), between 6 W/(m-K) and 200 W/(m-K), and between 6 W/(m-K) and 100 W/(m-K). The heat sinking platform, when used, directs heat away from the metal core printed circuit board (100), most preferably away from the lighting element (120). Alternatively, the mounting platform may be a wall of a tank, such as a tank used for cryogenic storage. Preferably the wall of the tank is an internal wall of the tank providing a light source for a viewer to see the internal contents of the tank.

The thermal interface membrane (7300), when present, will be in contact with the second planar surface (7160). The thermal interface membrane may comprise a number of different materials. In one example, the thermal interface membrane comprises graphite. In another example, the thermal interface membrane comprises silver. Preferably, the thermal interface membrane is free of an adhesive. The thermal interface membrane, when present, is not required to have any particular size, shape, thickness, or location. However, it is preferred that the thermal interface membrane have a size and shape identical to or substantially similar to the size and shape of the bottom surface of the lighting element (120). In such embodiments, it is preferred that at least one thermal interface membrane is located adjacent to the second planar surface (160) of the metal core printed circuit board opposite the location of the lighting element on the first planar surface (150) of the metal core printed circuit board.

The thermal interface membrane (7300), when present, may also be defined with respect to its properties. For instance, the thermal interface membrane will have a thermal conductivity. Preferably, the thermal conductivity will be at least 750 W/(m-K) with at least 1,000 W/(m-K) being more preferred and at least 1,250 W/(m-K) being still more preferred. By having a thermal conductivity in the above ranges, it is thought that the thermal interface membrane more rapidly directs heat away from the metal core printed circuit board during operation, which can help extend the life of the metal core printed circuit board.

Figure 33:
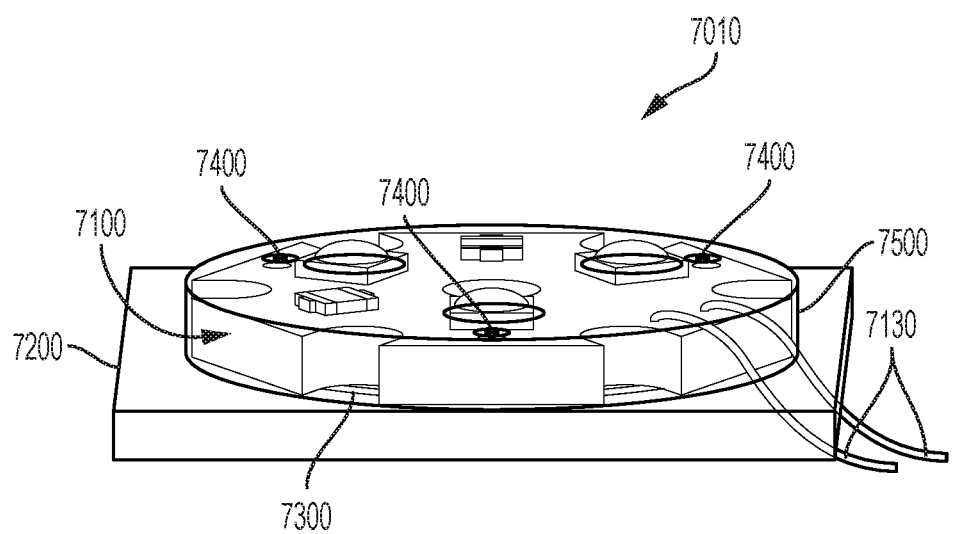
FIG. 33 depicts an assembled perspective view of the embodiment of a light emitting diode of FIG. 32.

FIG. 33 depicts an assembled perspective view of the light emitting diode (7010) shown in FIG. 32. As shown in FIG. 33, in some embodiments, the metal core printed circuit board (7100) is connected to the optional mounting platform (7200) and the optional lens (7500) by passing each screw of the plurality of screws (7400) through a corresponding hole in the optional lens, the metal core printed circuit board, and into the optional mounting platform. One of ordinary skill will recognize that, in embodiments having an optional lens but no optional mounting platform, each screw of the plurality of screws may pass through a corresponding hole in the lens and into the metal core printed circuit board. One of ordinary skill will also recognize that, in embodiments having an optional mounting platform but no optional lens, each screw of the plurality of screws may pass through a corresponding hole in the metal core printed circuit board and into the optional mounting platform.

Figure 34:
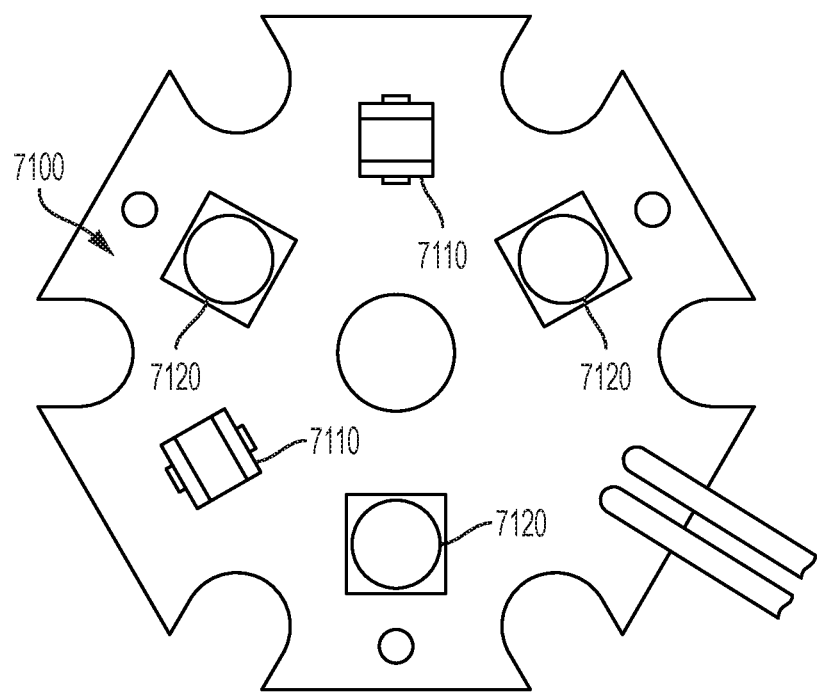
FIG. 34 depicts a top view of a metal core printed circuit board for a light emitting diode as described herein.

FIG. 34 depicts a top view of a metal core printed circuit board. As shown in FIG. 34, the metal core printed circuit board comprises at least one optional resistor (7110). The metal core printed circuit board further comprises at least one lighting element (7120).

The inventors surprisingly discovered that the light emitting diode is capable of withstanding reduced cryogenic temperatures at or below −180° C. without components of the light emitting diode such as the resistors, the wires, or the light source, separating from the metal core printed circuit board. Without wishing to be bound by any theory, it is believed that the mechanical properties of the various components of the solders disclosed herein prevent cracking or disintegration of the connections between the metal core printed circuit board and the resistors, wires, and light source.

The inventors also surprisingly discovered that the thermal interface membrane reduces aging of the metal core printed circuit board caused by rapid temperature changes as the light emitting diode is turned on and off. It was found that traditional methods of reducing aging, such as the use of thermal pastes, were unable to reduce aging of the metal core printed circuit board when the light emitting diode was utilized in a cryogenic environment at temperatures at or below −180° C. Without wishing to be bound by any theory, it is believed that the liquid components which make up all or a portion of the thermal paste solidify, crack, and/or disintegrate in the cryogenic environments whereas the thermal interface membranes disclosed herein remain intact.

Embodiments

One preferred cryogenic freezer will have the apparatus for thermal regulation described herein.

One preferred cryogenic freezer will have the cable gland described herein.

One preferred cryogenic freezer will have the bearing assembly described herein.

One preferred cryogenic freezer will have the bearing assembly described herein.

One preferred cryogenic freezer will have the system for charging a cryogen described herein.

One preferred cryogenic freezer will have the venting system described herein.

One preferred cryogenic freezer will have the cryogenic freezer handle and lid described herein.

One preferred cryogenic freezer will have the light emitting diode described herein.

One preferred cryogenic freezer will have the apparatus for thermal regulation described herein and the cable gland described herein.

One preferred cryogenic freezer will have the apparatus for thermal regulation described herein and the bearing assembly described herein.

One preferred cryogenic freezer will have the apparatus for thermal regulation described herein and the bearing assembly described herein.

One preferred cryogenic freezer will have the apparatus for thermal regulation described herein and the system for charging a cryogen described herein.

One preferred cryogenic freezer will have the apparatus for thermal regulation described herein and the venting system described herein.

One preferred cryogenic freezer will have the apparatus for thermal regulation described herein and the cryogenic freezer handle and lid described herein.

One preferred cryogenic freezer will have the apparatus for thermal regulation described herein and the light emitting diode described herein.

One preferred cryogenic freezer will have the apparatus for thermal regulation described herein, the cable gland described herein, and the bearing assembly described herein.

One preferred cryogenic freezer will have the apparatus for thermal regulation described herein, the cable gland described herein, and the bearing assembly described herein.

One preferred cryogenic freezer will have the apparatus for thermal regulation described herein, the cable gland described herein, and the system for charging a cryogen described herein.

One preferred cryogenic freezer will have the apparatus for thermal regulation described herein, the cable gland described herein, and the venting system described herein.

One preferred cryogenic freezer will have the apparatus for thermal regulation described herein, the cable gland described herein, and the cryogenic freezer handle and lid described herein.

One preferred cryogenic freezer will have the apparatus for thermal regulation described herein, the cable gland described herein, and the light emitting diode described herein.

One preferred cryogenic freezer will have the apparatus for thermal regulation described herein, the cable gland described herein, the bearing assembly described herein, and the system for charging a cryogen described herein.

One preferred cryogenic freezer will have the apparatus for thermal regulation described herein, the cable gland described herein, the bearing assembly described herein, and the venting system described herein.

One preferred cryogenic freezer will have the apparatus for thermal regulation described herein, the cable gland described herein, the bearing assembly described herein, and the cryogenic freezer handle and lid described herein.

One preferred cryogenic freezer will have the apparatus for thermal regulation described herein, the cable gland described herein, the bearing assembly described herein, and the light emitting diode described herein.

One preferred cryogenic freezer will have the apparatus for thermal regulation described herein, the cable gland described herein, the bearing assembly described herein, and the system for charging a cryogen described herein.

One preferred cryogenic freezer will have the apparatus for thermal regulation described herein, the cable gland described herein, the bearing assembly described herein, and the venting system described herein.

One preferred cryogenic freezer will have the apparatus for thermal regulation described herein, the cable gland described herein, the bearing assembly described herein, and the cryogenic freezer handle and lid described herein.

One preferred cryogenic freezer will have the apparatus for thermal regulation described herein, the cable gland described herein, the bearing assembly described herein, and the light emitting diode described herein.

One preferred cryogenic freezer will have the apparatus for thermal regulation described herein, the cable gland described herein, the bearing assembly described herein, the system for charging a cryogen described herein, and the venting system described herein.

One preferred cryogenic freezer will have the apparatus for thermal regulation described herein, the cable gland described herein, the bearing assembly described herein, the system for charging a cryogen described herein, and the light emitting diode described herein.

One preferred cryogenic freezer will have the apparatus for thermal regulation described herein, the cable gland described herein, the bearing assembly described herein, the system for charging a cryogen described herein, and the venting system described herein.

One preferred cryogenic freezer will have the apparatus for thermal regulation described herein, the cable gland described herein, the bearing assembly described herein, the system for charging a cryogen described herein, and the light emitting diode described herein.

One preferred cryogenic freezer will have the apparatus for thermal regulation described herein, the cable gland described herein, the bearing assembly described herein, the system for charging a cryogen described herein, and the cryogenic freezer handle and lid described herein.

One preferred cryogenic freezer will have the apparatus for thermal regulation described herein, the cable gland described herein, the bearing assembly described herein, the system for charging a cryogen described herein, and the light emitting diode described herein.

One preferred cryogenic freezer will have the apparatus for thermal regulation described herein, the cable gland described herein, the bearing assembly described herein, the venting system described herein, the system for charging a cryogen described herein, and the cryogenic freezer handle and lid described herein.

One preferred cryogenic freezer will have the apparatus for thermal regulation described herein, the cable gland described herein, the bearing assembly described herein, the system for charging a cryogen described herein, and the light emitting diode described herein.

One preferred cryogenic freezer will have the apparatus for thermal regulation described herein, the cable gland described herein, the bearing assembly described herein, the system for charging a cryogen described herein, the venting system described herein, and the cryogenic freezer handle and lid described herein.

One preferred cryogenic freezer will have the apparatus for thermal regulation described herein, the cable gland described herein, the bearing assembly described herein, the system for charging a cryogen described herein, the venting system described herein, and the light emitting diode described herein.

One preferred cryogenic freezer will have the apparatus for thermal regulation described herein, the cable gland described herein, the bearing assembly described herein, the system for charging a cryogen described herein, the venting system described herein, and the cryogenic freezer handle and lid described herein.

One preferred cryogenic freezer will have the apparatus for thermal regulation described herein, the cable gland described herein, the bearing assembly described herein, the system for charging a cryogen described herein, the venting system described herein, and the light emitting diode described herein.

One preferred cryogenic freezer will have the apparatus for thermal regulation described herein, the cable gland described herein, the bearing assembly described herein, the system for charging a cryogen described herein, the venting system described herein, the cryogenic freezer handle and lid described herein, and the light emitting diode described herein.

One preferred cryogenic freezer will have the apparatus for thermal regulation described herein, the cable gland described herein, the bearing assembly described herein, the system for charging a cryogen described herein, the venting system described herein, the cryogenic freezer handle and lid described herein, and the light emitting diode described herein.

One preferred cryogenic freezer will have the cable gland described herein and the bearing assembly described herein.

One preferred cryogenic freezer will have the cable gland described herein and the system for charging a cryogen described herein.

One preferred cryogenic freezer will have the cable gland described herein and the venting system described herein.

One preferred cryogenic freezer will have the cable gland described herein and the cryogenic freezer handle and lid described herein.

One preferred cryogenic freezer will have the cable gland described herein and the light emitting diode described herein.

One preferred cryogenic freezer will have the cable gland described herein, the bearing assembly described herein, and the system for charging a cryogen described herein.

One preferred cryogenic freezer will have the cable gland described herein, the bearing assembly described herein, and the venting system described herein.

One preferred cryogenic freezer will have the cable gland described herein, the bearing assembly described herein, and the cryogenic freezer handle and lid described herein.

One preferred cryogenic freezer will have the cable gland described herein, the bearing assembly described herein, and the light emitting diode described herein.

One preferred cryogenic freezer will have the cable gland described herein, the bearing assembly described herein, and the system for charging a cryogen described herein.

One preferred cryogenic freezer will have the cable gland described herein, the bearing assembly described herein, and the venting system described herein.

One preferred cryogenic freezer will have the cable gland described herein, the bearing assembly described herein, and the cryogenic freezer handle and lid described herein.

One preferred cryogenic freezer will have the cable gland described herein, the bearing assembly described herein, and the light emitting diode described herein.

One preferred cryogenic freezer will have the cable gland described herein, the bearing assembly described herein, the system for charging a cryogen described herein, and the venting system described herein.

One preferred cryogenic freezer will have the cable gland described herein, the bearing assembly described herein, the system for charging a cryogen described herein, and the cryogenic freezer handle and lid described herein.

One preferred cryogenic freezer will have the cable gland described herein, the bearing assembly described herein, the system for charging a cryogen described herein, and the light emitting diode described herein.

One preferred cryogenic freezer will have the cable gland described herein, the bearing assembly described herein, the system for charging a cryogen described herein, and the venting system described herein.

One preferred cryogenic freezer will have the cable gland described herein, the bearing assembly described herein, the system for charging a cryogen described herein, and the cryogenic freezer handle and lid described herein.

One preferred cryogenic freezer will have the cable gland described herein, the bearing assembly described herein, the system for charging a cryogen described herein, and the light emitting diode described herein.

One preferred cryogenic freezer will have the cable gland described herein, the bearing assembly described herein, the system for charging a cryogen described herein, the venting system described herein, and the cryogenic freezer handle and lid described herein.

One preferred cryogenic freezer will have the cable gland described herein, the bearing assembly described herein, the system for charging a cryogen described herein, the venting system described herein, and the light emitting diode described herein.

One preferred cryogenic freezer will have the cable gland described herein, the bearing assembly described herein, the system for charging a cryogen described herein, the venting system described herein, and the cryogenic freezer handle and lid described herein.

One preferred cryogenic freezer will have the cable gland described herein, the bearing assembly described herein, the system for charging a cryogen described herein, the venting system described herein, and the light emitting diode described herein.

One preferred cryogenic freezer will have the cable gland described herein, the bearing assembly described herein, the system for charging a cryogen described herein, the venting system described herein, the cryogenic freezer handle and lid described herein, and the light emitting diode described herein.

One preferred cryogenic freezer will have the cable gland described herein, the bearing assembly described herein, the system for charging a cryogen described herein, the venting system described herein, the cryogenic freezer handle and lid described herein, and the light emitting diode described herein.

One preferred cryogenic freezer will have the bearing assembly described herein and the system for charging a cryogen described herein.

One preferred cryogenic freezer will have the bearing assembly described herein and the venting system described herein.

One preferred cryogenic freezer will have the bearing assembly described herein and the cryogenic freezer handle and lid described herein.

One preferred cryogenic freezer will have the bearing assembly described herein and the light emitting diode described herein.

One preferred cryogenic freezer will have the bearing assembly described herein, the system for charging a cryogen described herein, and the venting system described herein.

One preferred cryogenic freezer will have the bearing assembly described herein, the system for charging a cryogen described herein, and the cryogenic freezer handle and lid described herein.

One preferred cryogenic freezer will have the bearing assembly described herein, the system for charging a cryogen described herein, and the light emitting diode described herein.

One preferred cryogenic freezer will have the bearing assembly described herein, the system for charging a cryogen described herein, the venting system described herein, and the cryogenic freezer handle and lid described herein.

One preferred cryogenic freezer will have the bearing assembly described herein, the system for charging a cryogen described herein, the venting system described herein, and the light emitting diode described herein.

One preferred cryogenic freezer will have the bearing assembly described herein, the system for charging a cryogen described herein, the venting system described herein, the cryogenic freezer handle and lid described herein, and the light emitting diode described herein.

One preferred cryogenic freezer will have the bearing assembly described herein and the system for charging a cryogen described herein.

One preferred cryogenic freezer will have the bearing assembly described herein and the venting system described herein.

One preferred cryogenic freezer will have the bearing assembly described herein and the cryogenic freezer handle and lid described herein.

One preferred cryogenic freezer will have the bearing assembly described herein and the light emitting diode described herein.

One preferred cryogenic freezer will have the bearing assembly described herein, the system for charging a cryogen described herein, and the venting system described herein.

One preferred cryogenic freezer will have the bearing assembly described herein, the system for charging a cryogen described herein, and the cryogenic freezer handle and lid described herein.

One preferred cryogenic freezer will have the bearing assembly described herein, the system for charging a cryogen described herein, and the light emitting diode described herein.

One preferred cryogenic freezer will have the bearing assembly described herein, the system for charging a cryogen described herein, the venting system described herein, and the cryogenic freezer handle and lid described herein.

One preferred cryogenic freezer will have the bearing assembly described herein, the system for charging a cryogen described herein, the venting system described herein, and the light emitting diode described herein.

One preferred cryogenic freezer will have the bearing assembly described herein, the system for charging a cryogen described herein, the venting system described herein, the cryogenic freezer handle and lid described herein, and the light emitting diode described herein.

One preferred cryogenic freezer will have the system for charging a cryogen described herein and the venting system described herein.

One preferred cryogenic freezer will have the system for charging a cryogen described herein and the cryogenic freezer handle and lid described herein.

One preferred cryogenic freezer will have the system for charging a cryogen described herein and the light emitting diode described herein.

One preferred cryogenic freezer will have the system for charging a cryogen described herein, the venting system described herein, and the cryogenic freezer handle and lid.

One preferred cryogenic freezer will have the system for charging a cryogen described herein, the venting system described herein, and the light emitting diode described herein.

One preferred cryogenic freezer will have the system for charging a cryogen described herein, the venting system described herein, the cryogenic freezer handle and lid described herein, and the light emitting diode described herein.

One preferred cryogenic freezer will have the venting system described herein and the cryogenic freezer handle and lid described herein.

One preferred cryogenic freezer will have the venting system described herein and the light emitting diode described herein.

One preferred cryogenic freezer will have the venting system described herein, the cryogenic freezer handle and lid described herein, and the light emitting diode described herein.

What is claimed is:

1. An apparatus for thermal regulation (1000) of a cryogenic freezer comprising:
   a mount section (1100) having an outer perimeter (1110) defining a first planar surface (1120) and a second planar surface (1130) opposite the first planar surface, and a plurality of fins (1200) configured to be maintained in contact with a cryogen located in a bottom of an inner tank of the cryogenic freezer, with said plurality of fins extending from the second planar surface, each fin of the plurality of fins having a first end (1210) located adjacent to the second planar surface, a second end (1220) located opposite the first end, and a fin length dimension (1230) spanning from the first end to the second end, and wherein the mount section comprises a plurality of locator holes (1140) passing through the mount section from the first planar surface to the second planar surface and at least one fin of the plurality of fins extends through one of the plurality of locator holes from the first planar surface through the second planar surface.

2. The apparatus of claim 1, wherein at least one fin of the plurality of fins is directly attached to the first planar surface.

3. The apparatus of claim 1, wherein each fin of the plurality of fins is directly attached to the first planar surface.

4. The apparatus of claim 1, wherein each fin of the plurality of fins passes through a corresponding locator hole of the plurality of locator holes.

5. The apparatus of claim 1, further comprising a plurality of dividers (1300) extending perpendicular from the first planar surface and having a first edge (1310), a second edge (1320) opposite the first edge, a third edge (1330) spanning a distance between the first edge and the second edge, and a fourth edge (1340) opposite the third edge and spanning the distance between the first edge and the second edge.

6. The apparatus of claim 5, wherein the first edge of at least one divider of the plurality of dividers is directly attached to the first planar surface.

7. The apparatus of claim 5, wherein the first edge of each divider of the plurality of dividers is directly attached to the first planar surface.

8. The apparatus of claim 6, wherein at least one fin of the plurality of fins is located at a position on the second planar surface corresponding to a position on the first planar surface at which at least one divider of the plurality of dividers is located.

9. The apparatus of claim 6, wherein each fin of the plurality of fins is located at a position on the second planar surface corresponding to a position on the first planar surface at which at least one divider of the plurality of dividers is located.

10. The apparatus of claim 5, wherein at least one fin of the plurality of fins is integrally connected to the first edge of at least one divider of the plurality of dividers.

11. The apparatus of claim 5, wherein each fin of the plurality of fins is integrally connected to the first edge of at least one divider of the plurality of dividers, and each fin of the plurality of fins extends through a corresponding locator hole of the plurality of locator holes from the first planar surface to the second planar surface.

12. The apparatus of claim 1, wherein each fin of the plurality of fins has a substantially identical fin length dimension.

13. The apparatus of claim 1, wherein each fin of the plurality of fins has an identical fin length dimension.

14. The apparatus of claim 1, wherein the plurality of fins comprises at least a first fin (1240) located proximate to the outer perimeter, a second fin (1260) located proximate to a mount section center point (1150), and a plurality of intermediate fins (1250) located between the first fin and the second fin, wherein the fin length dimension of the first fin is less than the fin length dimension of the second fin.

15. The apparatus of claim 14, wherein the fin length dimension of each fin of the plurality of intermediate fins is greater than the fin length dimension of the first fin and less than the fin length dimension of the second fin.

16. The apparatus of claim 14, wherein the fin length dimension of each individual fin of the plurality of intermediate fins increases as the plurality of intermediate fins extends from the first fin to the second fin.

17. The apparatus of claim 1, wherein the apparatus for thermal regulation is part of a cryogenic freezer.

* * * * *